(12) United States Patent
Yu

(10) Patent No.: US 10,779,359 B2
(45) Date of Patent: *Sep. 15, 2020

(54) INFORMATION TRANSMISSION METHOD, BASE STATION, USER EQUIPMENT, AND SYSTEM

(71) Applicant: Huawei Technologies Co., Ltd., Shenzhen (CN)

(72) Inventor: Zheng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

This patent is subject to a terminal disclaimer.

(21) Appl. No.: 15/805,708

(22) Filed: Nov. 7, 2017

(65) Prior Publication Data

US 2018/0077750 A1 Mar. 15, 2018

Related U.S. Application Data

(63) Continuation of application No. 14/947,344, filed on Nov. 20, 2015, now Pat. No. 9,839,068, which is a
(Continued)

(51) Int. Cl.
*H04W 84/12* (2009.01)
*H04W 52/26* (2009.01)
(Continued)

(52) U.S. Cl.
CPC ......... *H04W 84/12* (2013.01); *H04B 1/7143* (2013.01); *H04W 4/80* (2018.02);
(Continued)

(58) Field of Classification Search
CPC ..... H04W 52/26; H04W 4/008; H04W 84/12; H04W 4/02
See application file for complete search history.

(56) References Cited

U.S. PATENT DOCUMENTS 6,041,046 A * 3/2000 Scott .................... H04B 7/2656
370/319
9,839,068 B2 * 12/2017 Yu ...................... H04W 52/0258
(Continued)

FOREIGN PATENT DOCUMENTS

CN 101772164 A 7/2010
CN 101820685 A 9/2010
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 11)", Technical Specification 3GPP TS 36.211 V11.2.0, Feb. 2013, 109 pages.
(Continued)

*Primary Examiner* — Raj Jain
(74) *Attorney, Agent, or Firm* — Fish & Richardson P.C.

(57) ABSTRACT

Embodiments provide an information transmission method, a base station, user equipment, and a system, which relate to the field of information transmission. The method includes: determining a characteristic parameter of user equipment; determining, according to a correspondence between a characteristic parameter and a resource configuration, a resource configuration corresponding to the characteristic parameter of the user equipment, and using the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and determining a resource according to the first resource configuration, and performing information transmission with the user equipment by using the resource. In this way, unnecessary resource use and power expenditure are avoided, thereby economizing on resources.

18 Claims, 15 Drawing Sheets

Related U.S. Application Data continuation of application No. PCT/CN2013/076540, filed on May 31, 2013.

(51) Int. Cl.
| | | |
|---|---|---|
| *H04W 72/04* | (2009.01) | |
| *H04W 4/80* | (2018.01) | |
| *H04W 72/08* | (2009.01) | |
| *H04W 52/02* | (2009.01) | |
| *H04B 1/7143* | (2011.01) | |

(52) U.S. Cl.
CPC ....... *H04W 52/0258* (2013.01); *H04W 52/26* (2013.01); *H04W 72/04* (2013.01); *H04W 72/085* (2013.01); *Y02D 70/00* (2018.01); *Y02D 70/1262* (2018.01); *Y02D 70/1264* (2018.01); *Y02D 70/21* (2018.01)

(56) References Cited

U.S. PATENT DOCUMENTS

| | | | | |
|---|---|---|---|---|
| 2011/0034179 A1* | 2/2011 | David | .................. | G01S 5/0236 455/456.1 |
| 2014/0314058 A1* | 10/2014 | Hughes | .................. | H04W 4/80 370/338 |
| 2015/0023197 A1* | 1/2015 | Iraji | ...................... | H04W 48/16 370/252 |
| 2016/0081101 A1* | 3/2016 | Yu | ..................... | H04W 52/0258 370/329 |
| 2016/0373215 A1* | 12/2016 | Nan | .......................... | H04L 1/08 |

FOREIGN PATENT DOCUMENTS

| | | |
|---|---|---|
| EP | 2190126 A1 | 5/2010 |
| WO | 96/36132 A1 | 11/1996 |
| WO | 2006/034578 A1 | 4/2006 |
| WO | 2010/070194 A1 | 6/2010 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 11)", Technical Specification 3GPP TS 36.321 V11.2.0, Mar. 2013, 56 pages.

"3rd Generation Partnership Project; Technical Specification Group Radio Access Network; Evolved Universal Terrestrial Radio Access (E-UTRA); Radio Resource Control (RRC); Protocol specification (Release 11)", Technical Specification 3GPP TS 36.331 V11.3.0, Mar. 2013, 344 pages.

* cited by examiner

INFORMATION TRANSMISSION METHOD, BASE STATION, USER EQUIPMENT, AND SYSTEM

CROSS-REFERENCE TO RELATED APPLICATIONS

This application is a continuation of U.S. patent application Ser. No. 14/947,344, filed on Nov. 20, 2015, which is a continuation of International Application No. PCT/CN2013/076540, filed on May 31, 2013. The afore-mentioned patent applications are hereby incorporated by reference in their entireties.

TECHNICAL FIELD

The present invention relates to the field of communications technologies, and in particular, to an information transmission method, a base station, user equipment, and a system.

BACKGROUND

The Internet of Things refers to a network on which various devices having specific sensing, calculation, execution, and communication capabilities are deployed to acquire information about the physical world, and information transmission, collaboration, and processing are implemented by using a network, so as to implement interconnection between a person and a thing and interconnection between things. It is generally accepted that a preferred phase of the Internet of Things is referred to as machine to machine (M2M), that is, implementing free communication between machines. For a communications network (for example, a mobile cellular network), a communication service undertaken by the communications network is referred to as machine type communication (MTC).

When MTC user equipment (UE) is in an extreme scenario (for example, in a basement, or isolated by a metal housing, or isolated by a thick wall, or in a remote region), a signal of the MTC UE suffers more path or penetration losses during transmission. However, an operator expects that an operating network can still serve the MTC UE even in the foregoing extreme scenario; therefore, a coverage area of the network needs to be enhanced.

During a process of implementing the present invention, it is found that the prior art has at least the following problem exists:

When a coverage area of an entire network is enhanced in the prior art, usually, a same extent of enhancement is performed in the coverage area of the entire network. A higher extent of enhancement required for information transmission indicates that more resources (including one or more of a time resource, a frequency resource, power consumption, and a code resource) need to be used for information transmission; therefore, when a same extent of enhancement is performed in the coverage area of the entire network, for user equipment that needs only a relatively low extent of enhancement, unnecessary resource use and power expenditure arise, which causes a waste of resources.

SUMMARY

To avoid a problem of a waste of resources caused by enhancement performed in a network coverage area in the prior art, embodiments of the present invention provide an information transmission method, a base station, user equipment, and a system. The technical solutions are as follows:

According to an aspect, an embodiment of the present invention provides an information transmission method, where the method includes:

determining a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

determining, according to a correspondence between a characteristic parameter and a resource configuration, a resource configuration corresponding to the characteristic parameter of the user equipment, and using the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and determining a resource according to the first resource configuration, and performing information transmission with the user equipment by using the resource.

In an implementation manner of this embodiment of the present invention, in the correspondence between a characteristic parameter and a resource configuration, each characteristic parameter in a same type of characteristic parameter corresponds to one resource configuration, and resource configurations corresponding to the characteristic parameters are different.

In another implementation manner of this embodiment of the present invention, each type of the sub-configuration in the first resource configuration includes one or more sub-configurations.

In another implementation manner of this embodiment of the present invention, when a type of sub-configuration in the first resource configuration includes multiple sub-configurations, the determining a resource according to the first resource configuration includes:

determining one sub-configuration from the multiple sub-configurations according to a predefined function relationship, and determining the resource by using the determined sub-configuration; or determining the resource by using a default resource configuration in the multiple sub-configurations.

In another implementation manner of this embodiment of the present invention, the method further includes:

notifying the user equipment of the first resource configuration, the determined sub-configuration, or the default resource configuration by using dedicated signaling or a field.

In another implementation manner of this embodiment of the present invention, the dedicated signaling or the field is:

radio resource control dedicated signaling or a field, media access control dedicated signaling or a field, or physical layer dedicated signaling or a field.

In another implementation manner of this embodiment of the present invention, the spreading resource configuration is used to configure sizes of a first field and a second field, where the first field is used to indicate a length of a spread spectrum sequence and an index of the spread spectrum sequence, the second field is used to indicate a modulation and coding scheme, sums of sizes that are of the first field and the second field and that are configured by using spreading resource configurations are the same, and sizes of the first field that are configured by using the spreading resource configurations are different.

In another implementation manner of this embodiment of the present invention, when the first resource configuration includes the spreading resource configuration, the performing information transmission with the user equipment by using the resource includes:

performing information transmission by using a spread spectrum sequence resource determined by using the first field and the second field.

In another implementation manner of this embodiment of the present invention, the spreading resource configuration includes a third field used to indicate a length of a spread spectrum sequence, an index of the spread spectrum sequence, and a modulation and coding scheme.

In another implementation manner of this embodiment of the present invention, when the first resource configuration includes the spreading resource configuration, the performing information transmission with the user equipment by using the resource includes:

performing information transmission by using a spread spectrum sequence resource determined by using the third field.

In another implementation manner of this embodiment of the present invention, when the first resource configuration includes the spreading resource configuration and the random access preamble format configuration, the performing information transmission with the user equipment by using the resource includes:

despreading a random access preamble according to a spread spectrum sequence resource determined by using the spreading resource configuration; and detecting the random access preamble according to a random access preamble format determined by using the random access preamble format configuration.

In another implementation manner of this embodiment of the present invention, when the first resource configuration includes at least one of the spreading resource configuration, the narrowband resource configuration, and the frequency hopping pattern configuration, the performing information transmission with the user equipment by using the resource includes:

spreading or despreading, by using a spread spectrum sequence resource determined by using the spreading resource configuration, information on a resource determined by using at least one of a narrowband resource and a frequency hopping pattern that are determined by using the at least one of the narrowband resource configuration and the frequency hopping pattern configuration.

In another implementation manner of this embodiment of the present invention, the method further includes:

notifying the user equipment of the correspondence between a characteristic parameter and a resource configuration by using broadcast or multicast signaling.

In another implementation manner of this embodiment of the present invention, the broadcast or multicast signaling is:

a master system information block, a system information block, Radio Resource Control signaling, Media Access Control signaling, or physical layer signaling.

In another implementation manner of this embodiment of the present invention, the correspondence between a characteristic parameter and a resource configuration is predefined.

According to another aspect, an embodiment of the present invention further provides an information transmission method, where the method includes:

determining a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

determining a resource configuration corresponding to the characteristic parameter of the user equipment, and using the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and determining a resource according to the first resource configuration, and performing information transmission with a base station by using the resource.

In an implementation manner of this embodiment of the present invention, the determining a resource configuration corresponding to the characteristic parameter of the user equipment, and using the resource configuration corresponding to the characteristic parameter of the user equipment as a first resource configuration includes:

determining, according to a correspondence between a characteristic parameter and a resource configuration, the resource configuration corresponding to the characteristic parameter of the user equipment, and using the resource configuration corresponding to the characteristic parameter of the user equipment as the first resource configuration; or sending the characteristic parameter of the user equipment to the base station, receiving the resource configuration that is corresponding to the characteristic parameter of the user equipment and that is sent by the base station, and using the resource configuration that is corresponding to the characteristic parameter of the user equipment and that is sent by the base station as the first resource configuration.

In another implementation manner of this embodiment of the present invention, in the correspondence between a characteristic parameter and a resource configuration, each characteristic parameter in a same type of characteristic parameter corresponds to one resource configuration, and resource configurations corresponding to the characteristic parameters are different.

In another implementation manner of this embodiment of the present invention, each type of the sub-configuration in the first resource configuration includes one or more sub-configurations.

In another implementation manner of this embodiment of the present invention, when a type of sub-configuration in the first resource configuration includes multiple sub-configurations, the determining a resource according to the first resource configuration includes:

determining one sub-configuration from the multiple sub-configurations according to a predefined function relationship, and determining the resource by using the determined sub-configuration.

In another implementation manner of this embodiment of the present invention, when a type of sub-configuration in the first resource configuration includes multiple sub-configurations, the determining a resource according to the first resource configuration includes:

receiving dedicated signaling or a field that carries the resource configuration, determining one sub-configuration from the multiple sub-configurations according to the dedicated signaling or the field, and determining the resource by using the determined sub-configuration.

In another implementation manner of this embodiment of the present invention, the dedicated signaling or the field is:

radio resource control dedicated signaling or a field, media access control dedicated signaling or a field, or physical layer dedicated signaling or a field.

In another implementation manner of this embodiment of the present invention, the spreading resource configuration is used to configure sizes of a first field and a second field, where the first field is used to indicate a length of a spread spectrum sequence and an index of the spread spectrum sequence, the second field is used to indicate a modulation and coding scheme, sums of sizes that are of the first field and the second field and that are configured by using spreading resource configurations are the same, and sizes of the first field that are configured by using the spreading resource configurations are different.

In another implementation manner of this embodiment of the present invention, when the first resource configuration includes the spreading resource configuration, the performing information transmission with a base station by using the resource includes:

performing information transmission by using a spread spectrum sequence resource determined by using the first field and the second field.

In another implementation manner of this embodiment of the present invention, the spreading resource configuration includes a third field used to indicate a length of a spread spectrum sequence, an index of the spread spectrum sequence, and a modulation and coding scheme.

In another implementation manner of this embodiment of the present invention, when the first resource configuration includes the spreading resource configuration, the performing information transmission with a base station by using the resource includes:

performing information transmission by using a spread spectrum sequence resource determined by using the third field.

In another implementation manner of this embodiment of the present invention, when the first resource configuration includes the spreading resource configuration and the random access preamble format configuration, the performing information transmission with a base station by using the resource includes:

generating a random access preamble by using a random access preamble format determined by using the random access preamble format configuration;

spreading the random access preamble according to a spread spectrum sequence resource determined by using the spreading resource configuration; and transmitting the random access preamble that has been spread.

In another implementation manner of this embodiment of the present invention, when the first resource configuration includes at least one of the spreading resource configuration, the narrowband resource configuration, and the frequency hopping pattern configuration, the performing information transmission with a base station by using the resource includes:

spreading or despreading, by using a spread spectrum sequence resource determined by using the spreading resource configuration, information on a resource determined by using at least one of a narrowband resource and a frequency hopping pattern that are determined by using the at least one of the narrowband resource configuration and the frequency hopping pattern configuration.

In another implementation manner of this embodiment of the present invention, the method further includes:

determining the correspondence between a characteristic parameter and a resource configuration by using broadcast or multicast signaling.

In another implementation manner of this embodiment of the present invention, the broadcast or multicast signaling is:

a master system information block, a system information block, Radio Resource Control signaling, Media Access Control signaling, or physical layer signaling.

In another implementation manner of this embodiment of the present invention, the correspondence between a characteristic parameter and a resource configuration is predefined.

According to another aspect, an embodiment of the present invention further provides a base station, where the base station includes:

a first determining module, configured to determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a second determining module, configured to: determine, according to a correspondence between a characteristic parameter and a resource configuration, a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and a first transmission module, configured to: determine a resource according to the first resource configuration, and perform information transmission with the user equipment by using the resource.

In an implementation manner of this embodiment of the present invention, in the correspondence between a characteristic parameter and a resource configuration, each characteristic parameter in a same type of characteristic parameter corresponds to one resource configuration, and resource configurations corresponding to the characteristic parameters are different.

In another implementation manner of this embodiment of the present invention, each type of the sub-configuration in the first resource configuration includes one or more sub-configurations.

In another implementation manner of this embodiment of the present invention, the first transmission module includes:

a first determining unit, configured to: when a type of sub-configuration in the first resource configuration includes multiple sub-configurations, determine one sub-configuration from the multiple sub-configurations according to a predefined function relationship, and determine the resource by using the determined sub-configuration; or determine the resource by using a default resource configuration in the multiple sub-configurations.

In another implementation manner of this embodiment of the present invention, the first transmission module further includes:

a sending unit, configured to notify the user equipment of the first resource configuration, the determined sub-configuration, or the default resource configuration by using dedicated signaling or a field.

In another implementation manner of this embodiment of the present invention, the dedicated signaling or the field is:

radio resource control dedicated signaling or a field, media access control dedicated signaling or a field, or physical layer dedicated signaling or a field.

In another implementation manner of this embodiment of the present invention, the spreading resource configuration is used to configure sizes of a first field and a second field, where the first field is used to indicate a length of a spread spectrum sequence and an index of the spread spectrum sequence, the second field is used to indicate a modulation and coding scheme, sums of sizes that are of the first field and the second field and that are configured by using spreading resource configurations are the same, and sizes of the first field that are configured by using the spreading resource configurations are different.

In another implementation manner of this embodiment of the present invention, the first transmission module is configured to: when the first resource configuration includes the spreading resource configuration, perform information transmission by using a spread spectrum sequence resource determined by using the first field and the second field.

In another implementation manner of this embodiment of the present invention, the spreading resource configuration includes a third field used to indicate a length of a spread spectrum sequence, an index of the spread spectrum sequence, and a modulation and coding scheme.

In another implementation manner of this embodiment of the present invention, the first transmission module is configured to: when the first resource configuration includes the spreading resource configuration, perform information transmission by using a spread spectrum sequence resource determined by using the third field.

In another implementation manner of this embodiment of the present invention, the first transmission module is configured to: when the first resource configuration includes the spreading resource configuration and the random access preamble format configuration, despread a random access preamble according to a spread spectrum sequence resource determined by using the spreading resource configuration; and detect the random access preamble according to a random access preamble format determined by using the random access preamble format configuration.

In another implementation manner of this embodiment of the present invention, the first transmission module is configured to: when the first resource configuration includes at least one of the spreading resource configuration, the narrowband resource configuration, and the frequency hopping pattern configuration, spread or despread, by using a spread spectrum sequence resource determined by using the spreading resource configuration, information on a resource determined by using at least one of a narrowband resource and a frequency hopping pattern that are determined by using the at least one of the narrowband resource configuration and the frequency hopping pattern configuration.

In another implementation manner of this embodiment of the present invention, the base station further includes:

a notifying module, configured to notify the user equipment of the correspondence between a characteristic parameter and a resource configuration by using broadcast or multicast signaling.

In another implementation manner of this embodiment of the present invention, the broadcast or multicast signaling is:

a master system information block, a system information block, Radio Resource Control signaling, Media Access Control signaling, or physical layer signaling.

In another implementation manner of this embodiment of the present invention, the correspondence between a characteristic parameter and a resource configuration is predefined.

According to another aspect, an embodiment of the present invention further provides a base station, where the base station includes: a first processor and a first memory, where the first memory is configured to store a program, and the first processor is configured to execute the program, so as to:

determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

determine, according to a correspondence between a characteristic parameter and a resource configuration, a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and determine a resource according to the first resource configuration, and perform information transmission with the user equipment by using the resource.

In an implementation manner of this embodiment of the present invention, in the correspondence between a characteristic parameter and a resource configuration, each characteristic parameter in a same type of characteristic parameter corresponds to one resource configuration, and resource configurations corresponding to the characteristic parameters are different.

In another implementation manner of this embodiment of the present invention, each type of the sub-configuration in the first resource configuration includes one or more sub-configurations.

In another implementation manner of this embodiment of the present invention, the first processor is further configured to:

when a type of sub-configuration in the first resource configuration includes multiple sub-configurations, determine one sub-configuration from the multiple sub-configurations according to a predefined function relationship, and determine the resource by using the determined sub-configuration; or determine the resource by using a default resource configuration in the multiple sub-configurations.

In another implementation manner of this embodiment of the present invention, the first processor is further configured to:

notify the user equipment of the first resource configuration, the determined sub-configuration, or the default resource configuration by using dedicated signaling or a field.

In another implementation manner of this embodiment of the present invention, the dedicated signaling or the field is:

radio resource control dedicated signaling or a field, media access control dedicated signaling or a field, or physical layer dedicated signaling or a field.

In another implementation manner of this embodiment of the present invention, the spreading resource configuration is used to configure sizes of a first field and a second field, where the first field is used to indicate a length of a spread spectrum sequence and an index of the spread spectrum sequence, the second field is used to indicate a modulation and coding scheme, sums of sizes that are of the first field and the second field and that are configured by using spreading resource configurations are the same, and sizes of the first field that are configured by using the spreading resource configurations are different.

In another implementation manner of this embodiment of the present invention, the first processor is further configured to:

when the first resource configuration includes the spreading resource configuration, perform information transmission by using a spread spectrum sequence resource determined by using the first field and the second field.

In another implementation manner of this embodiment of the present invention, the spreading resource configuration includes a third field used to indicate a length of a spread spectrum sequence, an index of the spread spectrum sequence, and a modulation and coding scheme.

In another implementation manner of this embodiment of the present invention, the first processor is further configured to:

when the first resource configuration includes the spreading resource configuration, perform information transmission by using a spread spectrum sequence resource determined by using the third field.

In another implementation manner of this embodiment of the present invention, the first processor is further configured to:

when the first resource configuration includes the spreading resource configuration and the random access preamble format configuration, despread a random access preamble according to a spread spectrum sequence resource determined by using the spreading resource configuration; and detect the random access preamble according to a random access preamble format determined by using the random access preamble format configuration.

In another implementation manner of this embodiment of the present invention, the first processor is further configured to:

when the first resource configuration includes at least one of the spreading resource configuration, the narrowband resource configuration, and the frequency hopping pattern configuration, spread or despread, by using a spread spectrum sequence resource determined by using the spreading resource configuration, information on a resource determined by using at least one of a narrowband resource and a frequency hopping pattern that are determined by using the at least one of the narrowband resource configuration and the frequency hopping pattern configuration.

In another implementation manner of this embodiment of the present invention, the first processor is further configured to:

notify the user equipment of the correspondence between a characteristic parameter and a resource configuration by using broadcast or multicast signaling.

In another implementation manner of this embodiment of the present invention, the broadcast or multicast signaling is:

a master system information block, a system information block, Radio Resource Control signaling, Media Access Control signaling, or physical layer signaling.

In another implementation manner of this embodiment of the present invention, the correspondence between a characteristic parameter and a resource configuration is predefined.

According to another aspect, an embodiment of the present invention further provides user equipment, where the user equipment includes:

a third determining module, configured to determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a fourth determining module, configured to: determine a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and a second transmission module, configured to: determine a resource according to the first resource configuration, and perform information transmission with a base station by using the resource.

In an implementation manner of this embodiment of the present invention, the fourth determining module is configured to: determine, according to a correspondence between a characteristic parameter and a resource configuration, the resource configuration corresponding to the characteristic parameter of the user equipment, and use the resource configuration corresponding to the characteristic parameter of the user equipment as the first resource configuration; or send the characteristic parameter of the user equipment to the base station, receive the resource configuration that is corresponding to the characteristic parameter of the user equipment and that is sent by the base station, and use the resource configuration that is corresponding to the characteristic parameter of the user equipment and that is sent by the base station as the first resource configuration.

In another implementation manner of this embodiment of the present invention, in the correspondence between a characteristic parameter and a resource configuration, each characteristic parameter in a same type of characteristic parameter corresponds to one resource configuration, and resource configurations corresponding to the characteristic parameters are different.

In another implementation manner of this embodiment of the present invention, each type of the sub-configuration in the first resource configuration includes one or more sub-configurations.

In another implementation manner of this embodiment of the present invention, the second transmission module includes:

a second determining unit, configured to: when a type of sub-configuration in the first resource configuration includes multiple sub-configurations, determine one sub-configuration from the multiple sub-configurations according to a predefined function relationship, and determine the resource by using the determined sub-configuration.

In another implementation manner of this embodiment of the present invention, the second transmission module further includes: a receiving unit, configured to receive dedicated signaling or a field that carries the resource configuration; and the second determining unit is further configured to: when a type of sub-configuration in the first resource configuration includes multiple sub-configurations, determine one sub-configuration from the multiple sub-configurations according to the dedicated signaling or the field, and determine the resource by using the determined sub-configuration.

In another implementation manner of this embodiment of the present invention, the dedicated signaling or the field is:

radio resource control dedicated signaling or a field, media access control dedicated signaling or a field, or physical layer dedicated signaling or a field.

In another implementation manner of this embodiment of the present invention, the spreading resource configuration is used to configure sizes of a first field and a second field, where the first field is used to indicate a length of a spread spectrum sequence and an index of the spread spectrum sequence, the second field is used to indicate a modulation and coding scheme, sums of sizes that are of the first field and the second field and that are configured by using spreading resource configurations are the same, and sizes of the first field that are configured by using the spreading resource configurations are different.

In another implementation manner of this embodiment of the present invention, the second transmission module is configured to: when the first resource configuration includes the spreading resource configuration, perform information transmission by using a spread spectrum sequence resource determined by using the first field and the second field.

In another implementation manner of this embodiment of the present invention, the spreading resource configuration includes a third field used to indicate a length of a spread spectrum sequence, an index of the spread spectrum sequence, and a modulation and coding scheme.

In another implementation manner of this embodiment of the present invention, the second transmission module is configured to: when the first resource configuration includes the spreading resource configuration, perform information transmission by using a spread spectrum sequence resource determined by using the third field.

In another implementation manner of this embodiment of the present invention, the second transmission module is configured to: when the first resource configuration includes the spreading resource configuration and the random access preamble format configuration, generate a random access preamble by using a random access preamble format determined by using the random access preamble format configuration;

spread the random access preamble according to a spread spectrum sequence resource determined by using the spreading resource configuration; and transmit the random access preamble that has been spread.

In another implementation manner of this embodiment of the present invention, the second transmission module is configured to: when the first resource configuration includes at least one of the spreading resource configuration, the narrowband resource configuration, and the frequency hopping pattern configuration, spread or despread, by using a spread spectrum sequence resource determined by using the spreading resource configuration, information on a resource determined by using at least one of a narrowband resource and a frequency hopping pattern that are determined by using the at least one of the narrowband resource configuration and the frequency hopping pattern configuration.

In another implementation manner of this embodiment of the present invention, the user equipment further includes:

a processing module, configured to determine the correspondence between a characteristic parameter and a resource configuration by using broadcast or multicast signaling.

In another implementation manner of this embodiment of the present invention, the broadcast or multicast signaling is:

a master system information block, a system information block, Radio Resource Control signaling, Media Access Control signaling, or physical layer signaling.

In another implementation manner of this embodiment of the present invention, the correspondence between a characteristic parameter and a resource configuration is predefined.

According to another aspect, an embodiment of the present invention further provides user equipment, where the user equipment includes: a second processor and a second memory, where the second memory is configured to store a program, and the second processor is configured to execute the program, so as to:

determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

determine a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and determine a resource according to the first resource configuration, and perform information transmission with a base station by using the resource.

In an implementation manner of this embodiment of the present invention, the second processor is further configured to:

determine, according to a correspondence between a characteristic parameter and a resource configuration, the resource configuration corresponding to the characteristic parameter of the user equipment, and use the resource configuration corresponding to the characteristic parameter of the user equipment as the first resource configuration; or send the characteristic parameter of the user equipment to the base station, receive the resource configuration that is corresponding to the characteristic parameter of the user equipment and that is sent by the base station, and use the resource configuration that is corresponding to the characteristic parameter of the user equipment and that is sent by the base station as the first resource configuration.

In another implementation manner of this embodiment of the present invention, in the correspondence between a characteristic parameter and a resource configuration, each characteristic parameter in a same type of characteristic parameter corresponds to one resource configuration, and resource configurations corresponding to the characteristic parameters are different.

In another implementation manner of this embodiment of the present invention, each type of the sub-configuration in the first resource configuration includes one or more sub-configurations.

In another implementation manner of this embodiment of the present invention, the second processor is further configured to:

when a type of sub-configuration in the first resource configuration includes multiple sub-configurations, determine one sub-configuration from the multiple sub-configurations according to a predefined function relationship, and determine the resource by using the determined sub-configuration.

In another implementation manner of this embodiment of the present invention, the second processor is further configured to:

receive dedicated signaling or a field that carries the resource configuration; and when a type of sub-configuration in the first resource configuration includes multiple sub-configurations, determine one sub-configuration from the multiple sub-configurations according to the dedicated signaling or the field, and determine the resource by using the determined sub-configuration.

In another implementation manner of this embodiment of the present invention, the dedicated signaling or the field is:

radio resource control dedicated signaling or a field, media access control dedicated signaling or a field, or physical layer dedicated signaling or a field.

In another implementation manner of this embodiment of the present invention, the spreading resource configuration is used to configure sizes of a first field and a second field, where the first field is used to indicate a length of a spread spectrum sequence and an index of the spread spectrum sequence, the second field is used to indicate a modulation and coding scheme, sums of sizes that are of the first field and the second field and that are configured by using spreading resource configurations are the same, and sizes of the first field that are configured by using the spreading resource configurations are different.

In another implementation manner of this embodiment of the present invention, the second processor is further configured to:

when the first resource configuration includes the spreading resource configuration, perform information transmission by using a spread spectrum sequence resource determined by using the first field and the second field.

In another implementation manner of this embodiment of the present invention, the spreading resource configuration includes a third field used to indicate a length of a spread spectrum sequence, an index of the spread spectrum sequence, and a modulation and coding scheme.

In another implementation manner of this embodiment of the present invention, the second processor is further configured to:

when the first resource configuration includes the spreading resource configuration, perform information transmission by using a spread spectrum sequence resource determined by using the third field.

In another implementation manner of this embodiment of the present invention, the second processor is further configured to:

when the first resource configuration includes the spreading resource configuration and the random access preamble format configuration, generate a random access preamble by using a random access preamble format determined by using the random access preamble format configuration;

spread the random access preamble according to a spread spectrum sequence resource determined by using the spreading resource configuration; and transmit the random access preamble that has been spread.

In another implementation manner of this embodiment of the present invention, the second processor is further configured to:

when the first resource configuration includes at least one of the spreading resource configuration, the narrowband resource configuration, and the frequency hopping pattern configuration, spread or despread, by using a spread spectrum sequence resource determined by using the spreading resource configuration, information on a resource determined by using at least one of a narrowband resource and a frequency hopping pattern that are determined by using the at least one of the narrowband resource configuration and the frequency hopping pattern configuration.

In another implementation manner of this embodiment of the present invention, the second processor is further configured to:

determine the correspondence between a characteristic parameter and a resource configuration by using broadcast or multicast signaling.

In another implementation manner of this embodiment of the present invention, the broadcast or multicast signaling is:

a master system information block, a system information block, Radio Resource Control signaling, Media Access Control signaling, or physical layer signaling.

In another implementation manner of this embodiment of the present invention, the correspondence between a characteristic parameter and a resource configuration is predefined.

According to another aspect, an embodiment of the present invention further provides a communications system, where the system includes: the foregoing base station and the foregoing user equipment.

Beneficial effects of the technical solutions provided in the embodiments of the present invention are as follows:

A first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Embodiment 1

Figure 1:
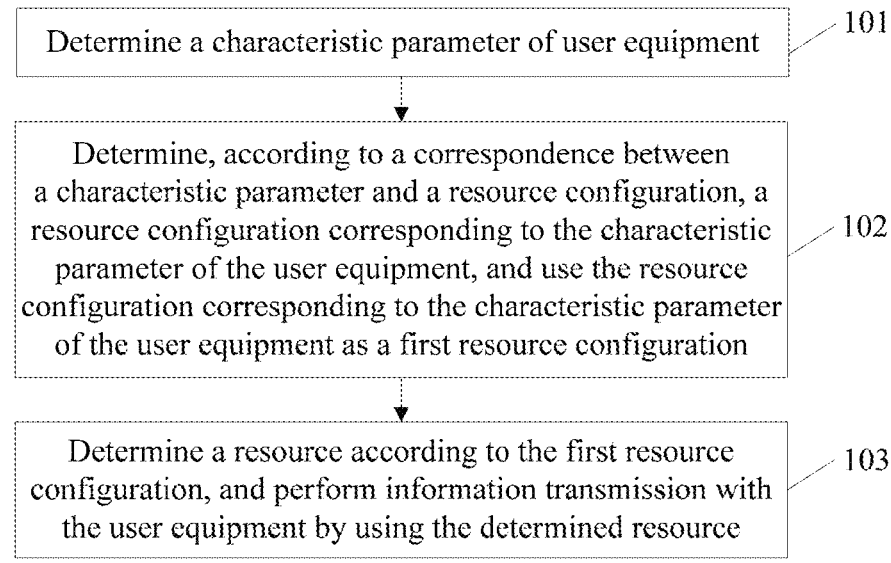
FIG. 1 is a flowchart of an information transmission method according to Embodiment 1 of the present invention.

This embodiment of the present invention provides an information transmission method, where the method may be executed by a base station. Referring to FIG. 1, the method includes the following steps:

Step 101: Determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

Step 102: Determine, according to a correspondence between a characteristic parameter and a resource configuration, a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration.

Specifically, the foregoing correspondence between a characteristic parameter and a resource configuration may be preconfigured on the base station.

In specific implementation, in the correspondence between a characteristic parameter and a resource configuration, each characteristic parameter in a same type of characteristic parameter corresponds to one resource configuration, and resource configurations corresponding to the characteristic parameters are different.

The foregoing correspondence includes one or more of a correspondence between a characteristic parameter and a spreading resource configuration, a correspondence between a characteristic parameter and a random access preamble format configuration, a correspondence between a characteristic parameter and a narrowband resource configuration, and a correspondence between a characteristic parameter and a frequency hopping pattern configuration.

Specifically, the correspondence between a characteristic parameter and a resource configuration may include the following cases:

1. In the correspondence, the characteristic parameter includes one type of characteristic parameter, and the type of characteristic parameter corresponds to one type of sub-configuration (see Embodiments 3 and 4). For example, the characteristic parameter is a path loss range, the sub-configuration is a spreading resource configuration, and one path loss range corresponds to one or more spreading resource configurations.

2. In the correspondence, the characteristic parameter includes one type of characteristic parameter, and the type of characteristic parameter corresponds to at least two types of sub-configurations (see Embodiments 5 and 6). For example, the characteristic parameter is a path loss range, the sub-configuration is a spreading resource configuration, and one path loss range corresponds to one or more spreading resource configurations and one or more random access preamble format configurations.

3. In the correspondence, the characteristic parameter includes at least two types of characteristic parameters, and the two types of characteristic parameters correspond to one type of sub-configuration. For example, the characteristic parameter includes a path loss range and reference signal received quality, the sub-configuration is a spreading resource configuration, one path loss range corresponds to one or more spreading resource configurations, and reference signal received quality corresponds to one or more spreading resource configurations.

4. In the correspondence, the characteristic parameter includes at least two types of characteristic parameters, and the two types of characteristic parameters correspond to at least two types of sub-configurations. For example, the characteristic parameter includes a path loss range and reference signal received quality, the sub-configuration includes a spreading resource configuration and a random access preamble format configuration, one path loss range corresponds to one or more spreading resource configurations, and reference signal received quality corresponds to one or more random access preamble format configurations.

Correspondingly, the first resource configuration corresponding to the characteristic parameter of the user equipment may include the following cases:

The first resource configuration includes one type of sub-configuration, and the type of sub-configuration includes one sub-configuration.

The first resource configuration includes multiple types of sub-configurations, and each type of sub-configuration includes one sub-configuration.

The first resource configuration includes one type of sub-configuration, and the type of sub-configuration includes multiple sub-configurations.

The first resource configuration includes multiple types of sub-configurations, and each type of sub-configuration includes multiple sub-configurations.

The first resource configuration includes multiple types of sub-configurations, and at least one type of sub-configuration includes multiple sub-configurations, but not every type of sub-configuration includes multiple sub-configurations.

In conclusion, each type of sub-configuration in the foregoing first resource configuration may include one or more sub-configurations.

Step 103: Determine a resource according to the first resource configuration, and perform information transmission with the user equipment by using the determined resource.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 2

Figure 2:
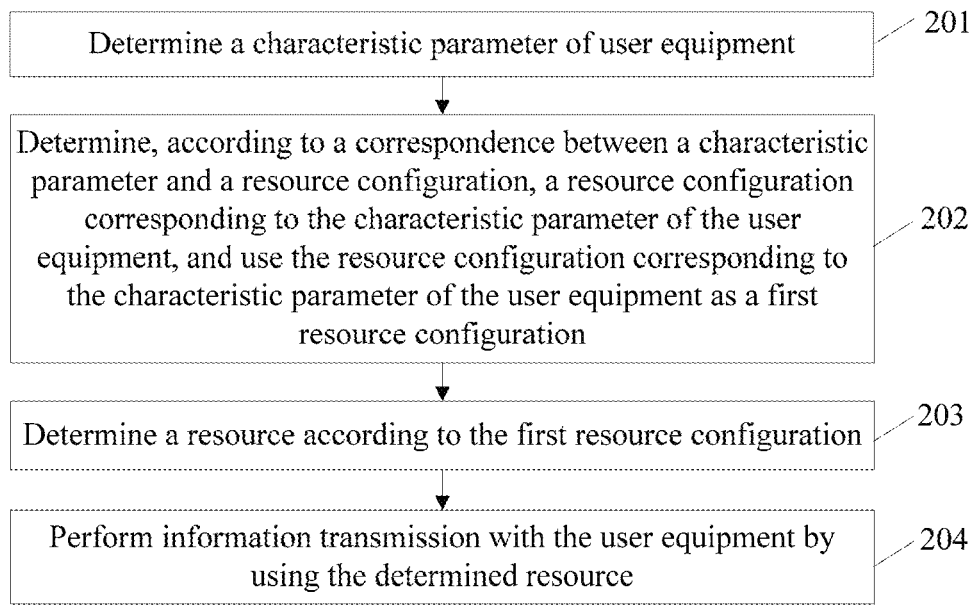
FIG. 2 is a flowchart of an information transmission method according to Embodiment 2 of the present invention.

This embodiment of the present invention provides an information transmission method, where the method may be executed by a base station. Referring to FIG. 2, the method includes the following steps:

Step 201: Determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

The characteristic parameter of the user equipment is sent by the user equipment to the base station.

Step 202: Determine, according to a correspondence between a characteristic parameter and a resource configuration, a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration.

Specifically, the foregoing correspondence between a characteristic parameter and a resource configuration may be preconfigured on the base station.

In specific implementation, in the correspondence between a characteristic parameter and a resource configuration, each characteristic parameter in a same type of characteristic parameter corresponds to one resource configuration, and resource configurations corresponding to the characteristic parameters are different.

The foregoing correspondence includes one or more of a correspondence between a characteristic parameter and a spreading resource configuration, a correspondence between a characteristic parameter and a random access preamble format configuration, a correspondence between a characteristic parameter and a narrowband resource configuration, and a correspondence between a characteristic parameter and a frequency hopping pattern configuration.

Specifically, the correspondence between a characteristic parameter and a resource configuration may include the following cases:

1. In the correspondence, the characteristic parameter includes one type of characteristic parameter, and the type of characteristic parameter corresponds to one type of sub-configuration (see Embodiments 3 and 4). For example, the characteristic parameter is a path loss range, the sub-configuration is a spreading resource configuration, and one path loss range corresponds to one or more spreading resource configurations.

2. In the correspondence, the characteristic parameter includes one type of characteristic parameter, and the type of characteristic parameter corresponds to at least two types of sub-configurations (see Embodiments 5 and 6). For example, the characteristic parameter is a path loss range, the sub-configuration is a spreading resource configuration, and one path loss range corresponds to one or more spreading resource configurations and one or more random access preamble format configurations.

3. In the correspondence, the characteristic parameter includes at least two types of characteristic parameters, and the two types of characteristic parameters correspond to one type of sub-configuration. For example, the characteristic parameter includes a path loss range and reference signal received quality, the sub-configuration is a spreading resource configuration, one path loss range corresponds to one or more spreading resource configurations, and reference signal received quality corresponds to one or more spreading resource configurations.

4. In the correspondence, the characteristic parameter includes at least two types of characteristic parameters, and the two types of characteristic parameters correspond to at least two types of sub-configurations. For example, the characteristic parameter includes a path loss range and reference signal received quality, the sub-configuration includes a spreading resource configuration and a random access preamble format configuration, one path loss range corresponds to one or more spreading resource configurations, and reference signal received quality corresponds to one or more random access preamble format configurations.

Correspondingly, the first resource configuration corresponding to the characteristic parameter of the user equipment may include the following cases:

The first resource configuration includes one type of sub-configuration, and the type of sub-configuration includes one sub-configuration.

The first resource configuration includes multiple types of sub-configurations, and each type of sub-configuration includes one sub-configuration.

The first resource configuration includes one type of sub-configuration, and the type of sub-configuration includes multiple sub-configurations.

The first resource configuration includes multiple types of sub-configurations, and each type of sub-configuration includes multiple sub-configurations.

The first resource configuration includes multiple types of sub-configurations, and at least one type of sub-configuration includes multiple sub-configurations, but not every type of sub-configuration includes multiple sub-configurations.

In conclusion, each type of sub-configuration in the foregoing first resource configuration may include one or more sub-configurations.

Further, the method further includes: notifying the user equipment of the correspondence between a characteristic parameter and a resource configuration by using broadcast or multicast signaling. The broadcast or multicast signaling is: a master information block (MIB), a system information block (SIB), Radio Resource Control signaling, Media Access Control signaling, or physical layer signaling.

Optionally, after step 202, the method may further include:

notifying the user equipment of the first resource configuration by using dedicated signaling or a field.

In specific implementation, the dedicated signaling or the field is:

Radio Resource Control (RRC) dedicated signaling or a field, Media Access Control (MAC) dedicated signaling or a field, or physical layer dedicated signaling or a field.

Step 203: Determine a resource according to the first resource configuration.

As described above, each type of sub-configuration in the first resource configuration may include one sub-configuration or multiple sub-configurations. When a type of sub-configuration in the first resource configuration includes multiple sub-configurations, step 203 includes:

determining one sub-configuration from the multiple sub-configurations in the type of sub-configuration according to a predefined function relationship, and determining the resource by using the determined sub-configuration; or determining the resource by using a default resource configuration in the multiple sub-configurations in the type of sub-configuration.

Optionally, after the one sub-configuration is determined from the multiple sub-configurations or the default resource configuration is determined, the method may further include:

notifying the user equipment of the determined sub-configuration or the determined default resource configuration by using dedicated signaling or a field.

In specific implementation, the dedicated signaling or the field is: RRC dedicated signaling or a field, MAC dedicated signaling or a field, or physical layer dedicated signaling or a field.

Specifically, the RRC dedicated signaling or the field may be a random access contention resolution message (Message 4, "Msg4" for short). For example, the base station adds one or two new fields to the Msg4 to carry the determined sub-configuration or the default resource configuration.

The physical layer dedicated signaling or the field may be a physical downlink control channel (PDCCH) or an enhanced physical downlink control channel (EPDCCH). For example, the base station adds one or two new fields to downlink control information (DCI) to carry the determined resource configuration. Certainly, if there is a redundant bit or redundant state in the DCI, the redundant bit or the redundant state may also be used to carry the determined sub-configuration or the default resource configuration.

The MAC dedicated signaling or the field may be a MAC control element (CE). For example, the base station defines one or two new MAC CEs to carry the determined sub-configuration or the default resource configuration.

Correspondingly, the user equipment detects the physical layer dedicated signaling or the field, or the RRC dedicated signaling or the field, or the MAC dedicated signaling or the field to obtain the determined sub-configuration or the default resource configuration, and determines the resource according to the first resource configuration, the determined sub-configuration, or the default resource configuration to perform information transmission.

Step 204: Perform information transmission with the user equipment by using the determined resource.

The foregoing transmission may be sending, or may be receiving. Information to be transmitted may be a common message, a dedicated message, control information, a signal, a sequence, or the like. For example, the common message may be a random access response message, a paging message, system information, or a physical broadcast channel. The dedicated message may be dedicated downlink data or uplink data. The control information may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 3

Figure 3:
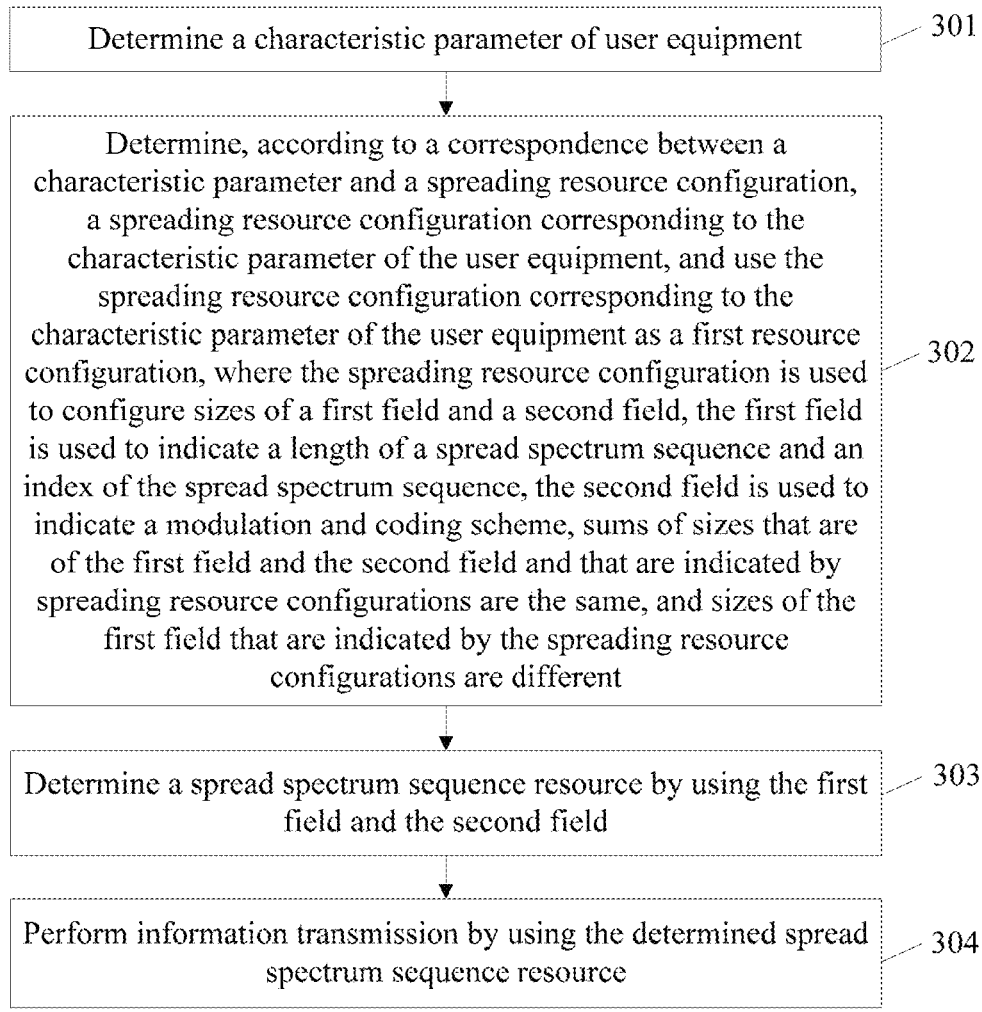
FIG. 3 is a flowchart of an information transmission method according to Embodiment 3 of the present invention.

This embodiment of the present invention provides an information transmission method, where the method may be executed by a base station. In this embodiment, a correspondence between a characteristic parameter and a resource configuration includes a correspondence between a characteristic parameter and a spreading resource configuration. A first resource configuration includes one type of sub-configuration, and the type of sub-configuration is a spreading resource configuration. Referring to FIG. 3, the method includes the following steps:

Step 301: Determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

The characteristic parameter of the user equipment is sent by the user equipment to the base station.

Step 302: Determine, according to the correspondence between a characteristic parameter and a spreading resource configuration, a spreading resource configuration corresponding to the characteristic parameter of the user equipment, and use the spreading resource configuration corresponding to the characteristic parameter of the user equipment as the first resource configuration, where the spreading resource configuration is used to configure sizes of a first field and a second field, the first field is used to indicate a length of a spread spectrum sequence and an index of the spread spectrum sequence, the second field is used to indicate a modulation and coding scheme, sums of sizes that are of the first field and the second field and that are indicated by spreading resource configurations are the same, and sizes of the first field that are indicated by the spreading resource configurations are different.

For example, the size of the first field is s bits, and the size of the second field is m bits. It is assumed that k=s+m, where s and m are positive integers. That is, s bits (the first field) are used to indicate at least one of the following information: the length of the spread spectrum sequence and the index of the spread spectrum sequence, and m bits (the second field) are used to indicate the modulation and coding scheme. Values of k that are corresponding to different characteristic parameters of the user equipment are the same, and values of s that are corresponding to the different characteristic parameters of the user equipment are different (values of m are also different). For the user equipment, when a coverage enhancement value required by the user equipment is relatively large, performance may be improved by using a relatively long spread spectrum sequence (a relatively large value of s) and a limited lower order modulation and coding (a relatively small value of m) scheme; when a coverage enhancement value required by the user equipment is relatively small, different transmission requirements of service types may be supported by using a relatively short spread spectrum sequence (a relatively small value of s) and a relatively large amount of modulation and coding (a relatively large value of m).

The correspondence between a characteristic parameter and a spreading resource configuration may be predefined in a system or a standard. The correspondence between a characteristic parameter and a spreading resource configuration may be specified in the following forms: specified by using a table, specified by using a function relationship, or directly described by using texts.

The following describes in detail the foregoing forms in which the correspondence between a characteristic parameter and a spreading resource configuration is specified.

1. The correspondence between a characteristic parameter and a spreading resource configuration is defined by using a table. As listed in Table 1, the system groups characteristic parameters (for example, path loss ranges) into three characteristic parameters, k=8, and values of s and m in spreading resource configurations corresponding to different characteristic parameters are different. Certainly, the following table is merely used as an example, and the correspondence between a characteristic parameter and a spreading resource configuration may be determined according to at least one of the following requirements: a service requirement of a user and a requirement of the system.

TABLE 1

| Characteristic parameter | Spreading resource configuration |
| --- | --- |
| 1 | s = 6, m = 2 |
| 2 | s = 4, m = 4 |
| 3 | s = 2, m = 6 |

In Table 1, characteristic parameter 1 is used for description, a spreading resource configuration (s=6, m=2) corresponding to the characteristic parameter 1 includes 8 bits, where 6 bits indicate at least one of the following information: a length of a spread spectrum sequence and an index of the spread spectrum sequence; and 2 bits indicate a modulation and coding scheme. In specific implementation, 6 bits may take the form listed in Table 2, and 2 bits may take the form listed in Table 3.

TABLE 2

| S bits (s = 6) | Length of a spread spectrum sequence and index of the spread spectrum sequence |
| --- | --- |
| 000000 | SF = 64, SI = 0 |
| 000001 | SF = 64, SI = 1 |
| ... | ... |
| 111111 | SF = 64, SI = 63 |

TABLE 3

| m bits (m = 6) | Index of a modulation and coding scheme |
| --- | --- |
| 00 | Imcs = 0 |
| 01 | Imcs = 1 |
| 10 | Imcs = 2 |
| 11 | Imcs = 3 |

In Table 2, SF (Spreading Factor) is a spreading factor used to represent a length of the spread spectrum sequence, and SI (Spreading Index) represents an index of the spread spectrum sequence. Generally, a quantity of orthogonal sequences whose lengths are a value of SF is the value of SF, and SI is used to indicate a sequence in the SF orthogonal sequences whose lengths are SF. Certainly, sequences may be quasi-orthogonal, a quantity of sequences whose lengths are SF may be greater than a value of SF, and in this case, SI may still indicate the index of the sequence. In Table 3, Imcs represents an index of an MCS (modulation and coding scheme). Each MCS includes at least one of a modulation order and an encoding rate (the encoding rate may be implicitly obtained through calculation according to a size of a transport block).

In Table 2, sequence lengths SF indicated by different states (for example, 000000, 000001, and the like in Table 2) of s bits are the same; in this case, Table 2 may include only indications of indexes of the spread spectrum sequence and exclude SF. In this case, the length of the spread spectrum sequence is equal to $2^s$ by default and is preconfigured on the base station. Further, sequence lengths SF indicated by the different states of the s bits may also be different.

It should be noted that, the foregoing two tables are merely used as examples to describe that s bits indicate at least one of the following information: a length of a spread spectrum sequence and an index of the spread spectrum sequence; and m bits indicate an MCS.

2. The correspondence between a characteristic parameter and a spreading resource configuration is defined by using a function relationship. For example, a characteristic parameter index corresponding to a spreading resource configuration is obtained according to at least one of a spreading resource configuration index, an identifier of the UE, and a common system parameter. Alternatively, a spreading resource configuration index corresponding to a characteristic parameter may be obtained according to at least one of a characteristic parameter index, an identifier of the UE, and a common system parameter.

For example, a spreading resource configuration index is used as an example, and a function relationship between a characteristic parameter and one or more spreading resource configurations is:

(Spreading resource configuration index×Constant $N$)mod $M$=Characteristic parameter index.

Herein, constant N is a fixed value or a value configured by the system, M is a total quantity of characteristic parameters, and mod is a modulo operation. According to the foregoing function relationship, it is assumed that there are eight spreading resource configurations in total, eight spreading resource configuration indexes are respectively 0, 1, 2, 3, 4, 5, 6, and 7, and N=4 and M=3; in this case, it may be obtained that:

Spreading resource configurations corresponding to characteristic parameter 1 (that is, characteristic parameter index 0) are: spreading resource configuration 1 (spreading resource configuration index 0), spreading resource configuration 4 (spreading resource configuration index 3), and spreading resource configuration 7 (spreading resource configuration index 6).

Spreading resource configurations corresponding to characteristic parameter 2 (that is, characteristic parameter index 1) are: spreading resource configuration 2 (spreading resource configuration index 1), spreading resource configuration 5 (spreading resource configuration index 4), and spreading resource configuration 8 (spreading resource configuration index 7).

Spreading resource configurations corresponding to characteristic parameter 3 (that is, characteristic parameter index 2) are: spreading resource configuration 3 (spreading resource configuration index 2) and spreading resource configuration 6 (spreading resource configuration index 5).

Further, the method further includes: notifying the user equipment of the correspondence between a characteristic parameter and a spreading resource configuration by using broadcast or multicast signaling. The broadcast or multicast signaling is: a MIB, a SIB, Radio Resource Control signaling, Media Access Control signaling, or physical layer signaling.

For example, the base station or a network side device configures a correspondence between a characteristic parameter and one or more spreading resource configurations by using signaling or a field. The user equipment learns the correspondence between a characteristic parameter and one or more spreading resource configurations by receiving the signaling or the field. The signaling or the field may be RRC common signaling, or RRC dedicated signaling, or MAC signaling, or a field carried by a physical layer common channel, or a field carried by a physical layer dedicated channel.

For example, a new information element (IE) may be added to the SIB to configure the correspondence between a characteristic parameter and one or more spreading resource configurations. For example, a new IE may be added to SIB2 (System Information Block Type 2) to configure one or more corresponding spreading resource configurations for each characteristic parameter. The following pseudocode configures a correspondence between three characteristic parameters and spreading resource configurations, where the characteristic parameters are specifically path loss values. A path loss value of the user equipment refers to a path loss between the user equipment and the base station (or a network device). Path loss value of the user equipment=Power of sending a signal by the base station−Power of the signal received by the user equipment. The signal in the foregoing formula may be a reference signal, for example, a common reference signal (common reference signal, "CRS" for short).

```
SystemInformationBlockType2 ::= SEQUENCE {
SpreadingResourceConfigMTC ::= SEQUENCE {
Pathloss-range1         {ENUMERATED    {SRC0,
SRC1,SRC2,SRC3,SRC4,SRC5,
SRC6,SRC7}
    Pathloss-range2     {ENUMERATED    {SRC0,
SRC1,SRC2,SRC3,SRC4,SRC5,   Pathloss-range3  {SRC0,
SRC6,SRC7}              {ENUMERATED
SRC1,SRC2,SRC3,SRC4,SRC5,
SRC6,SRC7}
    }
    }
```

The SRS (spreading resource configuration) herein is a propagation resource configuration and represents a spreading resource configuration. Each SRC includes an indication of values of s and m, and SRCn represents a spreading resource configuration (n+1).

Alternatively, the following pseudocode is used to indicate values of s and m that are included in spreading resource configurations corresponding to the characteristic parameters.

```
SystemInformationBlockType2 ::= SEQUENCE {
SpreadingResourceConfigMTC ::= SEQUENCE {
Pathloss-range1 {
ENUMERATED {s0, s1,s2,s3,s4,s5,s6,s7}
ENUMERATED {m0, m1,m2,m3,m4,m5,m6,m7}
}
Pathloss-range2 {
ENUMERATED {s0, s1,s2,s3,s4,s5,s6,s7}
ENUMERATED {m0, m1,m2,m3,m4,m5,m6,m7}
}
Pathloss-range3 {
ENUMERATED {s0, s1,s2,s3,s4,s5,s6,s7}
ENUMERATED {m0, m1,m2,m3,m4,m5,m6,m7}
}
}
}
```

Herein, s0 represents s=1, s1 represents s=2, and sn represents s=n+1; m0 represents m=1, m1 represents m=2, and mn represents m=n+1.

A corresponding spreading resource configuration may further be configured for each characteristic parameter in a bitmap manner. A new IE may be added to SIB2 to configure the corresponding spreading resource configuration for each characteristic parameter in a bitmap manner. The following pseudocode configures another correspondence between three characteristic parameters and spreading resource configurations, where the characteristic parameters are specifically path loss values.

```
SystemInformationBlockType2 ::= SEQUENCE {
SpreadingResourceConfigMTC ::= SEQUENCE {
Pathloss-range1 BIT STRING (SIZE(8))
Pathloss-range2 BIT STRING (SIZE(8))
Pathloss-range3 BIT STRING (SIZE(8))
}
}
```

It is assumed that there are eight spreading resource configurations in total, and each spreading resource configuration indicates values of s and m. In the foregoing pseudocode, a bit string with 8 bits is used to configure a spreading resource configuration for each path loss value, and two states of each bit indicate whether a spreading resource configuration indicated by the bit corresponds to the path loss value. It is assumed that when a state of a bit in the bit string used to configure a spreading resource configuration corresponding to a path loss value is 1, it indicates that the spreading resource configuration indicated by the bit corresponds to the path loss value. For example, for Pathloss-range1, when a state of the bit string with 8 bits is 10010010, it indicates that spreading resource configuration 1, spreading resource configuration 4, and spreading resource configuration 7 correspond to path loss value 1.

Further, after step 302, the method may further include:

notifying the user equipment of the first resource configuration by using dedicated signaling or a field.

In specific implementation, the dedicated signaling or the field is: RRC dedicated signaling or a field, MAC dedicated signaling or a field, or physical layer dedicated signaling or a field.

Step 303: Determine a spread spectrum sequence resource by using the first field and the second field.

Further, when the first resource configuration corresponding to the characteristic parameter of the user equipment in step 302 includes multiple spreading resource configurations, step 303 includes the following steps:

The first step: determine one spreading resource configuration from the multiple spreading resource configurations.

A specific implementation manner of the first step may be the same as that of step 203 in Embodiment 2, and detailed descriptions are omitted herein.

The second step: determine the spread spectrum sequence resource by using the first field and the second field that are configured by using the determined spreading resource configuration.

Optionally, after the determining one spreading resource configuration from the multiple spreading resource configurations, the method may further include:

notifying the user equipment of the determined spreading resource configuration by using dedicated signaling or a field.

In specific implementation, the dedicated signaling or the field is: RRC dedicated signaling or a field, MAC dedicated signaling or a field, or physical layer dedicated signaling or a field.

Step 304: Perform information transmission by using the determined spread spectrum sequence resource.

Specifically, the transmission may be sending or receiving. Information to be transmitted may be a common message, a dedicated message, control information, a signal, a sequence, or the like. Further, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 4

Figure 4:
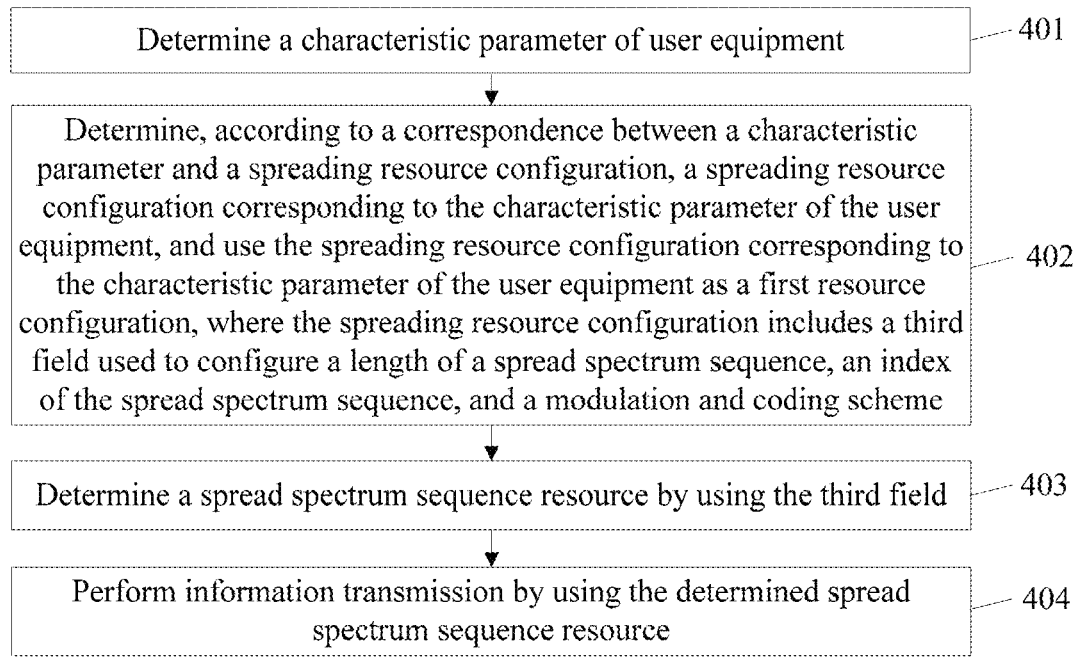
FIG. 4 is a flowchart of an information transmission method according to Embodiment 4 of the present invention.

This embodiment of the present invention provides an information transmission method, where the method may be executed by a base station. In this embodiment, a correspondence between a characteristic parameter and a resource configuration includes a correspondence between a characteristic parameter and a spreading resource configuration. A first resource configuration includes one type of sub-configuration, and the type of sub-configuration is a spreading resource configuration. Referring to FIG. 4, the method includes the following steps:

Step 401: Determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

The characteristic parameter of the user equipment is sent by the user equipment to the base station.

Step 402: Determine, according to the correspondence between a characteristic parameter and a spreading resource configuration, a spreading resource configuration corresponding to the characteristic parameter of the user equipment, and use the spreading resource configuration corresponding to the characteristic parameter of the user equipment as the first resource configuration, where the spreading resource configuration includes a third field used to indicate a length of a spread spectrum sequence, an index of the spread spectrum sequence, and a modulation and coding scheme.

For example, the third field includes L bits used to configure the length of the spread spectrum sequence, the index of the spread spectrum sequence, and the modulation and coding scheme.

The correspondence between a characteristic parameter and a spreading resource configuration may be predefined in a system or a standard. The correspondence between a characteristic parameter and a spreading resource configuration may be specified in the following forms: specified by using a table, specified by using a function relationship, or directly described by using texts.

The following describes in detail the foregoing forms in which the correspondence between a characteristic parameter and a spreading resource configuration is specified.

1. The correspondence between a characteristic parameter and a spreading resource configuration is defined by using a table. For example, Table 4 shows a method in which 3 bits are used to indicate the length of the spread spectrum sequence, the index of the spread spectrum sequence, and the modulation and coding scheme.

TABLE 4

| Bit state of L bits | Length of a spread spectrum sequence, index of the spread spectrum sequence, and index of modulation and coding scheme |
|---|---|
| 000 | SF = 64, SI = 1, $I_{mcs}$ = 0 |
| 001 | SF = 64, SI = 16, $I_{mcs}$ = 0 |
| 010 | SF = 64, SI = 32, $I_{mcs}$ = 0 |
| 011 | SF = 32, SI = 6, $I_{mcs}$ = 2 |
| 100 | SF = 32, SI = 22, $I_{mcs}$ = 1 |
| 101 | SF = 32, SI = 31, $I_{mcs}$ = 0 |
| 110 | SF = 16, SI = 1, $I_{mcs}$ = 2 |
| 111 | SF = 16, SI = 8, $I_{mcs}$ = 3 |

In Table 4, SF represents the length of the spread spectrum sequence, SI represents the index of the spread spectrum sequence, and $I_{mcs}$ represents the index of the modulation and coding scheme.

It should be noted that, Table 4 is merely used as an example for describing that L bits are used to indicate the length of the spread spectrum sequence, the index of the spread spectrum sequence, and the modulation and coding scheme. In an actual application, content in the table may be set according to a requirement.

2. The correspondence between a characteristic parameter and a spreading resource configuration is defined by using a function relationship. For example, a characteristic parameter index corresponding to a spreading resource configuration is obtained according to at least one of a spreading resource configuration index, an identifier of the UE, and a common system parameter. Alternatively, a spreading resource configuration index corresponding to a characteristic parameter may be obtained according to at least one of a characteristic parameter index, an identifier of the UE, and a common system parameter.

Further, the method further includes: notifying the user equipment of the correspondence between a characteristic parameter and a spreading resource configuration by using broadcast or multicast signaling. The broadcast or multicast signaling is: a MIB, a SIB, Radio Resource Control signaling, Media Access Control signaling, or physical layer signaling.

For example, a new IE may be added to RRC dedicated signaling to configure one or more corresponding spreading resource configurations for each characteristic parameter.

Further, after step 402, the method may further include:
notifying the user equipment of the first resource configuration by using dedicated signaling or a field.

In specific implementation, the dedicated signaling or the field is: RRC dedicated signaling or a field, MAC dedicated signaling or a field, or physical layer dedicated signaling or a field.

Step 403: Determine a spread spectrum sequence resource by using the third field.

Further, when the first resource configuration corresponding to the characteristic parameter of the user equipment in step 402 includes multiple spreading resource configurations, step 403 includes the following steps:

The first step: determine one spreading resource configuration from the multiple spreading resource configurations.

A specific implementation manner of the first step may be the same as that of step 203 in Embodiment 2, and detailed descriptions are omitted herein.

The second step: determine the spread spectrum sequence resource by using the third field that is configured by using the determined spreading resource configuration.

Optionally, after the determining one spreading resource configuration from the multiple spreading resource configurations, the method may further include:
notifying the user equipment of the determined spreading resource configuration by using dedicated signaling or a field.

In specific implementation, the dedicated signaling or the field is: RRC dedicated signaling or a field, MAC dedicated signaling or a field, or physical layer dedicated signaling or a field.

Step 404: Perform information transmission by using the determined spread spectrum sequence resource.

Specifically, the transmission may be sending or receiving. Information to be transmitted may be a common message, a dedicated message, control information, a signal, a sequence, or the like. Further, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 5

Figure 5:
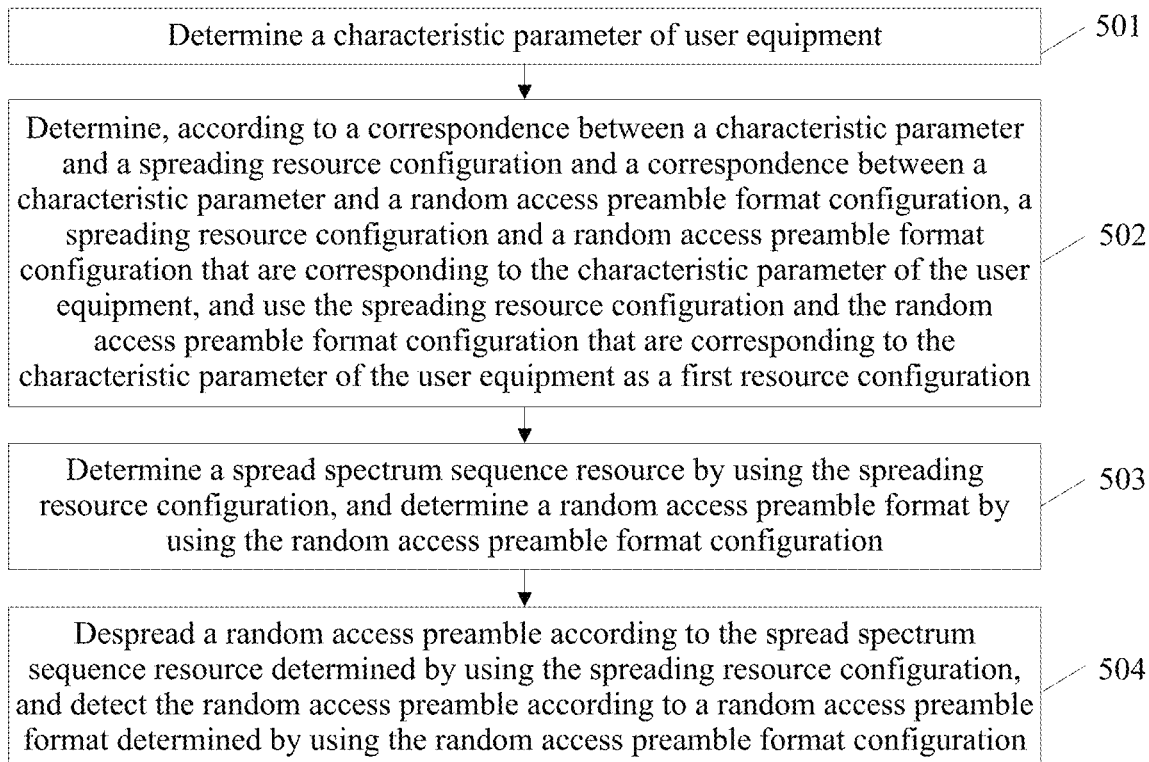
FIG. 5 is a flowchart of an information transmission method according to Embodiment 5 of the present invention.

This embodiment of the present invention provides an information transmission method, where the method may be executed by a base station. In this embodiment, a correspondence between a characteristic parameter and a resource configuration includes a correspondence between a characteristic parameter and a spreading resource configuration and a correspondence between a characteristic parameter and a random access preamble format configuration. A first resource configuration includes two types of sub-configurations, and the two types of sub-configurations are a spreading resource configuration and a random access preamble format configuration. Referring to FIG. 5, the method includes the following steps:

Step 501: Determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

The characteristic parameter of the user equipment is sent by the user equipment to the base station.

Step 502: Determine, according to the correspondence between a characteristic parameter and a spreading resource configuration and the correspondence between a characteristic parameter and a random access preamble format configuration, a spreading resource configuration and a random access preamble format configuration that are corresponding to the characteristic parameter of the user equipment, and use the spreading resource configuration and the random access preamble format configuration that are corresponding to the characteristic parameter of the user equipment as the first resource configuration.

The correspondence between a characteristic parameter and a spreading resource configuration has been described in Embodiments 3 and 4, and details are not described herein again.

The following describes the correspondence between a characteristic parameter and a random access preamble format configuration in this embodiment, and "random access preamble" is called "preamble" for short.

Each characteristic parameter corresponds to one or more preamble format configurations, and preamble format configurations corresponding to different characteristic parameters are different.

A preamble format may reflect repetition times of preamble transmission. For example, the following five preamble formats are defined in an existing Long Term Evolution (LTE)/LTE-Advanced (LTE-A) system, where a preamble taking preamble format 2 needs to be repeatedly sent within two subframes, and a preamble taking preamble format 1 is sent only within one subframe.

Table 5 shows the five preamble formats defined in the LTE/LTE-A system.

TABLE 5

| Preamble format | $T_{CP}$ | $T_{SEQ}$ |
|---|---|---|
| 0 | $3168T_s$ | $24576T_s$ |
| 1 | $21024T_s$ | $24576T_s$ |
| 2 | $6240T_s$ | $2 \cdot 24576T_s$ |
| 3 | $21024T_s$ | $2 \cdot 24576T_s$ |
| 4 | $448T_s$ | $4096T_s$ |

When coverage enhancement or performance enhancement is performed on a preamble in this embodiment, new preamble formats are defined, and the newly defined preamble formats can support repeated transmission of the preamble within more than two subframes.

Referring to Table 6, the newly defined preamble formats are preamble format 5 and preamble format 6. Preamble format 5 is 100 times of preamble format 0 in preamble length, and can support repeated transmission of the preamble within 100 subframes; preamble format 6 is 20 times of preamble format 0 in preamble length, and can support repeated transmission of the preamble within 20 subframes. In an actual application, a quantity of newly defined preamble formats, and repetition times that are of preamble transmission and that are supported by each new preamble format are determined according to a requirement.

TABLE 6

| Preamble format | $T_{CP}$ | $T_{SEQ}$ |
|---|---|---|
| 0 | $3168T_s$ | $24576T_s$ |
| 1 | $21024T_s$ | $24576T_s$ |
| 2 | $6240T_s$ | $2 \cdot 24576T_s$ |
| 3 | $21024T_s$ | $2 \cdot 24576T_s$ |
| 4* | $448T_s$ | $4096T_s$ |
| 5 | $n1 \cdot T_s$ | $100 \cdot 24576T_s$ |
| 6 | $n2 \cdot T_s$ | $20 \cdot 24576T_s$ |

In another implementation manner, another preamble format 5 and another preamble format 6 may be defined in a manner listed in Table 7. Preamble format 5 is eight times of preamble format 0 in preamble length, and a preamble taking preamble format 5 is transmitted within eight subframes. Preamble format 6 is four times of preamble format 0 in preamble length, and a preamble taking preamble format 6 is transmitted within four subframes.

TABLE 7

| Preamble format | $T_{CP}$ | $T_{SEQ}$ |
|---|---|---|
| 0 | $3168T_s$ | $24576T_s$ |
| 1 | $21024T_s$ | $24576T_s$ |
| 2 | $6240T_s$ | $2 \cdot 24576T_s$ |
| 3 | $21024T_s$ | $2 \cdot 24576T_s$ |
| 4* | $448T_s$ | $4096T_s$ |
| 5 | $m1 \cdot T_s$ | $8 \cdot 24576T_s$ |
| 6 | $m2 \cdot T_s$ | $4 \cdot 24576T_s$ |

The newly defined preamble formats can further support a different preamble or preamble group. That the different preamble or preamble group indicates a preamble or preamble group that at least one of a preamble sequence itself, a root (root) used for generating the preamble, time and frequency resources that are occupied by the preamble, and a power configuration is different.

The correspondence between a characteristic parameter and a preamble format configuration may be predefined in a system or a standard. The correspondence between a characteristic parameter and a preamble format configuration may be specified in the following forms: specified by using a table, specified by using a function relationship, or directly described by using texts.

The following describes in detail the foregoing forms in which the correspondence between a characteristic parameter and a preamble format configuration is specified.

1. The correspondence between a characteristic parameter and a preamble format configuration may be described by using a table, and a standard or a system predefines the correspondence between a characteristic parameter and a preamble format configuration.

Table 8 shows a correspondence between characteristic parameters and preamble format configurations.

TABLE 8

| Characteristic parameter | Preamble format configuration |
|---|---|
| 1 | 0, 1, 2, 3, 4 |
| 2 | 5 |
| 3 | 6 |

2. The correspondence between a characteristic parameter and a preamble format configuration may be obtained by using a function relationship. For example, a characteristic parameter index corresponding to a preamble format is obtained according to at least one of a preamble format index, an identifier of the UE, and a common system parameter. Alternatively, a preamble format index corresponding to a characteristic parameter may be obtained according to at least one of a characteristic parameter index, an identifier of the UE, and a common system parameter.

Further, the method further includes: notifying the user equipment of the correspondence between a characteristic parameter and a preamble format configuration and the correspondence between a characteristic parameter and a random access preamble format configuration by using broadcast or multicast signaling. The broadcast or multicast signaling is: a MIB, a SIB, Radio Resource Control signaling, Media Access Control signaling, or physical layer signaling.

For example, the base station or a network side device configures the correspondence between a characteristic parameter and a preamble format configuration by using signaling or a field. The user equipment learns the correspondence between a characteristic parameter and a preamble format configuration by receiving the signaling or the field. The signaling or the field may be RRC common signaling, or RRC dedicated signaling, or MAC signaling, or a field carried by a physical layer common channel, or a field carried by a physical layer dedicated channel.

For example, a new IE may be added to the SIB to configure the correspondence between a characteristic parameter and a preamble format configuration. For example, a new IE may be added to SIB2 to configure a corresponding random access preamble for each characteristic parameter. The following pseudocode configures a correspondence between three characteristic parameters and preamble formats, where the characteristic parameters are specifically path loss values.

```
SystemInformationBlockType2 ::= SEQUENCE {
Pathloss-range1 ENUMERATED {f0, f1,f2,f3,f4,f5,f6}
Pathloss-range2 ENUMERATED {f0, f1,f2,f3,f4,f5,f6}
Pathloss-range3 ENUMERATED {f0, f1,f2,f3,f4,f5,f6}
}
```

Herein, f0 represents preamble format 0, f1 represents preamble format 1, and fn represents preamble format n.

A corresponding random access preamble may further be configured for each characteristic parameter in a bitmap manner. A new IE may be added to SIB2 to configure the corresponding random access preamble for each characteristic parameter in a bitmap manner. The following pseudocode configures another correspondence between three characteristic parameters and preamble formats, where the characteristic parameters are specifically path loss values.

```
SystemInformationBlockType2 ::= SEQUENCE {
Pathloss-range1 BIT STRING (SIZE(7))
Pathloss-range2 BIT STRING (SIZE(7))
Pathloss-range3 BIT STRING (SIZE(7))
}
```

Further, after step 502, the method may further include: notifying the user equipment of the first resource configuration by using dedicated signaling or a field.

In specific implementation, the dedicated signaling or the field is: RRC dedicated signaling or a field, MAC dedicated signaling or a field, or physical layer dedicated signaling or a field.

Step 503: Determine a spread spectrum sequence resource by using the spreading resource configuration in the first resource configuration, and determine a random access preamble format by using the random access preamble format configuration in the first resource configuration.

Further, when a type of sub-configuration in the first resource configuration includes multiple sub-configurations, step 503 includes:

determining one sub-configuration from the multiple sub-configurations in the type of sub-configuration according to a predefined function relationship, and determining the resource by using the determined sub-configuration; or determining the resource by using a default resource configuration in the multiple sub-configurations in the type of sub-configuration.

Optionally, after the one sub-configuration is determined from the multiple sub-configurations or the default resource configuration is determined, the method may further include:

notifying the user equipment of the determined sub-configuration or the determined default resource configuration by using dedicated signaling or a field.

In specific implementation, the dedicated signaling or the field is: RRC dedicated signaling or a field, MAC dedicated signaling or a field, or physical layer dedicated signaling or a field.

Step 504: Despread a random access preamble according to the spread spectrum sequence resource determined by using the spreading resource configuration; and detect the random access preamble according to the random access preamble format determined by using the random access preamble format configuration.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In the way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 6

Figure 6:
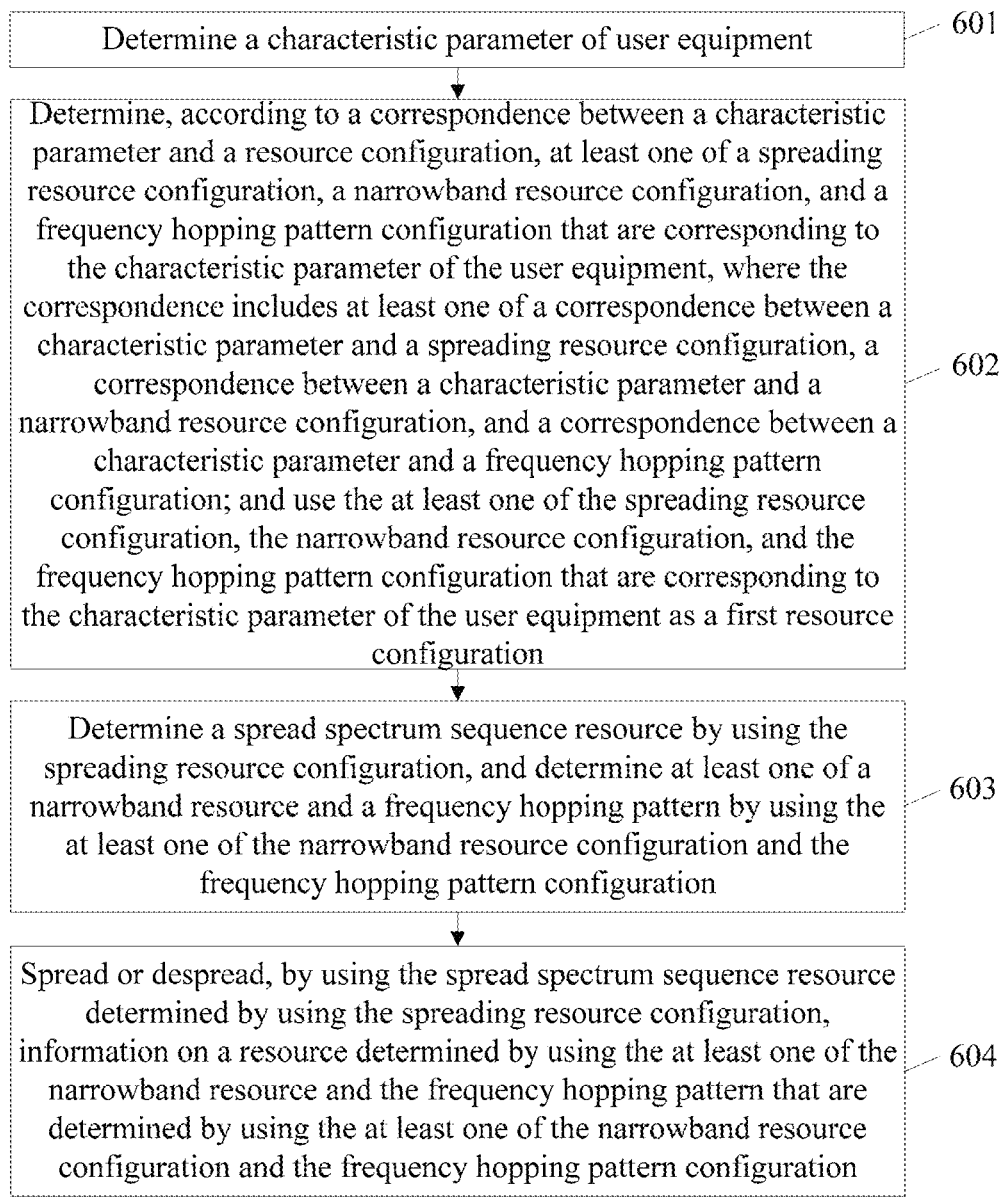
FIG. 6 is a flowchart of an information transmission method according to Embodiment 6 of the present invention.

This embodiment of the present invention provides an information transmission method, where the method may be executed by a base station. In this embodiment, a correspondence between a characteristic parameter and a resource configuration includes at least one of a correspondence between a characteristic parameter and a spreading resource configuration, a correspondence between a characteristic parameter and a narrowband resource configuration, and a correspondence between a characteristic parameter and a frequency hopping pattern configuration. A first resource configuration includes at least two types of sub-configurations, and the at least two types of sub-configurations are a spreading resource configuration and at least one of a narrowband resource configuration and a frequency hopping pattern configuration. Referring to FIG. 6, the method includes the following steps:

Step 601: Determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

The characteristic parameter of the user equipment is sent by the user equipment to the base station.

Step 602: Determine, according to the correspondence between a characteristic parameter and a resource configuration, at least one of a spreading resource configuration, a narrowband resource configuration, and a frequency hopping pattern configuration that are corresponding to the characteristic parameter of the user equipment, where the correspondence includes at least one of the correspondence between a characteristic parameter and a spreading resource configuration, the correspondence between a characteristic parameter and a narrowband resource configuration, and the correspondence between a characteristic parameter and a frequency hopping pattern configuration; and use the at least one of the spreading resource configuration, the narrowband resource configuration, and the frequency hopping pattern configuration that are corresponding to the characteristic parameter of the user equipment as the first resource configuration.

The correspondence between a characteristic parameter and a spreading resource configuration has been described in Embodiments 3 and 4, and details are not described herein again.

The following describes the correspondence between a characteristic parameter and a frequency hopping pattern configuration.

Each characteristic parameter corresponds to one or more frequency hopping pattern configurations, and frequency hopping pattern configurations corresponding to different characteristic parameters are different.

The base station or a network device determines the characteristic parameter of the user equipment, and performs information transmission on a resource determined by using one or more frequency hopping pattern configurations corresponding to the characteristic parameter of the user equipment.

Frequency hopping means that a frequency band used for information transmission may hop on an entire frequency resource at different moments. In an LTE/LTE-A system, information transmission is usually in a unit of a transmission time interval (TTI) in terms of time, and one TTI is one subframe; information transmission usually occupies one narrowband in terms of frequency, and one narrowband may include a frequency width of one or more consecutive or non-consecutive physical resource blocks (PRB).

A frequency hopping pattern determines or indicates a location on which a frequency band used for information transmission hops on an entire frequency resource at different moments. The moment herein may be a single TTI, or may be multiple subframes, a frame, multiple frames, a transmission opportunity, or an enhanced transmission opportunity. Parameters related to a frequency hopping pattern include: composition of a frequency hopping pattern, a quantity of frequency hopping patterns, a period of a frequency hopping pattern, a start moment (or an offset) of a frequency hopping pattern, a size of a frequency hopping pattern, and a resource determined by each frequency hopping pattern. A system may predetermine one or more parameters: the composition of a frequency hopping pattern, the quantity of frequency hopping patterns, the period of a frequency hopping pattern, the start moment (or the offset) of a frequency hopping pattern, the size of a frequency hopping pattern, and the resource determined by each frequency hopping pattern.

The frequency hopping pattern configuration is used to configure one or more of the parameters except the frequency hopping pattern parameter predetermined by the system.

The correspondence between a characteristic parameter and a frequency hopping pattern configuration may be predefined in the system or a standard. The correspondence between a characteristic parameter and a frequency hopping pattern configuration may be specified in the following forms: specified by using a table, specified by using a function relationship, or directly described by using texts.

1. For example, it is assumed that the system or the base station specifies three characteristic parameters and four frequency hopping pattern configurations. A correspondence between the three characteristic parameters and the four frequency hopping pattern configurations may be listed in Table 9. Characteristic parameter 1 corresponds to frequency hopping pattern configuration 1 and frequency hopping pattern configuration 2. Certainly, Table 9 is merely used as an example, and the correspondence between a characteristic parameter and a frequency hopping pattern configuration may be determined according to at least one of a service requirement of a user and a requirement of the system.

TABLE 9

| Characteristic parameter | Frequency hopping pattern configuration |
|---|---|
| 1 | 1, 2, |
| 2 | 3 |
| 3 | 4 |

2. A correspondence between a characteristic parameter and one or more frequency hopping pattern configurations may be obtained by using a function relationship. For example, a characteristic parameter index corresponding to a frequency hopping pattern configuration is obtained according to at least one of a frequency hopping pattern configuration index, an identifier of the UE, and a common system parameter. Alternatively, a frequency hopping pattern configuration index corresponding to a characteristic parameter may be obtained according to at least one of a characteristic parameter index, an identifier of the UE, and a common system parameter.

For example, a frequency hopping pattern configuration index is used as an example, and a function relationship between a characteristic parameter and one or more frequency hopping pattern configurations is:

(Frequency hopping pattern configuration index×
  Constant $N$)mod $M$=Characteristic parameter
  index.

Herein, constant N is a fixed value or a value configured by the system, M is a total quantity of characteristic parameters, and mod is a modulo operation. According to the foregoing function relationship, it is assumed that there are eight frequency hopping patterns in total, indexes of the eight frequency hopping patterns are respectively 0, 1, 2, 3, 4, 5, 6, and 7, and N=4 and M=3; in this case, it may be obtained that:

Frequency hopping pattern configurations corresponding to characteristic parameter 1 (that is, characteristic parameter index 0) are: frequency hopping pattern configuration 1 (frequency hopping pattern configuration index 0), frequency hopping pattern configuration 4 (frequency hopping pattern configuration index 3), frequency hopping pattern configuration 7 (frequency hopping pattern configuration index 6).

Frequency hopping pattern configurations corresponding to characteristic parameter 2 (that is, characteristic parameter index 1) are: frequency hopping pattern configuration 2 (frequency hopping pattern configuration index 1), frequency hopping pattern configuration 5 (frequency hopping pattern configuration index 4), frequency hopping pattern configuration 8 (frequency hopping pattern configuration index 7).

Frequency hopping pattern configurations corresponding to characteristic parameter 3 (that is, characteristic parameter index 2) are: frequency hopping pattern configuration 3 (frequency hopping pattern configuration index 2) and frequency hopping pattern configuration 6 (frequency hopping pattern configuration index 5).

Further, the method further includes: notifying the user equipment of the correspondence between a characteristic parameter and a frequency hopping pattern configuration by using broadcast or multicast signaling. The broadcast or multicast signaling is: a MIB, a SIB, Radio Resource Control signaling, Media Access Control signaling, or physical layer signaling.

For example, the base station or a network side device configures a correspondence between a characteristic parameter and one or more frequency hopping pattern configurations by using signaling or a field. The user equipment learns the correspondence between a characteristic parameter and one or more frequency hopping pattern configurations by receiving the signaling or the field. The signaling or the field may be RRC common signaling, or RRC dedicated signaling, or MAC signaling, or a field carried by a physical layer common channel, or a field carried by a physical layer dedicated channel.

For example, a new IE may be added to the SIB to configure the correspondence between a characteristic parameter and one or more frequency hopping pattern configurations. For example, a new IE may be added to SIB2 to configure one or more corresponding frequency hopping pattern configurations for each characteristic parameter. The following pseudocode configures a correspondence between three characteristic parameters and frequency hopping pattern configurations, where the characteristic parameters are specifically path loss values.

```
SystemInformationBlockType2 ::= SEQUENCE {
HoppingpatternConfigMTC ::= SEQUENCE {
Pathloss-range1 ENUMERATED {h0, h1,h2,h3,h4,h5,h6}
Pathloss-range2 ENUMERATED {h0, h1,h2,h3,h4,h5,h6}
Pathloss-range3 ENUMERATED {h0, h1,h2,h3,h4,h5,h6}
}
}
```

Herein, h0 represents frequency hopping pattern configuration 1 (that is, frequency hopping pattern configuration index 0), h1 represents frequency hopping pattern configuration 2 (that is, frequency hopping pattern configuration index 1), and hn represents frequency hopping pattern configuration (n+1) (that is, frequency hopping pattern configuration index n).

A corresponding frequency hopping pattern configuration may further be configured for each characteristic parameter in a bitmap manner. A new IE may be added to SIB2 to configure the corresponding frequency hopping pattern configuration for each characteristic parameter in a bitmap manner. The following pseudocode configures another correspondence between three characteristic parameters and frequency hopping pattern configurations, where the characteristic parameters are specifically path loss values.

```
SystemInformationBlockType2 ::= SEQUENCE {
HoppingpatternConfigMTC ::= SEQUENCE {
Pathloss-range1 BIT STRING (SIZE(8))
Pathloss-range2 BIT STRING (SIZE(8))
Pathloss-range3 BIT STRING (SIZE(8))
}
}
```

It is assumed that there are eight frequency hopping pattern configurations in total; in the foregoing pseudocode, a bit string with 8 bits is used to configure a frequency hopping pattern configuration for each path loss value, and two states of each bit indicate whether a frequency hopping pattern configuration indicated by the bit corresponds to the path loss value. It is assumed that when a state of a bit in the bit string used to configure a frequency hopping pattern configuration corresponding to a path loss value is 1, it indicates that the frequency hopping pattern configuration indicated by the bit corresponds to the path loss value. For example, for Pathloss-range1, when a state of the bit string with 8 bits is 10010010, it indicates that frequency hopping pattern configuration 1, frequency hopping pattern configuration 4, and frequency hopping pattern configuration 7 correspond to path loss value 1.

It should be noted that, during inter-cell interference coordination (ICIC), the base station may notify an adjacent base station of a frequency hopping pattern configuration by using an interface (for example, an X2 interface) between the base stations; and the adjacent base station performs interference avoidance according to received frequency hopping pattern configuration information. A frequency hopping pattern configuration includes one or more of an index of a frequency hopping pattern, composition of a frequency hopping pattern, a quantity of frequency hopping patterns, a period of a frequency hopping pattern, a start moment (or an offset) of a frequency hopping pattern, a size of a frequency hopping pattern, and a resource determined by each frequency hopping pattern, a path loss index corresponding to a frequency hopping pattern, a characteristic parameter indication (or a threshold) corresponding to a frequency hopping pattern.

It should be noted that, in this embodiment, the correspondence between a characteristic parameter and a frequency hopping pattern configuration is described by using an example of a frequency hopping pattern; actually, the method in this embodiment may further be applied to a correspondence between a characteristic parameter and a time-hopping pattern configuration, where a method is similar to the foregoing. Details are not described herein again.

The following describes the correspondence between a characteristic parameter and a narrowband resource configuration.

Each characteristic parameter corresponds to one or more narrowband resource configurations, and narrowband resource configurations corresponding to different characteristic parameters are different.

The foregoing narrowband resource may include one or more resources of a frequency, time, and power. For example, the narrowband resource may be a narrowband; the narrowband may be formed by one or more PRBs. The narrowband resource may further be formed by multiple subframes or frames in terms of time and a narrow frequency band in terms of frequency.

A narrowband resource configuration includes a quantity of narrowband resources and a location of each narrowband resource.

A correspondence between a characteristic parameter and one or more narrowband resource configurations may be predetermined in a system or a standard. The predetermined correspondence may be specified by using a table, or may be determined by using a function relationship, or may be directly described by using texts, or may be configured by using signaling or a field.

1. For example, it is assumed that the system or the base station specifies three characteristic parameters and eight narrowband resource configurations. A correspondence between the three characteristic parameters and the eight narrowband resource configurations may be listed in Table 10. Characteristic parameter 1 corresponds to narrowband resource configuration 1, narrowband resource configuration 2, and narrowband resource configuration 3. Certainly, Table 10 is merely used as an example, and the correspondence between a characteristic parameter and a narrowband resource configuration may be determined according to at least one of a service requirement of a user and a requirement of the system.

TABLE 10

| Characteristic parameter | Narrowband resource configuration |
|---|---|
| 1 | 1, 2, 3 |
| 2 | 4, 5, 6 |
| 3 | 7, 8 |

2. The correspondence between a characteristic parameter and one or more narrowband resource configurations may be obtained by using a function relationship. For example, a characteristic parameter index corresponding to a narrowband resource configuration is obtained according to at least one of a narrowband resource configuration index, an identifier of the UE, and a common system parameter. Alternatively, a narrowband resource configuration index corresponding to a characteristic parameter may be obtained according to at least one of a characteristic parameter index, an identifier of the UE, and a common system parameter.

For example, a narrowband resource configuration index is used as an example, and a function relationship between a characteristic parameter and one or more narrowband resource configurations is:

(Narrowband resource configuration index×Constant $N$)mod $M$=Characteristic parameter index.

Herein, constant N is a fixed value or a value configured by the system, M is a total quantity of characteristic parameters, and mod is a modulo operation. According to the foregoing function relationship, it is assumed that there are eight narrowband resource configurations in total, indexes of the eight narrowband resource configurations are respectively 0, 1, 2, 3, 4, 5, 6, and 7, and N=4 and M=3; in this case, it may be obtained that:

Narrowband resource configurations corresponding to characteristic parameter 1 (that is, characteristic parameter index 0) are: narrowband resource configuration 1 (narrowband resource configuration index 0), narrowband resource configuration 4 (narrowband resource configuration index 3), narrowband resource configuration 7 (narrowband resource configuration index 6).

Narrowband resource configurations corresponding to characteristic parameter 2 (that is, characteristic parameter index 1) are: narrowband resource configuration 2 (narrowband resource configuration index 1), narrowband resource configuration 5 (narrowband resource configuration index 4), narrowband resource configuration 8 (narrowband resource configuration index 7).

Narrowband resource configurations corresponding to characteristic parameter 3 (that is, characteristic parameter index 2) are: narrowband resource configuration 3 (narrowband resource configuration index 2) and narrowband resource configuration 6 (narrowband resource configuration index 5).

Further, the method further includes: notifying the user equipment of the correspondence between a characteristic parameter and a narrowband resource configuration by using broadcast or multicast signaling. The broadcast or multicast signaling is: a MIB, a SIB, Radio Resource Control signaling, Media Access Control signaling, or physical layer signaling.

For example, the base station or the network side device configures a correspondence between a characteristic parameter and one or more narrowband resource configurations by using signaling or a field. The user equipment learns the correspondence between a characteristic parameter and one or more narrowband resource configurations by receiving the signaling or the field. The signaling or the field may be RRC common signaling, or RRC dedicated signaling, or MAC signaling, or a field carried by a physical layer common channel, or a field carried by a physical layer dedicated channel.

For example, a new IE may be added to the SIB to configure the correspondence between a characteristic parameter and one or more narrowband resource configurations. For example, a new IE may be added to SIB2 to configure one or more corresponding narrowband resource configurations for each characteristic parameter. The following pseudocode configures a correspondence between three characteristic parameters and narrowband resource configurations, where the characteristic parameters are specifically path loss values.

```
SystemInformationBlockType2 ::= SEQUENCE {
Pathloss-range1 ENUMERATED {r0, r1,r2,r3,r4,r5,r6}
Pathloss-range2 ENUMERATED {r0, r1,r2,r3,r4,r5,r6}
Pathloss-range3 ENUMERATED {r0, r1,r2,r3,r4,r5,r6}
}
```

Herein, r0 represents narrowband resource configuration 1 (that is, narrowband resource configuration index 0), r1 represents narrowband resource configuration 2 (that is, narrowband resource configuration index 1), and rn represents narrowband resource configuration (n+1) (that is, narrowband resource configuration index n).

A corresponding narrowband resource configuration may further be configured for each characteristic parameter in a bitmap manner. A new IE may be added to SIB2 to configure the corresponding narrowband resource configuration for each characteristic parameter in a bitmap manner. The following pseudocode configures another correspondence between three characteristic parameters and narrowband resource configurations, where the characteristic parameters are specifically path loss values.

```
SystemInformationBlockType2 ::= SEQUENCE {
NarrowbandConfigMTC ::= SEQUENCE {
Pathloss-range1 BIT STRING (SIZE(8))
```

```
Pathloss-range2 BIT STRING (SIZE(8))
Pathloss-range3 BIT STRING (SIZE(8))
}
}
```

It is assumed that there are eight narrowband resource configurations in total; in the foregoing pseudocode, a bit string with 8 bits is used to configure a narrowband resource configuration for each path loss value, and two states of each bit indicate whether a narrowband resource configuration indicated by the bit corresponds to the path loss value. It is assumed that when a state of a bit in the bit string used to configure a narrowband resource configuration corresponding to a path loss value is 1, it indicates that the narrowband resource configuration indicated by the bit corresponds to the path loss value. For example, for Pathloss-range1, when a state of the bit string with 8 bits is 10010010, it indicates that narrowband resource configuration 1, narrowband resource configuration 4, and narrowband resource configuration 7 correspond to path loss value 1.

Further, after step 602, the method may further include:
notifying the user equipment of the first resource configuration by using dedicated signaling or a field.

In specific implementation, the dedicated signaling or the field is: RRC dedicated signaling or a field, MAC dedicated signaling or a field, or physical layer dedicated signaling or a field.

Step 603: Determine a spread spectrum sequence resource by using the spreading resource configuration, and determine at least one of a narrowband resource and a frequency hopping pattern by using the at least one of the narrowband resource configuration and the frequency hopping pattern configuration.

Further, when a type of sub-configuration in the first resource configuration includes multiple sub-configurations, step 603 includes:
determining one sub-configuration from the multiple sub-configurations in the type of sub-configuration according to a predefined function relationship, and determining the resource by using the determined sub-configuration; or
determining the resource by using a default resource configuration in the multiple sub-configurations in the type of sub-configuration.

Optionally, after the one sub-configuration is determined from the multiple sub-configurations or the default resource configuration is determined, the method may further include:
notifying the user equipment of the determined sub-configuration or the determined default resource configuration by using dedicated signaling or a field.

In specific implementation, the dedicated signaling or the field is: RRC dedicated signaling or a field, MAC dedicated signaling or a field, or physical layer dedicated signaling or a field.

Step 604: Spread or despread, by using the spread spectrum sequence resource determined by using the spreading resource configuration, information on a resource determined by using the at least one of the narrowband resource and the frequency hopping pattern that are determined by using the at least one of the narrowband resource configuration and the frequency hopping pattern configuration.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 7

Figure 7:
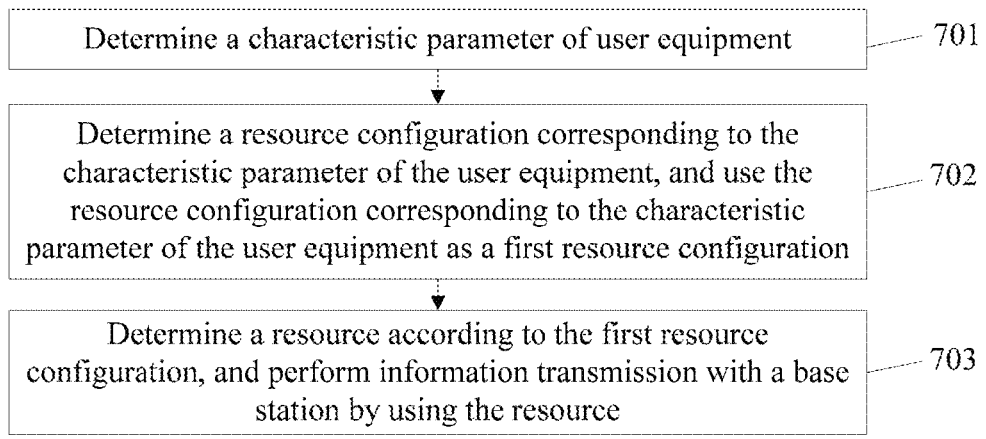
FIG. 7 is a flowchart of an information transmission method according to Embodiment 7 of the present invention.

This embodiment of the present invention provides an information transmission method, where the method may be executed by user equipment. Referring to FIG. 7, the method includes the following steps:

Step 701: Determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

Step 702: Determine a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration.

Specifically, a correspondence between a characteristic parameter and a resource configuration may be preconfigured on the user equipment, or may be received from a base station.

In specific implementation, in the correspondence between a characteristic parameter and a resource configuration, each characteristic parameter in a same type of characteristic parameter corresponds to one resource configuration, and resource configurations corresponding to the characteristic parameters are different.

The foregoing correspondence includes one or more of a correspondence between a characteristic parameter and a spreading resource configuration, a correspondence between a characteristic parameter and a random access preamble format configuration, a correspondence between a characteristic parameter and a narrowband resource configuration, and a correspondence between a characteristic parameter and a frequency hopping pattern configuration.

Specifically, the correspondence between a characteristic parameter and a resource configuration may include the following cases:

1. In the correspondence, the characteristic parameter includes one type of characteristic parameter, and the type of characteristic parameter corresponds to one type of sub-configuration (see Embodiments 3 and 4). For example, the characteristic parameter is a path loss range, the sub-configuration is a spreading resource configuration, and one path loss range corresponds to one or more spreading resource configurations.

2. In the correspondence, the characteristic parameter includes one type of characteristic parameter, and the type of characteristic parameter corresponds to at least two types of sub-configurations (see Embodiments 5 and 6). For example, the characteristic parameter is a path loss range, the sub-configuration is a spreading resource configuration, and one path loss range corresponds to one or more spreading resource configurations and one or more random access preamble format configurations.

3. In the correspondence, the characteristic parameter includes at least two types of characteristic parameters, and the two types of characteristic parameters correspond to one type of sub-configuration. For example, the characteristic parameter includes a path loss range and reference signal received quality, the sub-configuration is a spreading resource configuration, one path loss range corresponds to one or more spreading resource configurations, and reference signal received quality corresponds to one or more spreading resource configurations.

4. In the correspondence, the characteristic parameter includes at least two types of characteristic parameters, and the two types of characteristic parameters correspond to at least two types of sub-configurations. For example, the characteristic parameter includes a path loss range and reference signal received quality, the sub-configuration includes a spreading resource configuration and a random access preamble format configuration, one path loss range corresponds to one or more spreading resource configurations, and reference signal received quality corresponds to one or more random access preamble format configurations.

Correspondingly, the first resource configuration corresponding to the characteristic parameter of the user equipment may include the following cases:

The first resource configuration includes one type of sub-configuration, and the type of sub-configuration includes one sub-configuration.

The first resource configuration includes multiple types of sub-configurations, and each type of sub-configuration includes one sub-configuration.

The first resource configuration includes one type of sub-configuration, and the type of sub-configuration includes multiple sub-configurations.

The first resource configuration includes multiple types of sub-configurations, and each type of sub-configuration includes multiple sub-configurations.

The first resource configuration includes multiple types of sub-configurations, and at least one type of sub-configuration includes multiple sub-configurations, but not every type of sub-configuration includes multiple sub-configurations.

In conclusion, each type of sub-configuration in the foregoing first resource configuration may include one or more sub-configurations.

Step 703: Determine a resource according to the first resource configuration, and perform information transmission with a base station by using the resource.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 8

Figure 8:
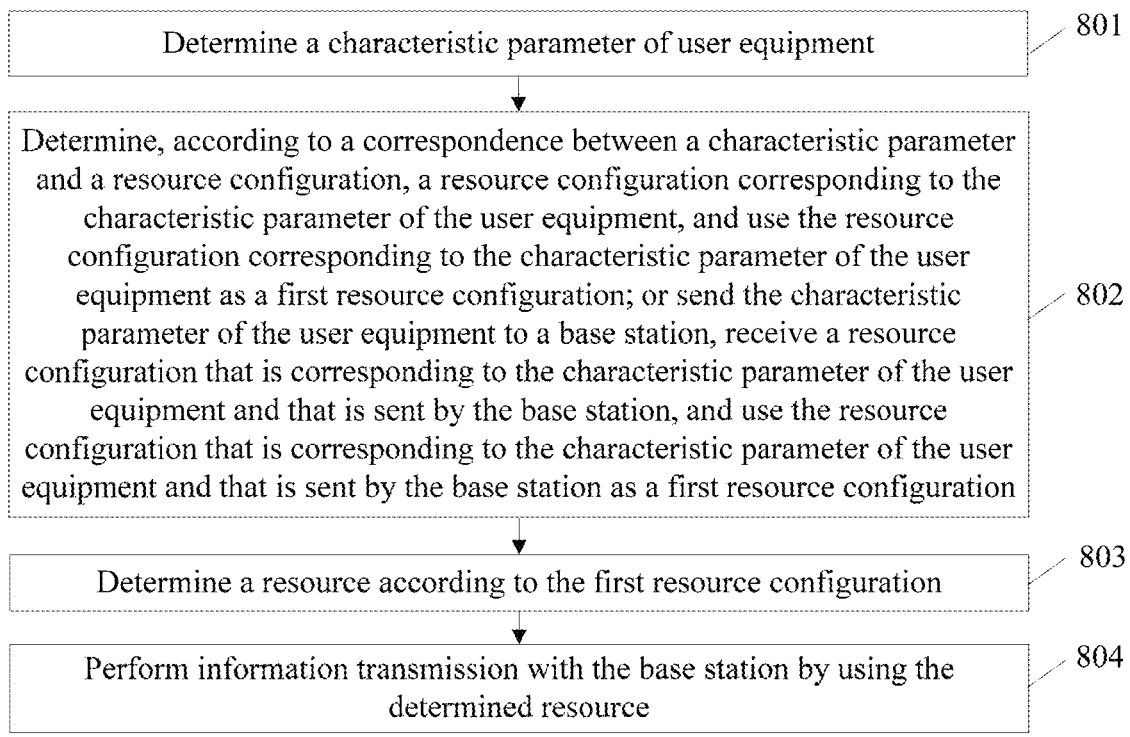
FIG. 8 is a flowchart of an information transmission method according to Embodiment 8 of the present invention.

This embodiment of the present invention provides an information transmission method, where the method may be executed by user equipment. Referring to FIG. 8, the method includes the following steps:

Step 801: Determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

Step 802: Determine, according to a correspondence between a characteristic parameter and a resource configuration, a resource configuration corresponding to the characteristic parameter of the user equipment, and use the resource configuration corresponding to the characteristic parameter of the user equipment as a first resource configuration; or send the characteristic parameter of the user equipment to a base station, receive a resource configuration that is corresponding to the characteristic parameter of the user equipment and that is sent by the base station, and use the resource configuration that is corresponding to the characteristic parameter of the user equipment and that is sent by the base station as a first resource configuration, where the first resource configuration includes one or more types of the following sub-configurations: a spreading resource configuration, a random access preamble format configuration, a narrowband resource configuration, and a frequency hopping pattern configuration.

Specifically, the foregoing correspondence between a characteristic parameter and a resource configuration may be preconfigured on the user equipment, or may be received from the base station.

In specific implementation, in the correspondence between a characteristic parameter and a resource configuration, each characteristic parameter in a same type of characteristic parameter corresponds to one resource configuration, and resource configurations corresponding to the characteristic parameters are different.

The foregoing correspondence includes one or more of a correspondence between a characteristic parameter and a spreading resource configuration, a correspondence between a characteristic parameter and a random access preamble format configuration, a correspondence between a characteristic parameter and a narrowband resource configuration, and a correspondence between a characteristic parameter and a frequency hopping pattern configuration.

Specifically, the correspondence between a characteristic parameter and a resource configuration may include the following cases:

1. In the correspondence, the characteristic parameter includes one type of characteristic parameter, and the type of characteristic parameter corresponds to one type of sub-configuration (see Embodiments 3 and 4). For example, the characteristic parameter is a path loss range, the sub-configuration is a spreading resource configuration, and one path loss range corresponds to one or more spreading resource configurations.

2. In the correspondence, the characteristic parameter includes one type of characteristic parameter, and the type of characteristic parameter corresponds to at least two types of sub-configurations (see Embodiments 5 and 6). For example, the characteristic parameter is a path loss range, the sub-configuration is a spreading resource configuration, and one path loss range corresponds to one or more spreading resource configurations and one or more random access preamble format configurations.

3. In the correspondence, the characteristic parameter includes at least two types of characteristic parameters, and the two types of characteristic parameters correspond to one type of sub-configuration. For example, the characteristic parameter includes a path loss range and reference signal received quality, the sub-configuration is a spreading resource configuration, one path loss range corresponds to one or more spreading resource configurations, and reference signal received quality corresponds to one or more spreading resource configurations.

4. In the correspondence, the characteristic parameter includes at least two types of characteristic parameters, and the two types of characteristic parameters correspond to at least two types of sub-configurations. For example, the characteristic parameter includes a path loss range and reference signal received quality, the sub-configuration includes a spreading resource configuration and a random access preamble format configuration, one path loss range corresponds to one or more spreading resource configurations, and reference signal received quality corresponds to one or more random access preamble format configurations.

Correspondingly, the first resource configuration corresponding to the characteristic parameter of the user equipment may include the following cases:

The first resource configuration includes one type of sub-configuration, and the type of sub-configuration includes one sub-configuration.

The first resource configuration includes multiple types of sub-configurations, and each type of sub-configuration includes one sub-configuration.

The first resource configuration includes one type of sub-configuration, and the type of sub-configuration includes multiple sub-configurations.

The first resource configuration includes multiple types of sub-configurations, and each type of sub-configuration includes multiple sub-configurations.

The first resource configuration includes multiple types of sub-configurations, and at least one type of sub-configuration includes multiple sub-configurations, but not every type of sub-configuration includes multiple sub-configurations.

In conclusion, each type of sub-configuration in the foregoing first resource configuration may include one or more sub-configurations.

Further, the method further includes: determining the correspondence between a characteristic parameter and a resource configuration by using broadcast or multicast signaling. The broadcast or multicast signaling is: a MIB, a SIB, Radio Resource Control signaling, Media Access Control signaling, or physical layer signaling.

Specifically, the receiving a resource configuration that is corresponding to the characteristic parameter of the user equipment and that is sent by the base station includes:

receiving dedicated signaling or a field that carries the resource configuration corresponding to the characteristic parameter of the user equipment and that is sent by the base station. The dedicated signaling or the field is: RRC dedicated signaling or a field, MAC dedicated signaling or a field, or physical layer dedicated signaling or a field.

Step 803: Determine a resource according to the first resource configuration.

As described above, each type of sub-configuration in the first resource configuration may include one sub-configuration or multiple sub-configurations. When a type of sub-configuration in the first resource configuration includes multiple sub-configurations, step 803 includes:

determining one sub-configuration from the multiple sub-configurations in the type of sub-configuration according to a predefined function relationship, and determining the resource by using the determined sub-configuration.

When a type of sub-configuration in the first resource configuration includes multiple sub-configurations, step 803 further includes:

receiving dedicated signaling or a field that carries the resource configuration, determining one sub-configuration from the multiple sub-configurations according to the dedicated signaling or the field, and determining the resource by using the determined sub-configuration.

In specific implementation, the dedicated signaling or the field is: RRC dedicated signaling or a field, MAC dedicated signaling or a field, or physical layer dedicated signaling or a field.

Specifically, the user equipment detects the physical layer dedicated signaling or the field, or the RRC dedicated signaling or the field, or the MAC dedicated signaling or the field to obtain content of the determined resource configuration, and determines the resource according to the determined resource configuration to perform information transmission.

Specifically, the foregoing RRC dedicated signaling or the field may be an Msg4. For example, the base station adds one or two new fields to the Msg4 to carry the determined sub-configuration or a default resource configuration.

The foregoing physical layer dedicated signaling or the field may be a PDCCH or an EPDCCH. For example, the base station adds one or two new fields to DCI to carry the determined resource configuration. Certainly, if there is a redundant bit or redundant state in the DCI, the redundant bit or the redundant state may also be used to carry the determined sub-configuration or the default resource configuration.

The foregoing MAC dedicated signaling or the field may be a CE. For example, the base station defines one or two new MAC CEs to carry the determined sub-configuration or the default resource configuration.

Step 804: Perform information transmission with the base station by using the determined resource.

The foregoing transmission may be sending, or may be receiving. Information to be transmitted may be a common message, a dedicated message, control information, a signal, a sequence, or the like. For example, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 9

Figure 9:
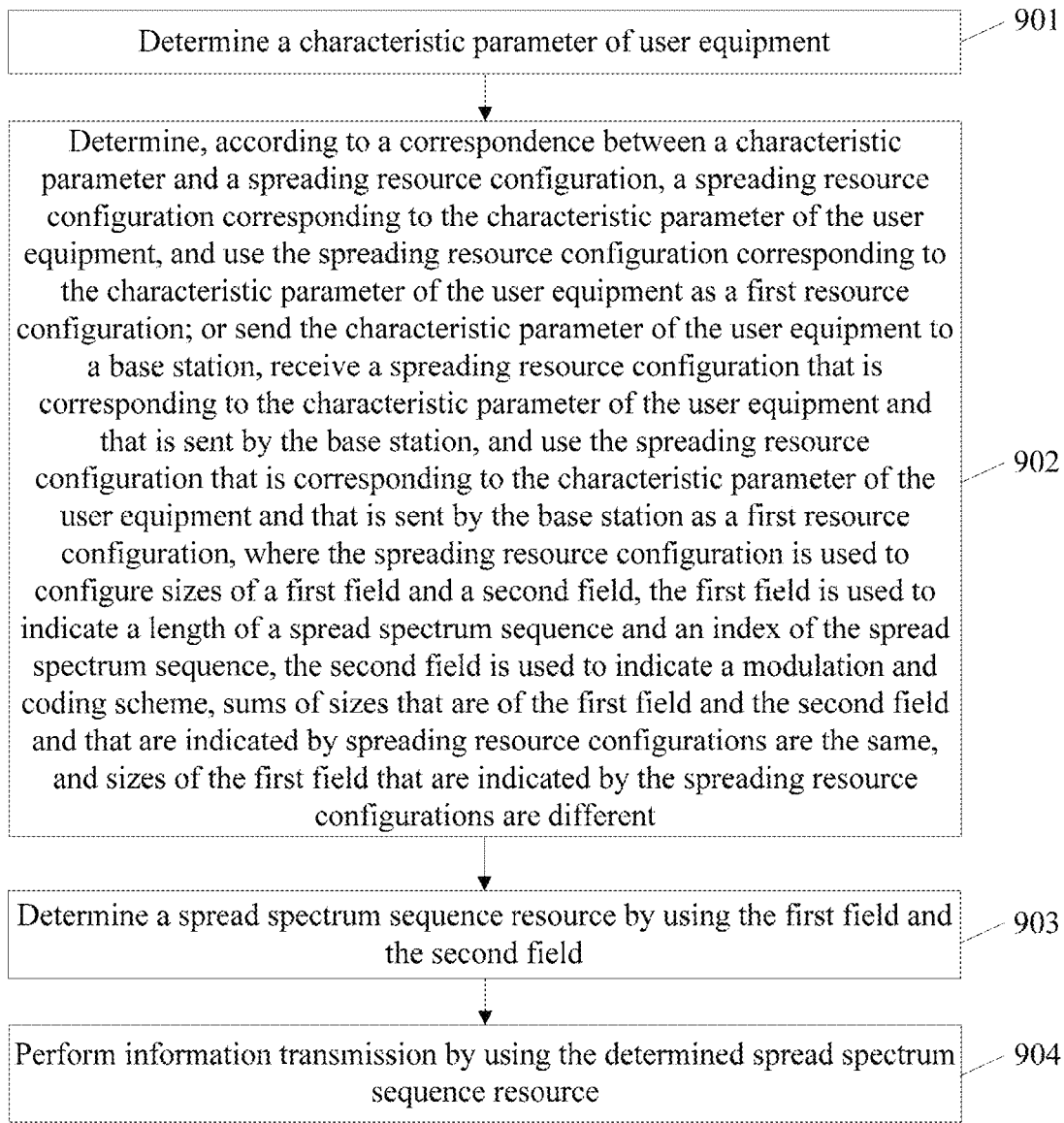
FIG. 9 is a flowchart of an information transmission method according to Embodiment 9 of the present invention.

This embodiment of the present invention provides an information transmission method, where the method may be executed by user equipment. In this embodiment, a correspondence between a characteristic parameter and a resource configuration includes a correspondence between a characteristic parameter and a spreading resource configuration. A first resource configuration includes one type of sub-configuration, and the type of sub-configuration is a spreading resource configuration. Referring to FIG. 9, the method includes the following steps:

Step 901: Determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

Step 902: Determine, according to the correspondence between a characteristic parameter and a spreading resource configuration, a spreading resource configuration corresponding to the characteristic parameter of the user equipment, and use the spreading resource configuration corresponding to the characteristic parameter of the user equipment as the first resource configuration; or send the characteristic parameter of the user equipment to a base station, receive a spreading resource configuration that is corresponding to the characteristic parameter of the user equipment and that is sent by the base station, and use the spreading resource configuration that is corresponding to the characteristic parameter of the user equipment and that is sent by the base station as the first resource configuration, where the spreading resource configuration is used to configure sizes of a first field and a second field, the first field is used to indicate a length of a spread spectrum sequence and an index of the spread spectrum sequence, the second field is used to indicate a modulation and coding scheme, sums of sizes that are of the first field and the second field and that are indicated by spreading resource configurations are the same, and sizes of the first field that are indicated by the spreading resource configurations are different.

The correspondence between a characteristic parameter and a spreading resource configuration is the same as that in Embodiment 3, and details are not described herein again.

Further, the method further includes: determining the correspondence between a characteristic parameter and a spreading resource configuration by using broadcast or multicast signaling. The broadcast or multicast signaling is: a MIB, a SIB, Radio Resource Control signaling, Media Access Control signaling, or physical layer signaling.

Specifically, the receiving a spreading resource configuration that is corresponding to the characteristic parameter of the user equipment and that is sent by the base station includes:

receiving dedicated signaling or a field that carries the spreading resource configuration corresponding to the characteristic parameter of the user equipment and that is sent by the base station. The dedicated signaling or the field is: RRC dedicated signaling or a field, MAC dedicated signaling or a field, or physical layer dedicated signaling or a field.

Step 903: Determine a spread spectrum sequence resource by using the first field and the second field.

As described above, when the first resource configuration corresponding to the characteristic parameter of the user equipment in step 902 includes multiple spreading resource configurations, step 903 includes the following steps:

The first step: determine one spreading resource configuration from the multiple spreading resource configurations.

A specific implementation manner of the first step may be the same as that of step 203 in Embodiment 2, and detailed descriptions are omitted herein.

The second step: determine the spread spectrum sequence resource by using the first field and the second field that are configured by using the determined spreading resource configuration.

Step 904: Perform information transmission by using the determined spread spectrum sequence resource.

Specifically, the transmission may be sending or receiving. Information to be transmitted may be a common message, a dedicated message, control information, a signal, a sequence, or the like. Further, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 10

Figure 10:
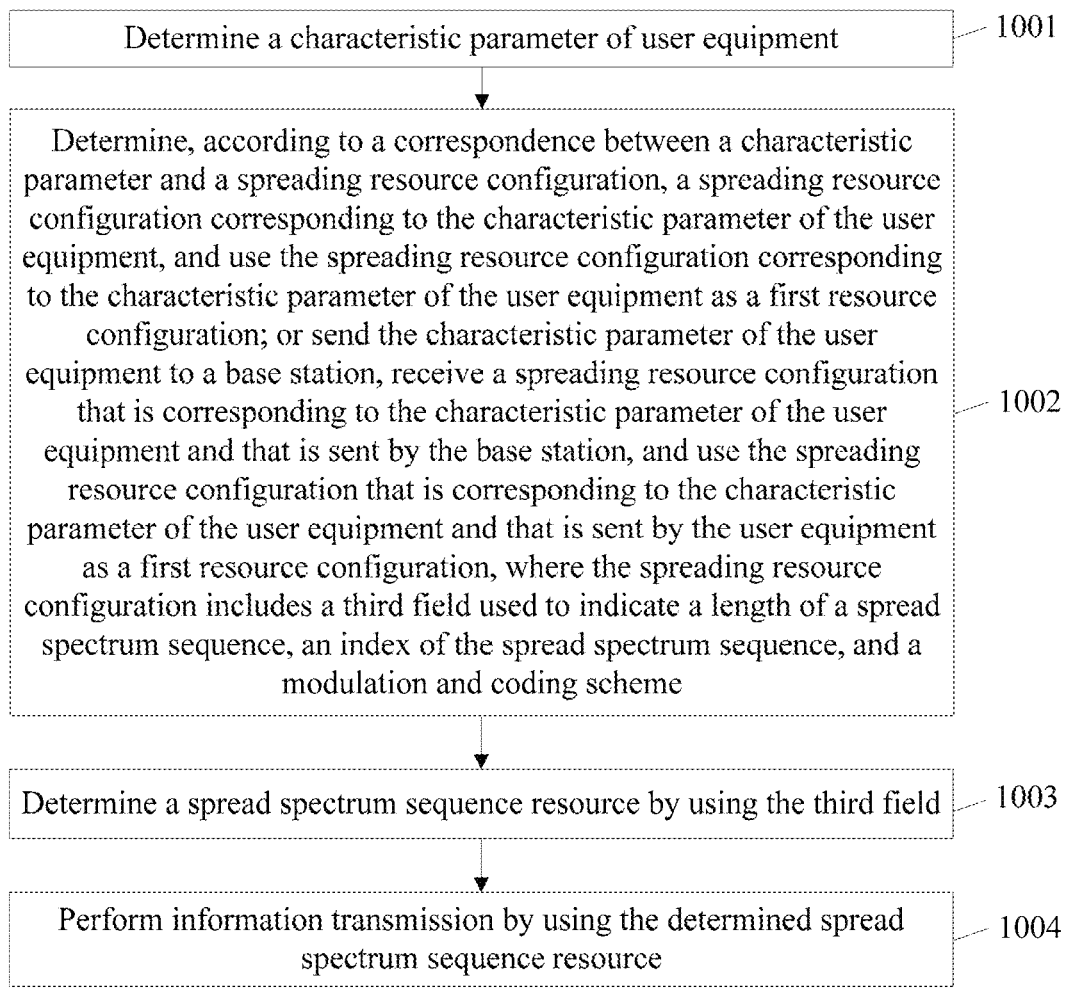
FIG. 10 is a flowchart of an information transmission method according to Embodiment 10 of the present invention.

This embodiment of the present invention provides an information transmission method, where the method may be executed by user equipment. In this embodiment, a correspondence between a characteristic parameter and a resource configuration includes a correspondence between a characteristic parameter and a spreading resource configuration. A first resource configuration includes one type of sub-configuration, and the type of sub-configuration is a spreading resource configuration. Referring to FIG. 10, the method includes the following steps:

Step 1001: Determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

Step 1002: Determine, according to the correspondence between a characteristic parameter and a spreading resource configuration, a spreading resource configuration corresponding to the characteristic parameter of the user equipment, and use the spreading resource configuration corresponding to the characteristic parameter of the user equipment as the first resource configuration; or send the characteristic parameter of the user equipment to a base station, receive a spreading resource configuration that is corresponding to the characteristic parameter of the user equipment and that is sent by the base station, and use the spreading resource configuration that is corresponding to the characteristic parameter of the user equipment and that is sent by the base station as the first resource configuration, where the spreading resource configuration includes a third field used to indicate a length of a spread spectrum sequence, an index of the spread spectrum sequence, and a modulation and coding scheme.

The correspondence between a characteristic parameter and a spreading resource configuration is the same as that in Embodiment 4, and details are not described herein again.

Further, the method further includes: determining the correspondence between a characteristic parameter and a spreading resource configuration by using broadcast or multicast signaling. The broadcast or multicast signaling is: a MIB, a SIB, Radio Resource Control signaling, Media Access Control signaling, or physical layer signaling.

Specifically, the receiving a spreading resource configuration that is corresponding to the characteristic parameter of the user equipment and that is sent by the base station includes:

receiving dedicated signaling or a field that carries the spreading resource configuration corresponding to the characteristic parameter of the user equipment and that is sent by the base station. The dedicated signaling or the field is: RRC dedicated signaling or a field, MAC dedicated signaling or a field, or physical layer dedicated signaling or a field.

Step 1003: Determine a spread spectrum sequence resource by using the third field.

As described above, when the first resource configuration corresponding to the characteristic parameter of the user equipment in step 1002 includes multiple spreading resource configurations, step 1003 includes the following steps:

The first step: determine one spreading resource configuration from the multiple spreading resource configurations.

A specific implementation manner of the first step may be the same as that of step 203 in Embodiment 2, and detailed descriptions are omitted herein.

The second step: determine the spread spectrum sequence resource by using the third field that is configured by using the determined spreading resource configuration.

Step 1004: Perform information transmission by using the determined spread spectrum sequence resource.

Specifically, the transmission may be sending or receiving. Information to be transmitted may be a common message, a dedicated message, control information, a signal, a sequence, or the like. Further, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 11

Figure 11:
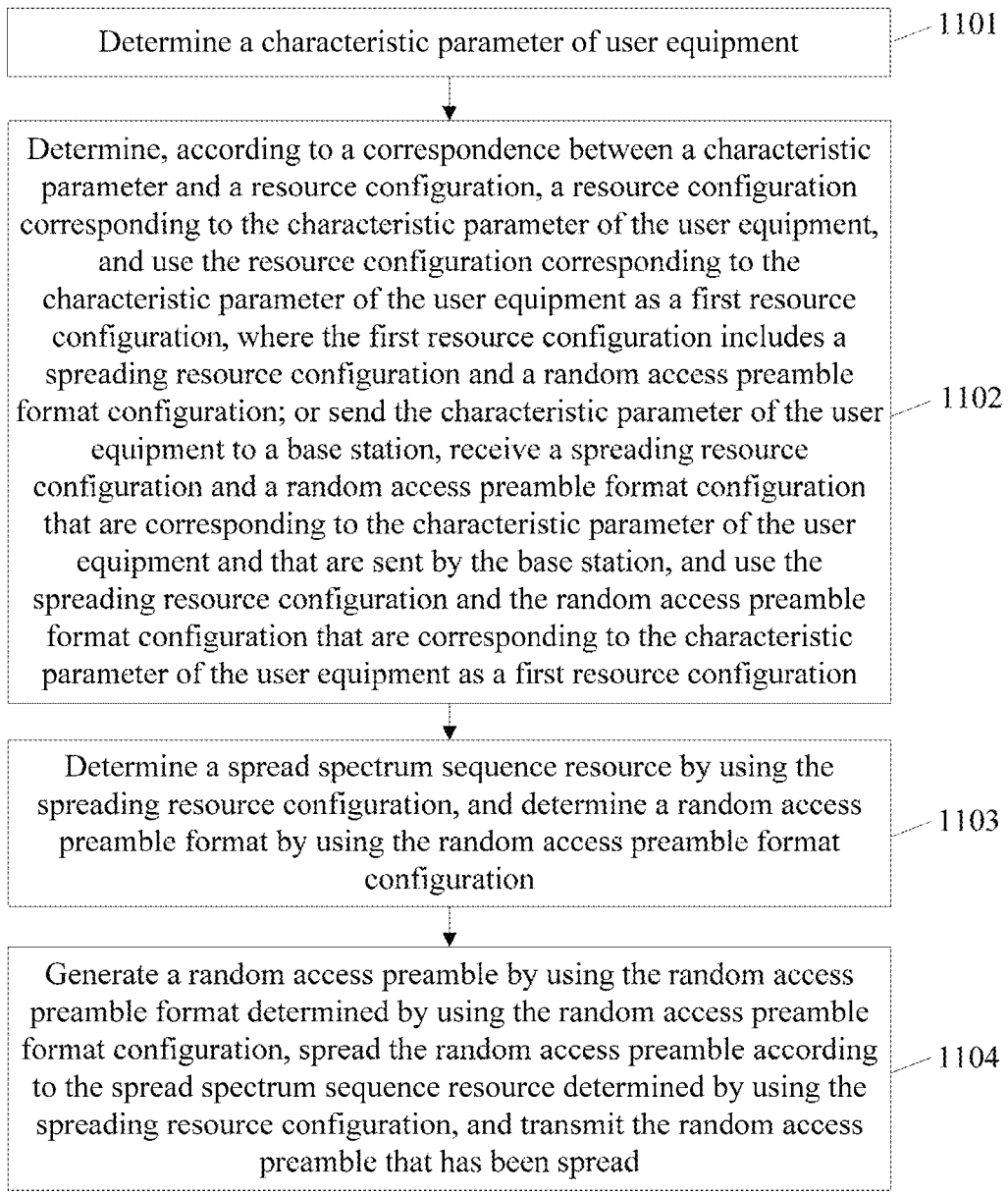
FIG. 11 is a flowchart of an information transmission method according to Embodiment 11 of the present invention.

This embodiment of the present invention provides an information transmission method, where the method may be executed by user equipment. In this embodiment, a correspondence between a characteristic parameter and a resource configuration includes a correspondence between a characteristic parameter and a spreading resource configuration and a correspondence between a characteristic parameter and a random access preamble format configuration. A first resource configuration includes two types of sub-configurations, and the two types of sub-configurations are a spreading resource configuration and a random access preamble format configuration. Referring to FIG. 11, the method includes the following steps:

Step 1101: Determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

Step 1102: Determine, according to the correspondence between a characteristic parameter and a spreading resource configuration and the correspondence between a characteristic parameter and a random access preamble format configuration, a spreading resource configuration and a random access preamble format configuration that are corresponding to the characteristic parameter of the user equipment, and use the spreading resource configuration and the random access preamble format configuration that are corresponding to the characteristic parameter of the user equipment as the first resource configuration; or send the characteristic parameter of the user equipment to a base station, receive a spreading resource configuration and a random access preamble format configuration that are corresponding to the characteristic parameter of the user equipment and that are sent by the base station, and use the spreading resource configuration and the random access preamble format configuration that are corresponding to the characteristic parameter of the user equipment as the first resource configuration.

The correspondence between a characteristic parameter and a spreading resource configuration is the same as that in Embodiment 3 or 4, and the correspondence between a characteristic parameter and a random access preamble format configuration is the same as that in Embodiment 5. Details are not described herein again.

Further, the method further includes: determining the correspondence between a characteristic parameter and a spreading resource configuration and the correspondence between a characteristic parameter and a random access preamble format configuration by using broadcast or multicast signaling. The broadcast or multicast signaling is: a MIB, a SIB, Radio Resource Control signaling, Media Access Control signaling, or physical layer signaling.

Specifically, the receiving a spreading resource configuration and a random access preamble format configuration that are corresponding to the characteristic parameter of the user equipment and that are sent by the base station includes:

receiving dedicated signaling or a field that carries the spreading resource configuration and the random access preamble format configuration and that is sent by the base station, where the spreading resource configuration and the random access preamble format configuration are corresponding to the characteristic parameter of the user equipment. The dedicated signaling or the field is: RRC dedicated signaling or a field, MAC dedicated signaling or a field, or physical layer dedicated signaling or a field.

Step 1103: Determine a spread spectrum sequence resource by using the spreading resource configuration, and determine a random access preamble format by using the random access preamble format configuration.

As described above, when a type of sub-configuration in the first resource configuration includes multiple sub-configurations, step 1103 includes:

determining one sub-configuration from the multiple sub-configurations in the type of sub-configuration according to a predefined function relationship, and determining the resource by using the determined sub-configuration.

When a type of sub-configuration in the first resource configuration includes multiple sub-configurations, step 1103 further includes:

receiving dedicated signaling or a field that carries the resource configuration, determining one sub-configuration from the multiple sub-configurations according to the dedicated signaling or the field, and determining the resource by using the determined sub-configuration.

In specific implementation, the dedicated signaling or the field is: RRC dedicated signaling or a field, MAC dedicated signaling or a field, or physical layer dedicated signaling or a field.

Step 1104: Generate a random access preamble by using the random access preamble format determined by using the random access preamble format configuration;

spread the random access preamble according to the spread spectrum sequence resource determined by using the spreading resource configuration; and transmit the random access preamble that has been spread.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 12

Figure 12:
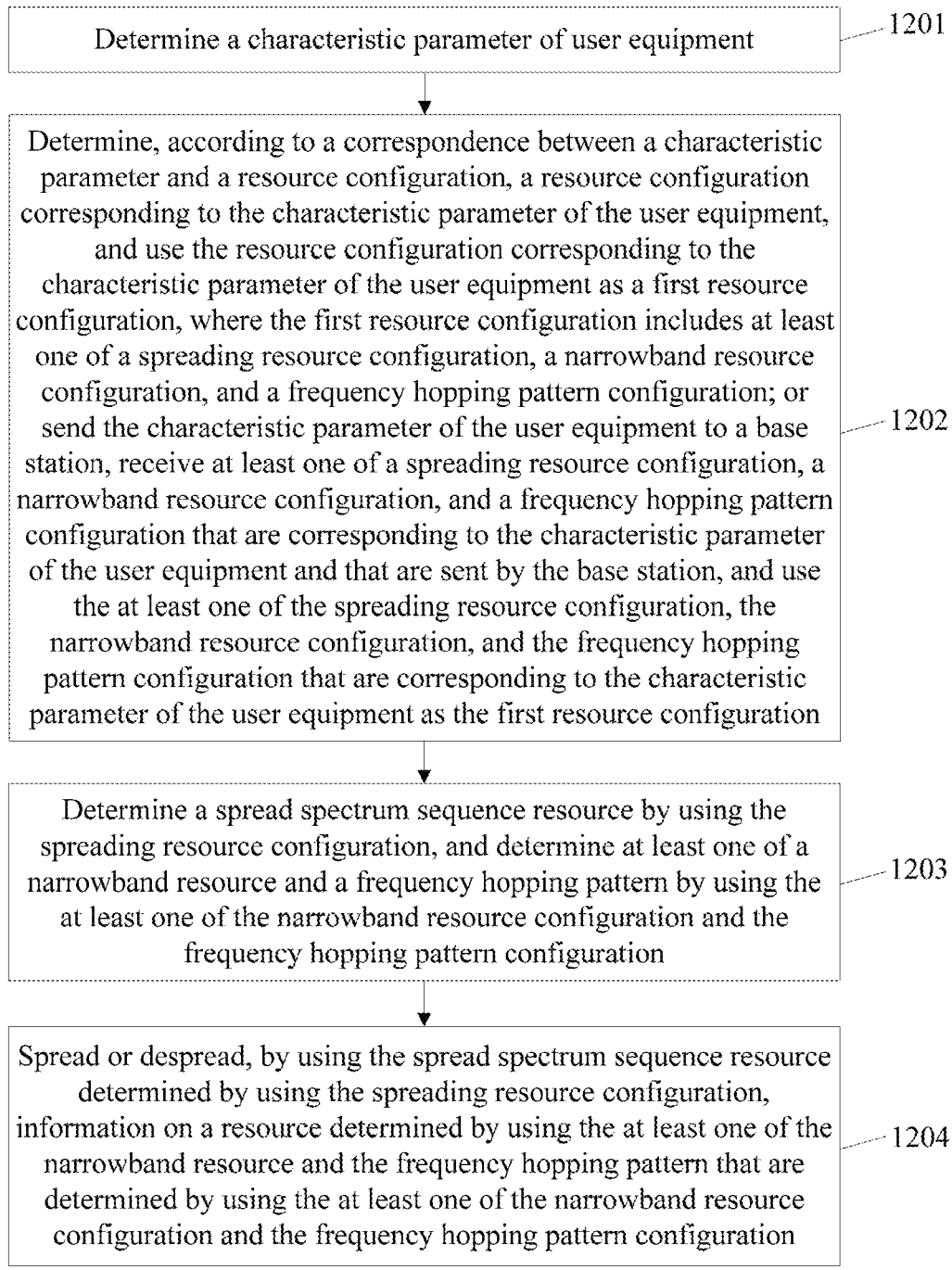
FIG. 12 is a flowchart of an information transmission method according to Embodiment 12 of the present invention.

This embodiment of the present invention provides an information transmission method, where the method may be executed by user equipment. In this embodiment, a correspondence between a characteristic parameter and a resource configuration includes at least one of a correspondence between a characteristic parameter and a spreading resource configuration, a correspondence between a characteristic parameter and a narrowband resource configuration, and a correspondence between a characteristic parameter and a frequency hopping pattern configuration. A first resource configuration includes at least two types of sub-configurations, and the at least two types of sub-configurations are a spreading resource configuration and at least one of a narrowband resource configuration and a frequency hopping pattern configuration. Referring to FIG. 12, the method includes the following steps:

Step 1201: Determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement.

Step 1202: Determine, according to the correspondence between a characteristic parameter and a resource configuration, at least one of a spreading resource configuration, a narrowband resource configuration, and a frequency hopping pattern configuration that are corresponding to the characteristic parameter of the user equipment, where the correspondence includes at least one of the correspondence between a characteristic parameter and a spreading resource configuration, the correspondence between a characteristic parameter and a narrowband resource configuration, and the correspondence between a characteristic parameter and a frequency hopping pattern configuration; and use the at least one of the spreading resource configuration, the narrowband resource configuration, and the frequency hopping pattern configuration that are corresponding to the characteristic parameter of the user equipment as the first resource configuration; or send the characteristic parameter of the user equipment to a base station, receive at least one of a spreading resource configuration, a narrowband resource configuration, and a frequency hopping pattern configuration that are corresponding to the characteristic parameter of the user equipment and that are sent by the base station, and use the at least one of the spreading resource configuration, the narrowband resource configuration, and the frequency hopping pattern configuration that are corresponding to the characteristic parameter of the user equipment as the first resource configuration.

The correspondence between a characteristic parameter and a spreading resource configuration is the same as that in Embodiment 3 or 4, and the correspondence between a characteristic parameter and a narrowband resource configuration and the correspondence between a characteristic parameter and a frequency hopping pattern configuration are the same as that in Embodiment 6. Details are not described herein again.

Further, the method further includes: determining the at least one of the correspondence between a characteristic parameter and a spreading resource configuration, the correspondence between a characteristic parameter and a narrowband resource configuration, and the correspondence between a characteristic parameter and a frequency hopping pattern configuration by using broadcast or multicast signaling. The broadcast or multicast signaling is: a MIB, a SIB, Radio Resource Control signaling, Media Access Control signaling, or physical layer signaling.

Specifically, the receiving at least one of a spreading resource configuration, a narrowband resource configuration, and a frequency hopping pattern configuration that are corresponding to the characteristic parameter of the user equipment and that are sent by the base station includes:

receiving dedicated signaling or a field that carries the at least one of the spreading resource configuration, the narrowband resource configuration, and the frequency hopping pattern configuration and that is sent by the base station, where the at least one of configurations is corresponding to the characteristic parameter of the user equipment. The dedicated signaling or the field is: RRC dedicated signaling or a field, MAC dedicated signaling or a field, or physical layer dedicated signaling or a field.

Step 1203: Determine a spread spectrum sequence resource by using the spreading resource configuration, and determine at least one of a narrowband resource and a frequency hopping pattern by using the at least one of the narrowband resource configuration and the frequency hopping pattern configuration.

As described above, when a type of sub-configuration in the first resource configuration includes multiple sub-configurations, step 1203 includes:

determining one sub-configuration from the multiple sub-configurations in the type of sub-configuration according to a predefined function relationship, and determining the resource by using the determined sub-configuration.

When a type of sub-configuration in the first resource configuration includes multiple sub-configurations, step 1203 further includes:

receiving dedicated signaling or a field that carries the resource configuration, determining one sub-configuration from the multiple sub-configurations according to the dedicated signaling or the field, and determining the resource by using the determined sub-configuration.

In specific implementation, the dedicated signaling or the field is: RRC dedicated signaling or a field, MAC dedicated signaling or a field, or physical layer dedicated signaling or a field.

Step 1204: Spread or despread, by using the spread spectrum sequence resource determined by using the spreading resource configuration, information on a resource determined by using the at least one of the narrowband resource and the frequency hopping pattern that are determined by using the at least one of the narrowband resource configuration and the frequency hopping pattern configuration.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 13

Figure 13:
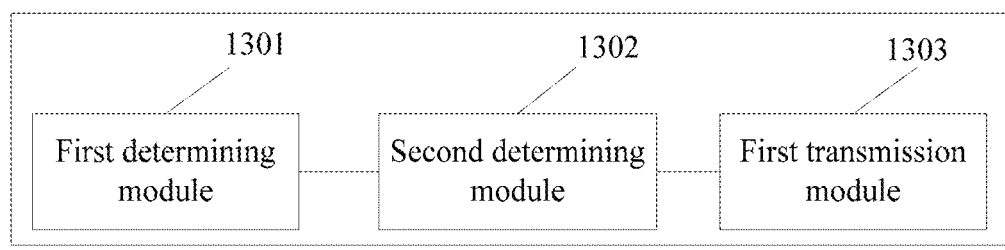
FIG. 13 is a schematic structural diagram of a base station according to Embodiment 13 of the present invention.

This embodiment of the present invention provides a base station, where the base station is applicable to the information transmission method provided in Embodiment 1. Referring to FIG. 13, the base station includes:

a first determining module 1301, configured to determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a second determining module 1302, configured to: determine, according to a correspondence between a characteristic parameter and a resource configuration, a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and a first transmission module 1303, configured to: determine a resource according to the first resource configuration, and perform information transmission with the user equipment by using the determined resource.

Specifically, the foregoing correspondence between a characteristic parameter and a resource configuration may be preconfigured on the base station.

In specific implementation, in the correspondence between a characteristic parameter and a resource configuration, each characteristic parameter in a same type of characteristic parameter corresponds to one resource configuration, and resource configurations corresponding to the characteristic parameters are different.

The foregoing correspondence includes one or more of a correspondence between a characteristic parameter and a spreading resource configuration, a correspondence between a characteristic parameter and a random access preamble format configuration, a correspondence between a characteristic parameter and a narrowband resource configuration, and a correspondence between a characteristic parameter and a frequency hopping pattern configuration.

Specifically, the correspondence between a characteristic parameter and a resource configuration may include the following cases:

1. In the correspondence, the characteristic parameter includes one type of characteristic parameter, and the type of characteristic parameter corresponds to one type of sub-configuration (see Embodiments 3 and 4). For example, the characteristic parameter is a path loss range, the sub-configuration is a spreading resource configuration, and one path loss range corresponds to one or more spreading resource configurations.

2. In the correspondence, the characteristic parameter includes one type of characteristic parameter, and the type of characteristic parameter corresponds to at least two types of sub-configurations (see Embodiments 5 and 6). For example, the characteristic parameter is a path loss range, the sub-configuration is a spreading resource configuration, and one path loss range corresponds to one or more spreading resource configurations and one or more random access preamble format configurations.

3. In the correspondence, the characteristic parameter includes at least two types of characteristic parameters, and the two types of characteristic parameters correspond to one type of sub-configuration. For example, the characteristic parameter includes a path loss range and reference signal received quality, the sub-configuration is a spreading resource configuration, one path loss range corresponds to one or more spreading resource configurations, and reference signal received quality corresponds to one or more spreading resource configurations.

4. In the correspondence, the characteristic parameter includes at least two types of characteristic parameters, and the two types of characteristic parameters correspond to at least two types of sub-configurations. For example, the characteristic parameter includes a path loss range and reference signal received quality, the sub-configuration includes a spreading resource configuration and a random access preamble format configuration, one path loss range corresponds to one or more spreading resource configurations, and reference signal received quality corresponds to one or more random access preamble format configurations.

Correspondingly, the first resource configuration corresponding to the characteristic parameter of the user equipment may include the following cases:

The first resource configuration includes one type of sub-configuration, and the type of sub-configuration includes one sub-configuration.

The first resource configuration includes multiple types of sub-configurations, and each type of sub-configuration includes one sub-configuration.

The first resource configuration includes one type of sub-configuration, and the type of sub-configuration includes multiple sub-configurations.

The first resource configuration includes multiple types of sub-configurations, and each type of sub-configuration includes multiple sub-configurations.

The first resource configuration includes multiple types of sub-configurations, and at least one type of sub-configuration includes multiple sub-configurations, but not every type of sub-configuration includes multiple sub-configurations.

In conclusion, each type of sub-configuration in the foregoing first resource configuration may include one or more sub-configurations.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 14

Figure 14:
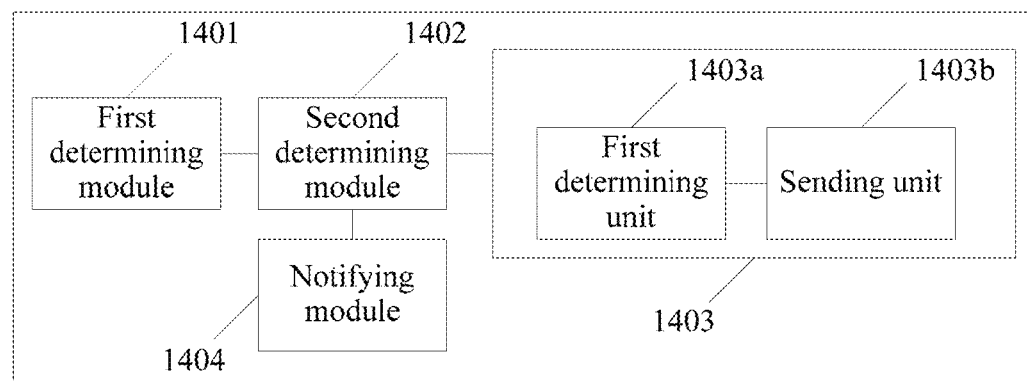
FIG. 14 is a schematic structural diagram of a base station according to Embodiment 14 of the present invention.

This embodiment of the present invention provides a base station, where the base station is applicable to the information transmission method provided in Embodiment 2. Referring to FIG. 14, the base station includes:

a first determining module 1401, configured to determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a second determining module 1402, configured to: determine, according to a correspondence between a characteristic parameter and a resource configuration, a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and a first transmission module 1403, configured to: determine a resource according to the first resource configuration, and perform information transmission with the user equipment by using the determined resource.

Specifically, the foregoing correspondence between a characteristic parameter and a resource configuration may be preconfigured on the base station.

In specific implementation, in the correspondence between a characteristic parameter and a resource configuration, each characteristic parameter in a same type of characteristic parameter corresponds to one resource configuration, and resource configurations corresponding to the characteristic parameters are different.

The foregoing correspondence includes one or more of a correspondence between a characteristic parameter and a spreading resource configuration, a correspondence between a characteristic parameter and a random access preamble format configuration, a correspondence between a characteristic parameter and a narrowband resource configuration, and a correspondence between a characteristic parameter and a frequency hopping pattern configuration.

Specifically, the correspondence between a characteristic parameter and a resource configuration may include the following cases:

1. In the correspondence, the characteristic parameter includes one type of characteristic parameter, and the type of characteristic parameter corresponds to one type of sub-configuration (see Embodiments 3 and 4). For example, the characteristic parameter is a path loss range, the sub-configuration is a spreading resource configuration, and one path loss range corresponds to one or more spreading resource configurations.

2. In the correspondence, the characteristic parameter includes one type of characteristic parameter, and the type of characteristic parameter corresponds to at least two types of sub-configurations (see Embodiments 5 and 6). For example, the characteristic parameter is a path loss range, the sub-configuration is a spreading resource configuration, and one path loss range corresponds to one or more spreading resource configurations and one or more random access preamble format configurations.

3. In the correspondence, the characteristic parameter includes at least two types of characteristic parameters, and the two types of characteristic parameters correspond to one type of sub-configuration. For example, the characteristic parameter includes a path loss range and reference signal received quality, the sub-configuration is a spreading resource configuration, one path loss range corresponds to one or more spreading resource configurations, and reference signal received quality corresponds to one or more spreading resource configurations.

4. In the correspondence, the characteristic parameter includes at least two types of characteristic parameters, and the two types of characteristic parameters correspond to at least two types of sub-configurations. For example, the characteristic parameter includes a path loss range and reference signal received quality, the sub-configuration includes a spreading resource configuration and a random access preamble format configuration, one path loss range corresponds to one or more spreading resource configurations, and reference signal received quality corresponds to one or more random access preamble format configurations.

Correspondingly, the first resource configuration corresponding to the characteristic parameter of the user equipment may include the following cases:

The first resource configuration includes one type of sub-configuration, and the type of sub-configuration includes one sub-configuration.

The first resource configuration includes multiple types of sub-configurations, and each type of sub-configuration includes one sub-configuration.

The first resource configuration includes one type of sub-configuration, and the type of sub-configuration includes multiple sub-configurations.

The first resource configuration includes multiple types of sub-configurations, and each type of sub-configuration includes multiple sub-configurations.

The first resource configuration includes multiple types of sub-configurations, and at least one type of sub-configuration includes multiple sub-configurations, but not every type of sub-configuration includes multiple sub-configurations.

In conclusion, each type of sub-configuration in the foregoing first resource configuration may include one or more sub-configurations.

Further, the base station further includes: a notifying module 1404, configured to notify the user equipment of the correspondence between a characteristic parameter and a resource configuration by using broadcast or multicast signaling. The broadcast or multicast signaling is: a MIB, a SIB, Radio Resource Control signaling, Media Access Control signaling, or physical layer signaling.

The first transmission module 1403 includes: a first determining unit 1403a, configured to: when a type of sub-configuration in the first resource configuration includes multiple sub-configurations, determine one sub-configuration from the multiple sub-configurations in the type of sub-configuration according to a predefined function relationship, and determine the resource by using the determined sub-configuration; or determine the resource by using a default resource configuration in the multiple sub-configurations in the type of sub-configuration.

Optionally, the first transmission module 1403 further includes: a sending unit 1403b, configured to notify the user equipment of the first resource configuration, or the determined sub-configuration, or the default resource configuration by using dedicated signaling or a field.

The dedicated signaling or the field is: RRC dedicated signaling or a field, MAC dedicated signaling or a field, or physical layer dedicated signaling or a field.

The foregoing transmission may be sending, or may be receiving. Information to be transmitted may be a common message, a dedicated message, control information, a signal, a sequence, or the like. For example, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 15

Figure 15:
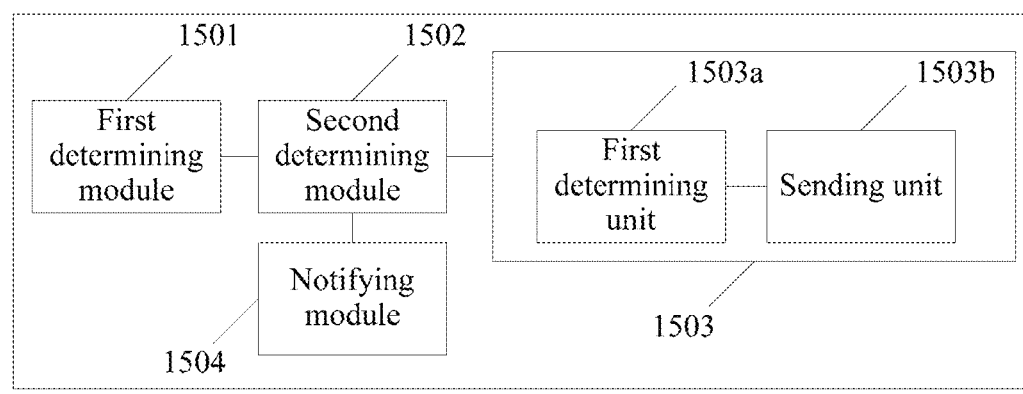
FIG. 15 is a schematic structural diagram of a base station according to Embodiment 15 of the present invention.

This embodiment of the present invention provides a base station, where the base station is applicable to the information transmission method provided in Embodiment 3. Referring to FIG. 15, the base station includes:

a first determining module 1501, configured to determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a second determining module 1502, configured to: determine, according to a correspondence between a characteristic parameter and a spreading resource configuration, a spreading resource configuration corresponding to the characteristic parameter of the user equipment, and use the spreading resource configuration corresponding to the characteristic parameter of the user equipment as a first resource configuration, where the spreading resource configuration is used to configure sizes of a first field and a second field, the first field is used to indicate a length of a spread spectrum sequence and an index of the spread spectrum sequence, the second field is used to indicate a modulation and coding scheme, sums of sizes that are of the first field and the second field and that are indicated by spreading resource configurations are the same, and sizes of the first field that are indicated by the spreading resource configurations are different, where the correspondence between a characteristic parameter and a spreading resource configuration is the same as that in Embodiment 3, and details are not described herein again; and a first transmission module 1503, configured to: determine a spread spectrum sequence resource by using the first field and the second field, and perform information transmission by using the determined resource.

Further, the base station further includes: a notifying module 1504, configured to notify the user equipment of the correspondence between a characteristic parameter and a spreading resource configuration by using broadcast or multicast signaling. The broadcast or multicast signaling is: a MIB, a SIB, Radio Resource Control signaling, Media Access Control signaling, or physical layer signaling.

The first transmission module 1503 includes: a first determining unit 1503a, configured to: when the first resource configuration corresponding to the characteristic parameter of the user equipment includes multiple spreading resource configurations, determine one spreading resource configuration from the multiple spreading resource configurations, and determine the spread spectrum sequence resource by using a first field and a second field that are configured by using the determined spreading resource configuration.

Optionally, the first transmission module 1503 further includes: a sending unit 1503b, configured to notify the user equipment of the first resource configuration, the determined sub-configuration, or a default resource configuration by using dedicated signaling or a field.

The dedicated signaling or the field is: RRC dedicated signaling or a field, MAC dedicated signaling or a field, or physical layer dedicated signaling or a field.

The foregoing transmission may be sending, or may be receiving. Information to be transmitted may be a common message, a dedicated message, control information, a signal, a sequence, or the like. For example, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 16

Figure 16:
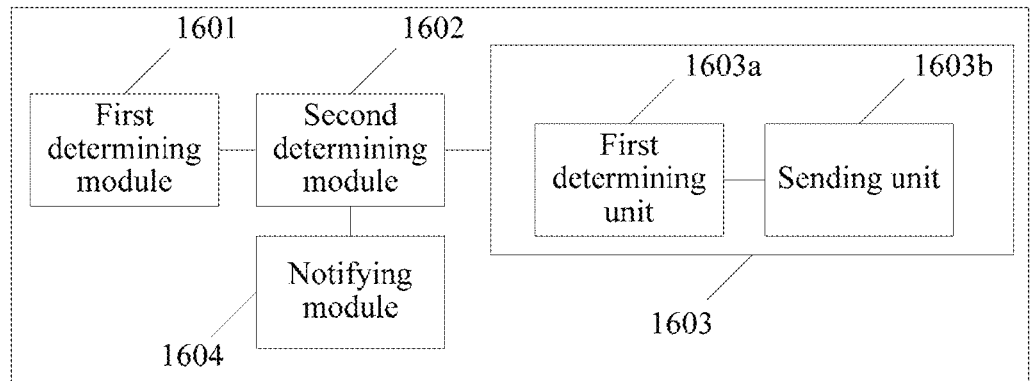
FIG. 16 is a schematic structural diagram of a base station according to Embodiment 16 of the present invention.

This embodiment of the present invention provides a base station, where the base station is applicable to the information transmission method provided in Embodiment 4. Referring to FIG. 16, the base station includes:

a first determining module 1601, configured to determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a second determining module 1602, configured to: determine, according to a correspondence between a characteristic parameter and a spreading resource configuration, a spreading resource configuration corresponding to the characteristic parameter of the user equipment, and use the spreading resource configuration corresponding to the characteristic parameter of the user equipment as a first resource configuration, where the spreading resource configuration includes a third field used to indicate a length of a spread spectrum sequence, an index of the spread spectrum sequence, and a modulation and coding scheme, where the correspondence between a characteristic parameter and a spreading resource configuration is the same as that in Embodiment 4, and details are not described herein again; and a first transmission module 1603, configured to: determine a spread spectrum sequence resource by using the third field, and perform information transmission by using the determined resource.

Further, the base station further includes: a notifying module 1604, configured to notify the user equipment of the correspondence between a characteristic parameter and a spreading resource configuration by using broadcast or multicast signaling. The broadcast or multicast signaling is: a MIB, a SIB, Radio Resource Control signaling, Media Access Control signaling, or physical layer signaling.

The first transmission module 1603 includes: a first determining unit 1603*a*, configured to: when the first resource configuration corresponding to the characteristic parameter of the user equipment includes multiple spreading resource configurations, determine one spreading resource configuration from the multiple spreading resource configurations, and determine the spread spectrum sequence resource by using a third field that is configured by using the determined spreading resource configuration.

Optionally, the first transmission module 1603 further includes: a sending unit 1603*b*, configured to notify the user equipment of the first resource configuration, or the determined sub-configuration, or a default resource configuration by using dedicated signaling or a field.

The dedicated signaling or the field is: RRC dedicated signaling or a field, MAC dedicated signaling or a field, or physical layer dedicated signaling or a field.

Specifically, the transmission may be sending or receiving. Information to be transmitted may be a common message, a dedicated message, control information, a signal, a sequence, or the like. Further, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 17

Figure 17:
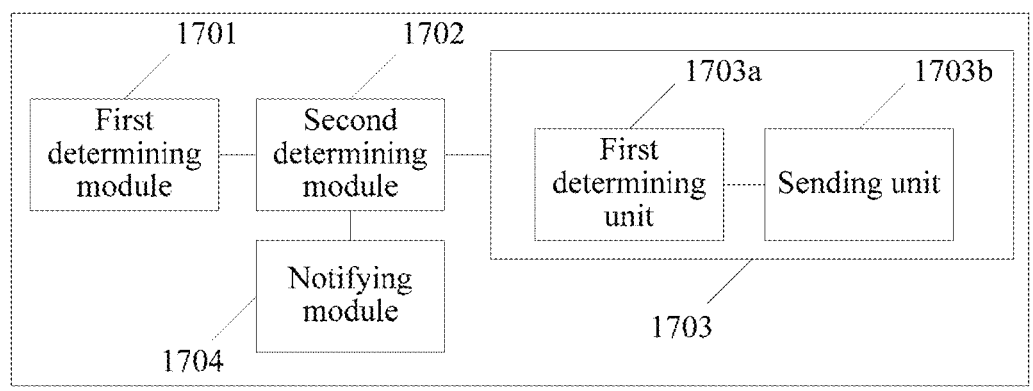
FIG. 17 is a schematic structural diagram of a base station according to Embodiment 17 of the present invention.

This embodiment of the present invention provides a base station, where the base station is applicable to the information transmission method provided in Embodiment 5. Referring to FIG. 17, the base station includes:

a first determining module 1701, configured to determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a second determining module 1702, configured to: determine, according to a correspondence between a characteristic parameter and a spreading resource configuration and a correspondence between a characteristic parameter and a random access preamble format configuration, a spreading resource configuration and a random access preamble format configuration that are corresponding to the characteristic parameter of the user equipment, and use the spreading resource configuration and the random access preamble format configuration that are corresponding to the characteristic parameter of the user equipment as a first resource configuration, where the correspondence between a characteristic parameter and a spreading resource configuration is the same as that in Embodiment 3 or 4, the correspondence between a characteristic parameter and a random access preamble format configuration is the same as that in Embodiment 5, and details are not described herein again; and a first transmission module 1703, configured to: determine a spread spectrum sequence resource by using the spreading resource configuration, determine a random access preamble format by using the random access preamble format configuration, despread a random access preamble according to the spread spectrum sequence resource determined by using the spreading resource configuration, and detect the random access preamble according to the random access preamble format determined by using the random access preamble format configuration.

Specifically, in the correspondence between a characteristic parameter and a resource configuration, each characteristic parameter corresponds to one resource configuration, and resource configurations corresponding to different characteristic parameters are different.

Further, the base station further includes: a notifying module 1704, configured to notify the user equipment of the correspondence between a characteristic parameter and a resource configuration by using broadcast or multicast signaling. The broadcast or multicast signaling is: a MIB, a SIB, Radio Resource Control signaling, Media Access Control signaling, or physical layer signaling.

The first transmission module 1703 includes: a first determining unit 1703a, configured to: when a type of sub-configuration in the first resource configuration includes multiple sub-configurations, determine one sub-configuration from the multiple sub-configurations in the type of sub-configuration according to a predefined function relationship, and determine the resource by using the determined sub-configuration; or determine the resource by using a default resource configuration in the multiple sub-configurations in the type of sub-configuration.

Optionally, the first transmission module 1703 further includes: a sending unit 1703b, configured to notify the user equipment of the first resource configuration, or the determined sub-configuration, or the default resource configuration by using dedicated signaling or a field.

The dedicated signaling or the field is: RRC dedicated signaling or a field, MAC dedicated signaling or a field, or physical layer dedicated signaling or a field.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 18

Figure 18:
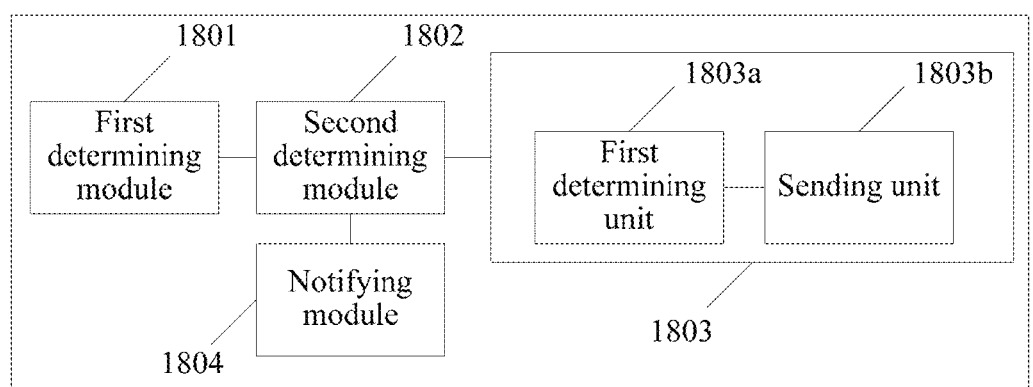
FIG. 18 is a schematic structural diagram of a base station according to Embodiment 18 of the present invention.

This embodiment of the present invention provides a base station, where the base station is applicable to the information transmission method provided in Embodiment 6. Referring to FIG. 18, the base station includes:

a first determining module 1801, configured to determine a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a second determining module 1802, configured to: determine, according to a correspondence between a characteristic parameter and a resource configuration, at least one of a spreading resource configuration, a narrowband resource configuration, and a frequency hopping pattern configuration that are corresponding to the characteristic parameter of the user equipment, where the correspondence includes at least one of a correspondence between a characteristic parameter and a spreading resource configuration, a correspondence between a characteristic parameter and a narrowband resource configuration, and a correspondence between a characteristic parameter and a frequency hopping pattern configuration; and use the at least one of the spreading resource configuration, the narrowband resource configuration, and the frequency hopping pattern configuration that are corresponding to the characteristic parameter of the user equipment as a first resource configuration, where the correspondence between a characteristic parameter and a spreading resource configuration is the same as that in Embodiment 3 or 4, the correspondence between a characteristic parameter and a narrowband resource configuration and the correspondence between a characteristic parameter and a frequency hopping pattern configuration are the same as that in Embodiment 6, and details are not described herein again; and a first transmission module 1803, configured to: determine a spread spectrum sequence resource by using the spreading resource configuration, determine at least one of a narrowband resource and a frequency hopping pattern by using the at least one of the narrowband resource configuration and the frequency hopping pattern configuration, and spread or despread, by using the spread spectrum sequence resource determined by using the spreading resource configuration, information on a resource determined by using the at least one of the narrowband resource and the frequency hopping pattern that are determined by using the at least one of the narrowband resource configuration and the frequency hopping pattern configuration.

Specifically, in the correspondence between a characteristic parameter and a resource configuration, each characteristic parameter corresponds to one resource configuration, and resource configurations corresponding to different characteristic parameters are different.

Further, the base station further includes: a notifying module 1804, configured to notify the user equipment of the correspondence between a characteristic parameter and a resource configuration by using broadcast or multicast signaling. The broadcast or multicast signaling is: a MIB, a SIB, Radio Resource Control signaling, Media Access Control signaling, or physical layer signaling.

The first transmission module 1803 includes: a first determining unit 1803a, configured to: when a type of sub-configuration in the first resource configuration includes multiple sub-configurations, determine one sub-configuration from the multiple sub-configurations in the type of sub-configuration according to a predefined function relationship, and determine the resource by using the determined sub-configuration; or determine the resource by using a default resource configuration in the multiple sub-configurations in the type of sub-configuration.

Optionally, the first transmission module 1803 further includes: a sending unit 1803b, configured to notify the user equipment of the first resource configuration, or the determined sub-configuration, or the default resource configuration by using dedicated signaling or a field.

The dedicated signaling or the field is: RRC dedicated signaling or a field, MAC dedicated signaling or a field, or physical layer dedicated signaling or a field.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 19

Figure 19:
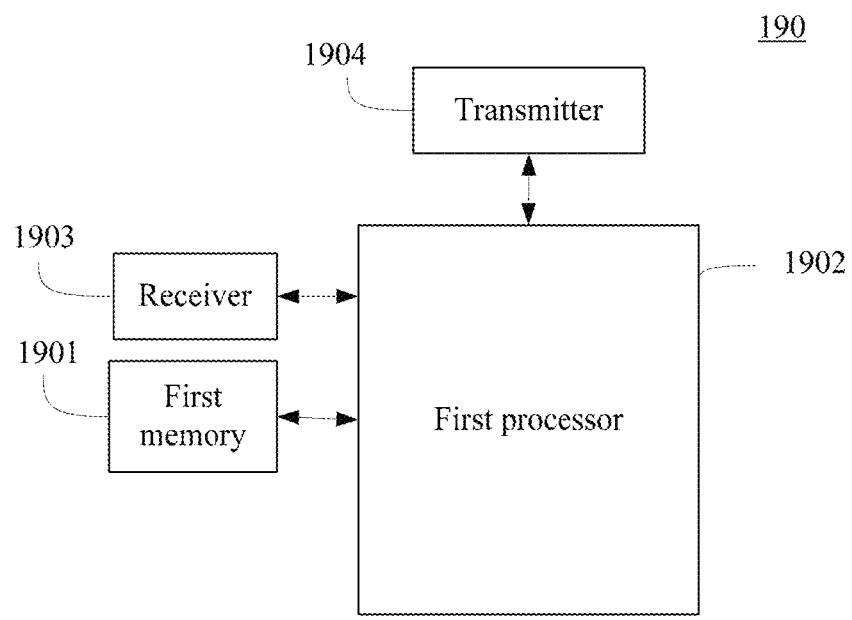
FIG. 19 is a schematic structural diagram of a base station according to Embodiment 19 of the present invention.

This embodiment of the present invention provides a base station, where the base station is applicable to the information transmission method provided in any one of Embodiments 1 to 6. Referring to FIG. 19, the base station includes: a first memory 1901, a first processor 1902, a receiver 1903, a transmitter 1904, and other parts. A person skilled in the art may understand that the structure shown in FIG. 19 does not constitute a limitation on the apparatus; the apparatus may include more or less parts than those shown in the figure, or combine some parts, or have different part arrangements.

The following describes the constituent parts of the base station 190 in detail with reference to FIG. 19.

The first memory 1901 may be configured to store a software program and an application module. By running the software program and the application module that are stored in the first memory 1901, the first processor 1902 executes various functional applications of the base station 190 and performs data processing. The first memory 1901 may mainly include a program storage area and a data storage area, where the program storage area may store an operating system, at least application program (for example, packet decapsulation) required by function, and the like, and the data storage area may store data that is created according to processing performed by the base station 190. In addition, the first memory 1901 may include a high-speed RAM (Random Access Memory, random access memory), and may further include a non-volatile memory (non-volatile memory), for example, at least one disk storage device, a flash memory device, or another volatile solid state storage device.

The first processor 1902 is a control center of the base station 190, and is connected to various parts of the entire base station by using various interfaces and lines. Specifically, the first processor 1902 runs or executes the software program and/or the application module that is stored in the first memory 1901, and uses the data stored in the first memory 1901, so that the first processor 1902 can implement the following operations: determining a characteristic parameter of user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

determining, according to a correspondence between a characteristic parameter and a resource configuration, a resource configuration corresponding to the characteristic parameter of the user equipment, and using the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and determining a resource according to the first resource configuration, and performing information transmission with the user equipment by using the resource.

In the correspondence between a characteristic parameter and a resource configuration, each characteristic parameter in a same type of characteristic parameter corresponds to one resource configuration, and resource configurations corresponding to the characteristic parameters are different.

Each type of sub-configuration in the first resource configuration includes one or more sub-configurations.

The first processor 1902 may further implement the following operations:

when a type of sub-configuration in the first resource configuration includes multiple sub-configurations, determining one sub-configuration from the multiple sub-configurations according to a predefined function relationship, and determining the resource by using the determined sub-configuration; or determining a default resource configuration from the multiple sub-configurations according to a predefinition, and determining the resource by using the default resource configuration.

The first processor 1902 may further implement the following operations: notifying the user equipment of the first resource configuration, the determined sub-configuration, or the default resource configuration by using dedicated signaling or a field.

Specifically, the dedicated signaling or the field is:

RRC dedicated signaling or a field, MAC dedicated signaling or a field, or physical layer dedicated signaling or a field.

In an implementation manner of this embodiment of the present invention, the spreading resource configuration is used to configure sizes of a first field and a second field, where the first field is used to indicate a length of a spread spectrum sequence and an index of the spread spectrum sequence, the second field is used to indicate a modulation and coding scheme, sums of sizes that are of the first field and the second field and that are configured by using spreading resource configurations are the same, and sizes of the first field that are configured by using the spreading resource configurations are different.

Correspondingly, the first processor 1902 may further implement the following operations:

when the first resource configuration includes the spreading resource configuration, performing information transmission by using a spread spectrum sequence resource determined by using the first field and the second field.

In another implementation manner of this embodiment of the present invention, the spreading resource configuration includes a third field used to indicate a length of a spread spectrum sequence, an index of the spread spectrum sequence, and a modulation and coding scheme.

Correspondingly, the first processor 1902 may further implement the following operations:

when the first resource configuration includes the spreading resource configuration, performing information transmission by using a spread spectrum sequence resource determined by using the third field.

In another implementation manner of this embodiment of the present invention, the first processor 1902 may further implement the following operations:

when the first resource configuration includes the spreading resource configuration and the random access preamble format configuration, despreading a random access preamble according to a spread spectrum sequence resource determined by using the spreading resource configuration; and detecting the random access preamble according to a random access preamble format determined by using the random access preamble format configuration.

In another implementation manner of this embodiment of the present invention, the first processor 1902 may further implement the following operations:

when the first resource configuration includes at least one of the spreading resource configuration, the narrowband resource configuration, and the frequency hopping pattern configuration, spreading or despreading, by using a spread spectrum sequence resource determined by using the spreading resource configuration, information on a resource determined by using at least one of a narrowband resource and a frequency hopping pattern that are determined by using the at least one of the narrowband resource configuration and the frequency hopping pattern configuration.

The first processor 1902 may further implement the following operations:

notifying the user equipment of the correspondence between a characteristic parameter and a resource configuration by using broadcast or multicast signaling.

Specifically, the broadcast or multicast signaling is:

a MIB, a SIB, Radio Resource Control signaling, Media Access Control signaling, or physical layer signaling.

Specifically, the correspondence between a characteristic parameter and a resource configuration is predefined.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 20

Figure 20:
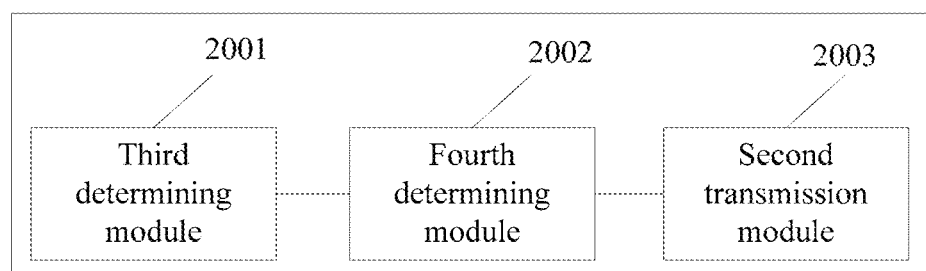
FIG. 20 is a schematic structural diagram of user equipment according to Embodiment 20 of the present invention.

This embodiment of the present invention provides user equipment, where the user equipment is applicable to the information transmission method provided in Embodiment 7. Referring to FIG. 20, the user equipment includes:

a third determining module 2001, configured to determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a fourth determining module 2002, configured to: determine a resource configuration corresponding to the characteristic parameter of the user equipment, and use the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and a second transmission module 2003, configured to: determine a resource according to the first resource configuration, and perform information transmission by using the determined resource.

Specifically, the foregoing correspondence between a characteristic parameter and a resource configuration may be preconfigured on the user equipment, or may be received from a base station.

In specific implementation, in the correspondence between a characteristic parameter and a resource configuration, each characteristic parameter in a same type of characteristic parameter corresponds to one resource configuration, and resource configurations corresponding to the characteristic parameters are different.

The foregoing correspondence includes one or more of a correspondence between a characteristic parameter and a spreading resource configuration, a correspondence between a characteristic parameter and a random access preamble format configuration, a correspondence between a characteristic parameter and a narrowband resource configuration, and a correspondence between a characteristic parameter and a frequency hopping pattern configuration.

Specifically, the correspondence between a characteristic parameter and a resource configuration may include the following cases:

1. In the correspondence, the characteristic parameter includes one type of characteristic parameter, and the type of characteristic parameter corresponds to one type of sub-configuration (see Embodiments 3 and 4). For example, the characteristic parameter is a path loss range, the sub-configuration is a spreading resource configuration, and one path loss range corresponds to one or more spreading resource configurations.

2. In the correspondence, the characteristic parameter includes one type of characteristic parameter, and the type of characteristic parameter corresponds to at least two types of sub-configurations (see Embodiments 5 and 6). For example, the characteristic parameter is a path loss range, the sub-configuration is a spreading resource configuration, and one path loss range corresponds to one or more spreading resource configurations and one or more random access preamble format configurations.

3. In the correspondence, the characteristic parameter includes at least two types of characteristic parameters, and the two types of characteristic parameters correspond to one type of sub-configuration. For example, the characteristic parameter includes a path loss range and reference signal received quality, the sub-configuration is a spreading resource configuration, one path loss range corresponds to one or more spreading resource configurations, and reference signal received quality corresponds to one or more spreading resource configurations.

4. In the correspondence, the characteristic parameter includes at least two types of characteristic parameters, and the two types of characteristic parameters correspond to at least two types of sub-configurations. For example, the characteristic parameter includes a path loss range and reference signal received quality, the sub-configuration includes a spreading resource configuration and a random access preamble format configuration, one path loss range corresponds to one or more spreading resource configurations, and reference signal received quality corresponds to one or more random access preamble format configurations.

Correspondingly, the first resource configuration corresponding to the characteristic parameter of the user equipment may include the following cases:

The first resource configuration includes one type of sub-configuration, and the type of sub-configuration includes one sub-configuration.

The first resource configuration includes multiple types of sub-configurations, and each type of sub-configuration includes one sub-configuration.

The first resource configuration includes one type of sub-configuration, and the type of sub-configuration includes multiple sub-configurations.

The first resource configuration includes multiple types of sub-configurations, and each type of sub-configuration includes multiple sub-configurations.

The first resource configuration includes multiple types of sub-configurations, and at least one type of sub-configuration includes multiple sub-configurations, but not every type of sub-configuration includes multiple sub-configurations.

In conclusion, each type of sub-configuration in the foregoing first resource configuration may include one or more sub-configurations.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 21

Figure 21:
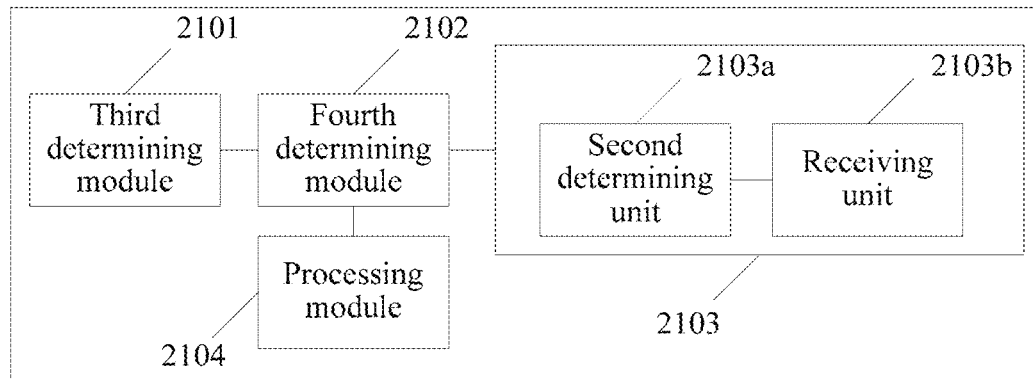
FIG. 21 is a schematic structural diagram of user equipment according to Embodiment 21 of the present invention.

This embodiment of the present invention provides user equipment, where the user equipment is applicable to the information transmission method provided in Embodiment 8. Referring to FIG. 21, the user equipment includes:

a third determining module 2101, configured to determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a fourth determining module 2102, configured to: determine, according to a correspondence between a characteristic parameter and a resource configuration, a resource configuration corresponding to the characteristic parameter of the user equipment, and use the resource configuration corresponding to the characteristic parameter of the user equipment as a first resource configuration; or send the characteristic parameter of the user equipment to a base station, receive a resource configuration that is corresponding to the characteristic parameter of the user equipment and that is sent by the base station, and use the resource configuration that is corresponding to the characteristic parameter of the user equipment and that is sent by the base station as a first resource configuration, where the first resource configuration includes one or more types of the following sub-configurations: a spreading resource configuration, a random access preamble format configuration, a narrowband resource configuration, and a frequency hopping pattern configuration; and a second transmission module 2103, configured to: determine a resource according to the first resource configuration, and perform information transmission by using the determined resource.

Specifically, the foregoing correspondence between a characteristic parameter and a resource configuration may be preconfigured on the user equipment, or may be received from the base station.

In specific implementation, in the correspondence between a characteristic parameter and a resource configuration, each characteristic parameter in a same type of characteristic parameter corresponds to one resource configuration, and resource configurations corresponding to the characteristic parameters are different.

The foregoing correspondence includes one or more of a correspondence between a characteristic parameter and a spreading resource configuration, a correspondence between a characteristic parameter and a random access preamble format configuration, a correspondence between a characteristic parameter and a narrowband resource configuration, and a correspondence between a characteristic parameter and a frequency hopping pattern configuration.

Specifically, the correspondence between a characteristic parameter and a resource configuration may include the following cases:

1. In the correspondence, the characteristic parameter includes one type of characteristic parameter, and the type of characteristic parameter corresponds to one type of sub-configuration (see Embodiments 3 and 4). For example, the characteristic parameter is a path loss range, the sub-configuration is a spreading resource configuration, and one path loss range corresponds to one or more spreading resource configurations.

2. In the correspondence, the characteristic parameter includes one type of characteristic parameter, and the type of characteristic parameter corresponds to at least two types of sub-configurations (see Embodiments 5 and 6). For example, the characteristic parameter is a path loss range, the sub-configuration is a spreading resource configuration, and one path loss range corresponds to one or more spreading resource configurations and one or more random access preamble format configurations.

3. In the correspondence, the characteristic parameter includes at least two types of characteristic parameters, and the two types of characteristic parameters correspond to one type of sub-configuration. For example, the characteristic parameter includes a path loss range and reference signal received quality, the sub-configuration is a spreading resource configuration, one path loss range corresponds to one or more spreading resource configurations, and reference signal received quality corresponds to one or more spreading resource configurations.

4. In the correspondence, the characteristic parameter includes at least two types of characteristic parameters, and the two types of characteristic parameters correspond to at least two types of sub-configurations. For example, the characteristic parameter includes a path loss range and reference signal received quality, the sub-configuration includes a spreading resource configuration and a random access preamble format configuration, one path loss range corresponds to one or more spreading resource configurations, and reference signal received quality corresponds to one or more random access preamble format configurations.

Correspondingly, the first resource configuration corresponding to the characteristic parameter of the user equipment may include the following cases:

The first resource configuration includes one type of sub-configuration, and the type of sub-configuration includes one sub-configuration.

The first resource configuration includes multiple types of sub-configurations, and each type of sub-configuration includes one sub-configuration.

The first resource configuration includes one type of sub-configuration, and the type of sub-configuration includes multiple sub-configurations.

The first resource configuration includes multiple types of sub-configurations, and each type of sub-configuration includes multiple sub-configurations.

The first resource configuration includes multiple types of sub-configurations, and at least one type of sub-configuration includes multiple sub-configurations, but not every type of sub-configuration includes multiple sub-configurations.

In conclusion, each type of sub-configuration in the foregoing first resource configuration may include one or more sub-configurations.

Specifically, the fourth determining module 2102 is configured to: receive dedicated signaling or a field that carries the resource configuration corresponding to the characteristic parameter of the user equipment and that is sent by the base station, and determine the first resource configuration according to the dedicated signaling or the field. The signaling or the field is: RRC dedicated signaling or a field, MAC dedicated signaling or a field, or physical layer dedicated signaling or a field.

Further, the user equipment further includes: a processing module 2104, configured to determine the correspondence between a characteristic parameter and a resource configuration by using broadcast or multicast signaling. The broadcast or multicast signaling is: a MIB, a SIB, Radio Resource Control signaling, Media Access Control signaling, or physical layer signaling.

The second transmission module 2103 includes: a second determining unit 2103a, configured to: when a type of sub-configuration in the first resource configuration includes multiple sub-configurations, determine one sub-configuration from the multiple sub-configurations in the type of sub-configuration according to a predefined function relationship, and determine the resource by using the determined sub-configuration.

Optionally, the second transmission module 2103 further includes: a receiving unit 2103b, configured to receive dedicated signaling or a field that carries the resource configuration.

The second determining unit 2103a is further configured to: when a type of sub-configuration in the first resource configuration includes multiple sub-configurations, determine one sub-configuration from the multiple sub-configurations according to the dedicated signaling or the field, and determine the resource by using the determined sub-configuration.

In specific implementation, the dedicated signaling or the field is: RRC dedicated signaling or a field, MAC dedicated signaling or a field, or physical layer dedicated signaling or a field.

The foregoing transmission may be sending, or may be receiving. Information to be transmitted may be a common message, a dedicated message, control information, a signal, a sequence, or the like. For example, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 22

Figure 22:
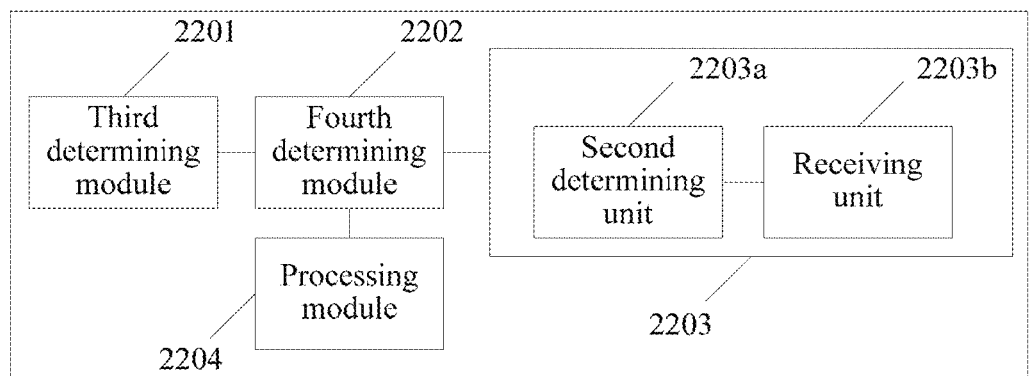
FIG. 22 is a schematic structural diagram of user equipment according to Embodiment 22 of the present invention.

This embodiment of the present invention provides user equipment, where the user equipment is applicable to the information transmission method provided in Embodiment 9. Referring to FIG. 22, the user equipment includes:

a third determining module 2201, configured to determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a fourth determining module 2202, configured to: determine, according to a correspondence between a characteristic parameter and a spreading resource configuration, a spreading resource configuration corresponding to the characteristic parameter of the user equipment, and use the spreading resource configuration corresponding to the characteristic parameter of the user equipment as a first resource configuration; or send the characteristic parameter of the user equipment to a base station, receive a spreading resource configuration that is corresponding to the characteristic parameter of the user equipment and that is sent by the base station, and use the spreading resource configuration corresponding to the characteristic parameter of the user equipment as a first resource configuration, where the spreading resource configuration is used to configure sizes of a first field and a second field, the first field is used to indicate a length of a spread spectrum sequence and an index of the spread spectrum sequence, the second field is used to indicate a modulation and coding scheme, sums of sizes that are of the first field and the second field and that are indicated by spreading resource configurations are the same, and sizes of the first field that are indicated by the spreading resource configurations are different, where the correspondence between a characteristic parameter and a spreading resource configuration is the same as that in Embodiment 3, and details are not described herein again; and a second transmission module 2203, configured to: determine a spread spectrum sequence resource by using the first field and the second field, and perform information transmission by using the determined resource.

Specifically, the fourth determining module 2202 is configured to: receive dedicated signaling or a field that carries the spreading resource configuration corresponding to the characteristic parameter of the user equipment and that is sent by the base station, and determine the first resource configuration according to the dedicated signaling or the field. The signaling or the field is: RRC dedicated signaling or a field, MAC dedicated signaling or a field, or physical layer dedicated signaling or a field.

Further, the user equipment further includes: a processing module 2204, configured to determine the correspondence between a characteristic parameter and a spreading resource configuration by using broadcast or multicast signaling. The broadcast or multicast signaling is: a MIB, a SIB, Radio Resource Control signaling, Media Access Control signaling, or physical layer signaling.

The second transmission module 2203 includes: a second determining unit 2203a, configured to: when the first resource configuration corresponding to the characteristic parameter of the user equipment includes multiple spreading resource configurations, determine one spreading resource configuration from the multiple spreading resource configurations according to a predefined function relationship, and determine the resource by using the determined spreading resource configuration.

Optionally, the second transmission module 2203 further includes: a receiving unit 2203b, configured to receive dedicated signaling or a field that carries the resource configuration.

The second determining unit 2203a is further configured to: when the first resource configuration includes multiple spreading resource configurations, determine one spreading resource configuration from the multiple spreading resource configurations according to the dedicated signaling or the field, and determine the resource by using the determined spreading resource configuration.

The dedicated signaling or the field is: RRC dedicated signaling or a field, MAC dedicated signaling or a field, or physical layer dedicated signaling or a field.

Specifically, the transmission may be sending or receiving. Information to be transmitted may be a common message, a dedicated message, control information, a signal, a sequence, or the like. Further, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 23

Figure 23:
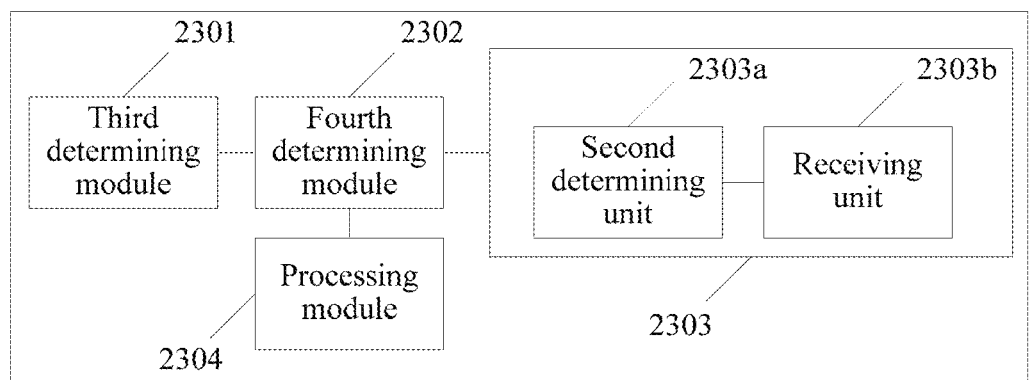
FIG. 23 is a schematic structural diagram of user equipment according to Embodiment 23 of the present invention.

This embodiment of the present invention provides user equipment, where the user equipment is applicable to the information transmission method provided in Embodiment 10. Referring to FIG. 23, the user equipment includes:

a third determining module 2301, configured to determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a fourth determining module 2302, configured to: determine, according to a correspondence between a characteristic parameter and a spreading resource configuration, a spreading resource configuration corresponding to the characteristic parameter of the user equipment, and use the spreading resource configuration corresponding to the characteristic parameter of the user equipment as a first resource configuration; or send the characteristic parameter of the user equipment to a base station, receive a spreading resource configuration that is corresponding to the characteristic parameter of the user equipment and that is sent by the base station, and use the spreading resource configuration corresponding to the characteristic parameter of the user equipment as a first resource configuration, where the spreading resource configuration includes a third field used to indicate a length of a spread spectrum sequence, an index of the spread spectrum sequence, and a modulation and coding scheme, where the correspondence between a characteristic parameter and a spreading resource configuration is the same as that in Embodiment 4, and details are not described herein again; and a second transmission module 2303, configured to: determine a spread spectrum sequence resource by using the third field, and perform information transmission by using the determined resource.

Specifically, the fourth determining module 2302 is configured to: receive dedicated signaling or a field that carries the spreading resource configuration corresponding to the characteristic parameter of the user equipment and that is sent by the base station, and determine the first resource configuration according to the dedicated signaling or the field. The signaling or the field is: RRC dedicated signaling or a field, MAC dedicated signaling or a field, or physical layer dedicated signaling or a field.

Further, the user equipment further includes: a processing module 2304, configured to determine the correspondence between a characteristic parameter and a spreading resource configuration by using broadcast or multicast signaling. The broadcast or multicast signaling is: a MIB, a SIB, Radio Resource Control signaling, Media Access Control signaling, or physical layer signaling.

The second transmission module 2303 includes: a second determining unit 2303a, configured to: when the first resource configuration includes multiple spreading resource configurations, determine one spreading resource configuration from the multiple spreading resource configurations according to a predefined function relationship, and determine the resource by using the determined spreading resource configuration.

Optionally, the second transmission module 2303 further includes: a receiving unit 2303b, configured to receive dedicated signaling or a field that carries the resource configuration.

The second determining unit 2303a is further configured to: when the first resource configuration includes multiple spreading resource configurations, determine one spreading resource configuration from the multiple spreading resource configurations according to the dedicated signaling or the field, and determine the resource by using the determined spreading resource configuration.

The dedicated signaling or the field is: RRC dedicated signaling or a field, MAC dedicated signaling or a field, or physical layer dedicated signaling or a field.

Specifically, the transmission may be sending or receiving. Information to be transmitted may be a common message, a dedicated message, control information, a signal, a sequence, or the like. Further, the common message may be a random access response message, a paging message, system information, or a physical broadcast channel. The dedicated message may be dedicated downlink data or uplink data. The control message may be a control channel that carries scheduling information, a control channel that carries a response feedback, or a control channel that carries channel state information. The signal may be an uplink reference signal, a synchronization signal, or a downlink reference signal. The sequence may be a random access preamble or a synchronization sequence.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 24

Figure 24:
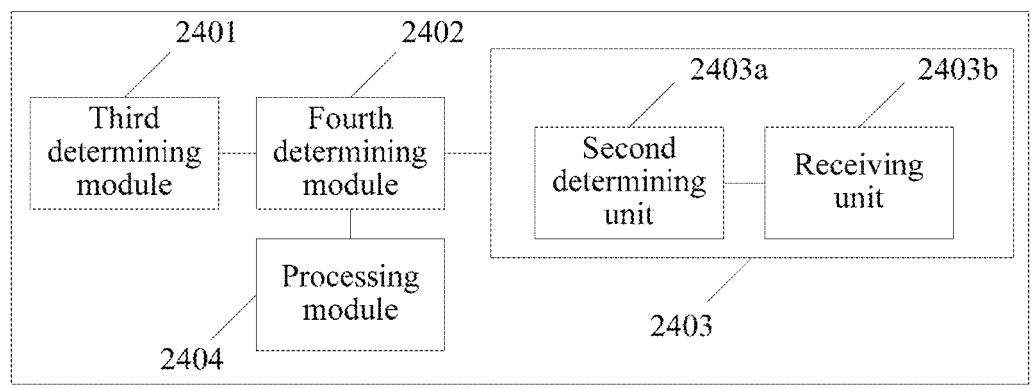
FIG. 24 is a schematic structural diagram of user equipment according to Embodiment 24 of the present invention.

This embodiment of the present invention provides user equipment, where the user equipment is applicable to the information transmission method provided in Embodiment 11. Referring to FIG. 24, the user equipment includes:

a third determining module 2401, configured to determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a fourth determining module 2402, configured to: determine, according to a correspondence between a characteristic parameter and a spreading resource configuration and a correspondence between a characteristic parameter and a random access preamble format configuration, a spreading resource configuration and a random access preamble format configuration that are corresponding to the characteristic parameter of the user equipment, and use the spreading resource configuration and the random access preamble format configuration that are corresponding to the characteristic parameter of the user equipment as a first resource configuration; or send the characteristic parameter of the user equipment to a base station, receive a spreading resource configuration and a random access preamble format configuration that are corresponding to the characteristic parameter of the user equipment and that are sent by the base station, and use the spreading resource configuration and the random access preamble format configuration that are corresponding to the characteristic parameter of the user equipment as a first resource configuration, where the correspondence between a characteristic parameter and a spreading resource configuration is the same as that in Embodiment 3 or 4, the correspondence between a characteristic parameter and a random access preamble format configuration is the same as that in Embodiment 5, and details are not described herein again; and a second transmission module 2403, configured to: determine a spread spectrum sequence resource by using the spreading resource configuration, determine a random access preamble format by using the random access preamble format configuration, generate a random access preamble by using the random access preamble format determined by using the random access preamble format configuration, spread the random access preamble according to the spread spectrum sequence resource determined by using the spreading resource configuration, and transmit the random access preamble that has been spread.

Specifically, in the correspondence between a characteristic parameter and a resource configuration, each characteristic parameter in a same type of characteristic parameter corresponds to one resource configuration, and resource configurations corresponding to the characteristic parameters are different.

Specifically, the fourth determining module 2402 is configured to: receive dedicated signaling or a field that carries the spreading resource configuration and the random access preamble format configuration and that is sent by the base station, where the spreading resource configuration and the random access preamble format configuration are corresponding to the characteristic parameter of the user equipment; and determine the first resource configuration according to the dedicated signaling or the field. The signaling or the field is: RRC dedicated signaling or a field, MAC dedicated signaling or a field, or physical layer dedicated signaling or a field.

Further, the user equipment further includes: a processing module 2404, configured to determine the correspondence between a characteristic parameter and a resource configuration by using broadcast or multicast signaling. The broadcast or multicast signaling is: a MIB, a SIB, Radio Resource Control signaling, Media Access Control signaling, or physical layer signaling.

The second transmission module 2403 includes: a second determining unit 2403a, configured to: when a type of sub-configuration in the first resource configuration includes multiple sub-configurations, determine one sub-configuration from the multiple sub-configurations in the type of sub-configuration according to a predefined function relationship, and determine the resource by using the determined sub-configuration.

Optionally, the second transmission module 2403 further includes: a receiving unit 2403b, configured to receive dedicated signaling or a field that carries the resource configuration.

The second determining unit 2403a is further configured to: when a type of sub-configuration in the first resource configuration includes multiple sub-configurations, determine one sub-configuration from the multiple sub-configurations in the type of sub-configuration according to the dedicated signaling or the field, and determine the resource by using the determined sub-configuration.

The dedicated signaling or the field is: RRC dedicated signaling or a field, MAC dedicated signaling or a field, or physical layer dedicated signaling or a field.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 25

Figure 25:
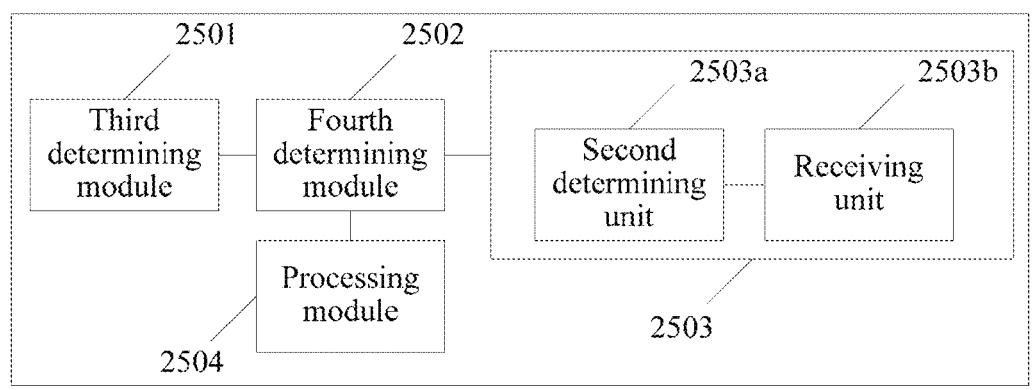
FIG. 25 is a schematic structural diagram of user equipment according to Embodiment 25 of the present invention.

This embodiment of the present invention provides user equipment, where the user equipment is applicable to the information transmission method provided in Embodiment 12. Referring to FIG. 25, the user equipment includes:

a third determining module 2501, configured to determine a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

a fourth determining module 2502, configured to: determine, according to a correspondence between a characteristic parameter and a resource configuration, at least one of a spreading resource configuration, a narrowband resource configuration, and a frequency hopping pattern configuration that are corresponding to the characteristic parameter of the user equipment, where the correspondence includes at least one of a correspondence between a characteristic parameter and a spreading resource configuration, a correspondence between a characteristic parameter and a narrowband resource configuration, and a correspondence between a characteristic parameter and a frequency hopping pattern configuration, and use the at least one of the spreading resource configuration, the narrowband resource configuration, and the frequency hopping pattern configuration that are corresponding to the characteristic parameter of the user equipment as a first resource configuration; or send the characteristic parameter of the user equipment to a base station, receive at least one of a spreading resource configuration, a narrowband resource configuration, and a frequency hopping pattern configuration that are corresponding to the characteristic parameter of the user equipment and that are sent by the base station, and use the at least one of the spreading resource configuration, the narrowband resource configuration, and the frequency hopping pattern configuration that are corresponding to the characteristic parameter of the user equipment as a first resource configuration, where the correspondence between a characteristic parameter and a spreading resource configuration is the same as that in Embodiment 3 or 4, the correspondence between a characteristic parameter and a narrowband resource configuration and the correspondence between a characteristic parameter and a frequency hopping pattern configuration are the same as that in Embodiment 6, and details are not described herein again; and a second transmission module 2503, configured to: determine a spread spectrum sequence resource by using the spreading resource configuration, determine at least one of a narrowband resource and a frequency hopping pattern by using the at least one of the narrowband resource configuration and the frequency hopping pattern configuration, and spread or despread, by using the spread spectrum sequence resource determined by using the spreading resource configuration, information on a resource determined by using the at least one of the narrowband resource and the frequency hopping pattern that are determined by using the at least one of the narrowband resource configuration and the frequency hopping pattern configuration.

Specifically, in the correspondence between a characteristic parameter and a resource configuration, each characteristic parameter in a same type of characteristic parameter corresponds to one resource configuration, and resource configurations corresponding to the characteristic parameters are different.

Specifically, the fourth determining module 2502 is configured to: receive dedicated signaling or a field that carries the at least one of the spreading resource configuration, the narrowband resource configuration, and the frequency hopping pattern configuration and that is sent by the base station, where the at least one of configurations is corresponding to the characteristic parameter of the user equipment; and determine the first resource configuration according to the dedicated signaling or the field. The signaling or the field is: RRC dedicated signaling or a field, MAC dedicated signaling or a field, or physical layer dedicated signaling or a field.

Further, the user equipment further includes: a processing module 2504, configured to determine the correspondence between a characteristic parameter and a resource configuration by using broadcast or multicast signaling. The broadcast or multicast signaling is: a MIB, a SIB, Radio Resource Control signaling, Media Access Control signaling, or physical layer signaling.

The second transmission module 2503 includes: a second determining unit 2503a, configured to: when a type of sub-configuration in the first resource configuration includes multiple sub-configurations, determine one sub-configuration from the multiple sub-configurations in the type of sub-configuration according to a predefined function relationship, and determine the resource by using the determined sub-configuration.

Optionally, the second transmission module 2503 further includes: a receiving unit 2503b, configured to receive dedicated signaling or a field that carries the resource configuration.

The second determining unit 2503a is further configured to: when a type of sub-configuration in the first resource configuration includes multiple sub-configurations, determine one sub-configuration from the multiple sub-configurations in the type of sub-configuration according to the dedicated signaling or the field, and determine the resource by using the determined sub-configuration.

The dedicated signaling or the field is: RRC dedicated signaling or a field, MAC dedicated signaling or a field, or physical layer dedicated signaling or a field.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 26

Figure 26:
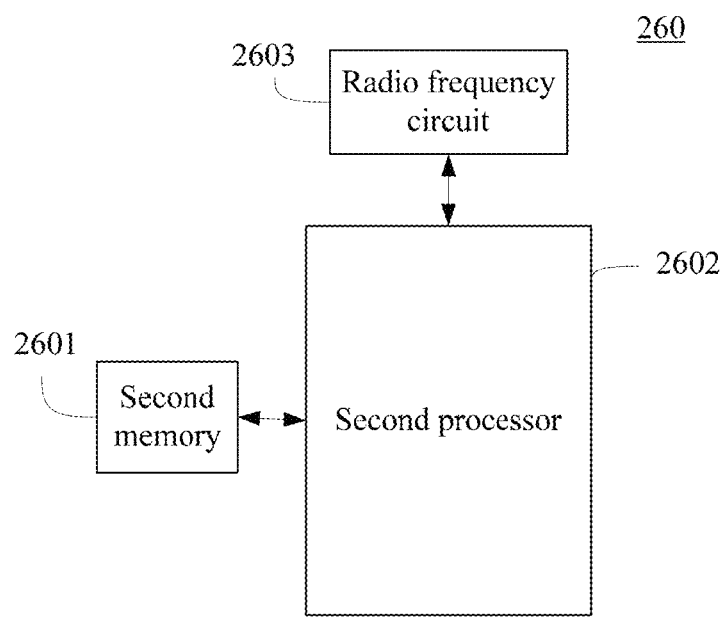
FIG. 26 is a schematic structural diagram of user equipment according to Embodiment 26 of the present invention.

This embodiment of the present invention provides user equipment, where the user equipment is applicable to the information transmission method provided in any one of Embodiments 7 to 12. Referring to FIG. 26, the user equipment may include a mobile phone, a tablet, a PDA (Personal Digital Assistant, personal digital assistant), a POS (Point of Sale, point of sale), a vehicle-mounted computer, or the like. The user equipment includes:

a second memory 2601, a second processor 2602, a radio frequency circuit 2603, and other parts. A person skilled in the art may understand that the structure shown in FIG. 26 does not constitute a limitation on the apparatus; the apparatus may include more or less parts than those shown in the figure, or combine some parts, or have different part arrangements.

The following describes the constituent parts of the user equipment 260 in detail with reference to FIG. 26.

The first memory 2601 may be configured to store a software program and an application module. By running the software program and the application module that are stored in the first memory 2601, the second processor 2602 executes various functional applications of the user equipment 260 and performs data processing. The first memory 2601 may mainly include a program storage area and a data storage area, where the program storage area may store an operating system, at least one application program (for example, packet decapsulation) required by function, and the like, and the data storage area may store data that is created according to processing performed by the user equipment 260. In addition, the first memory 2601 may include a high-speed RAM (Random Access Memory, random access memory), and may further include a non-volatile memory (non-volatile memory), for example, at least one disk storage device, a flash memory device, or another volatile solid state storage device.

The second processor 2602 is a control center of the user equipment 260, and is connected to various parts of the entire user equipment by using various interfaces and lines.

Specifically, the second processor 2602 runs or executes the software program and/or the application module that is stored in the first memory 2601, and uses the data stored in the first memory 2601, so that the second processor 2602 may implement the following operations: determining a characteristic parameter of the user equipment, where the characteristic parameter includes at least one type of a path loss value, a path loss range, reference signal received power, a reference signal received power range, reference signal received quality, a reference signal received quality range, channel quality information, a channel quality information range, a service type, a power reduction requirement, a delay requirement, and a mobility requirement;

determining a resource configuration corresponding to the characteristic parameter of the user equipment, and using the resource configuration corresponding to the characteristic parameter of the user equipment as a first resource configuration, where the first resource configuration includes one or more types of the following sub-configurations: a spreading resource configuration, a random access preamble format configuration, a narrowband resource configuration, and a frequency hopping pattern configuration; and determining a resource according to the first resource configuration, and performing information transmission with a base station by using the resource.

The second processor 2602 may further implement the following operations:

determining, according to a correspondence between a characteristic parameter and a resource configuration, the resource configuration corresponding to the characteristic parameter of the user equipment, and using the resource configuration corresponding to the characteristic parameter of the user equipment as the first resource configuration; or sending the characteristic parameter of the user equipment to the base station, receiving the resource configuration that is corresponding to the characteristic parameter of the user equipment and that is sent by the base station, and using the resource configuration that is corresponding to the characteristic parameter of the user equipment and that is sent by the base station as the first resource configuration.

In the correspondence between a characteristic parameter and a resource configuration, each characteristic parameter in a same type of characteristic parameter corresponds to one resource configuration, and resource configurations corresponding to the characteristic parameters are different.

Each type of sub-configuration in the first resource configuration includes one or more sub-configurations.

The second processor 2602 may further implement the following operations:

when a type of sub-configuration in the first resource configuration includes multiple sub-configurations, determining one sub-configuration from the multiple sub-configurations according to a predefined function relationship, and determining the resource by using the determined sub-configuration.

The second processor 2602 may further implement the following operations:

receiving dedicated signaling or a field that carries the resource configuration; and when a type of sub-configuration in the first resource configuration includes multiple sub-configurations, determining one sub-configuration from the multiple sub-configurations according to the dedicated signaling or the field, and determining the resource by using the determined sub-configuration.

Specifically, the dedicated signaling or the field is:

RRC dedicated signaling or a field, MAC dedicated signaling or a field, or physical layer dedicated signaling or a field.

In another implementation manner of this embodiment of the present invention, the spreading resource configuration is used to configure sizes of a first field and a second field, where the first field is used to indicate a length of a spread spectrum sequence and an index of the spread spectrum sequence, the second field is used to indicate a modulation and coding scheme, sums of sizes that are of the first field and the second field and that are configured by using spreading resource configurations are the same, and sizes of the first field that are configured by using the spreading resource configurations are different.

Correspondingly, the second processor 2602 may further implement the following operations:

when the first resource configuration includes the spreading resource configuration, performing information transmission by using a spread spectrum sequence resource determined by using the first field and the second field.

In another implementation manner of this embodiment of the present invention, the spreading resource configuration includes a third field used to indicate a length of a spread spectrum sequence, an index of the spread spectrum sequence, and a modulation and coding scheme.

Correspondingly, the second processor 2602 may further implement the following operations:

when the first resource configuration includes the spreading resource configuration, performing information transmission by using a spread spectrum sequence resource determined by using the third field.

In another implementation manner of this embodiment of the present invention, the second processor 2602 may further implement the following operations:

when the first resource configuration includes the spreading resource configuration and the random access preamble format configuration, generating a random access preamble by using a random access preamble format determined by using the random access preamble format configuration;

spreading the random access preamble according to the spread spectrum sequence resource determined by using the spreading resource configuration; and transmitting the random access preamble that has been spread.

In another implementation manner of this embodiment of the present invention, the second processor 2602 may further implement the following operations:

when the first resource configuration includes at least one of the spreading resource configuration, the narrowband resource configuration, and the frequency hopping pattern configuration, spreading or despreading, by using a spread spectrum sequence resource determined by using the spreading resource configuration, information on a resource determined by using at least one of a narrowband resource and a frequency hopping pattern that are determined by using the at least one of the narrowband resource configuration and the frequency hopping pattern configuration.

The second processor 2602 may further implement the following operations:

determining the correspondence between a characteristic parameter and a resource configuration by using broadcast or multicast signaling.

Specifically, the broadcast or multicast signaling is:

a MIB, a SIB, Radio Resource Control signaling, Media Access Control signaling, or physical layer signaling.

Specifically, the correspondence between a characteristic parameter and a resource configuration is predefined.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

Embodiment 27

Figure 27:
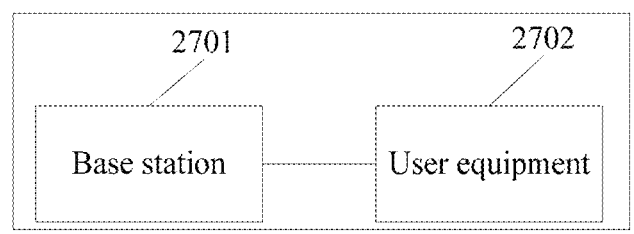
FIG. 27 is a schematic structural diagram of an information transmission system according to Embodiment 27 of the present invention.

This embodiment of the present invention provides a communications system. Referring to FIG. 27, the system includes: the base station provided in any one of Embodiments 13 to 19 and the user equipment provided in any one of Embodiments 20 to 26.

In this embodiment of the present invention, a first resource configuration corresponding to a characteristic parameter of user equipment is determined according to a correspondence between a characteristic parameter and a resource configuration, and information transmission is performed by using a resource determined by using the first resource configuration. In this way, the following problem in the prior art is avoided: When enhancement is performed in a coverage area of an entire network, unnecessary resource use and power expenditure are caused by a same extent of enhancement performed in the coverage area of the entire network. Therefore, resources are economized on.

It should be noted that, during information transmission performed by the base station or the user equipment provided in the foregoing embodiments, division of the foregoing functional modules is merely used as an example for description. In an actual application, the functions may be allocated to different functional modules for implementation according to a requirement, that is, an internal structure of the base station or the user equipment is divided into different functional modules to implement all or some of the functions described above. In addition, the base station or the user equipment provided in the foregoing embodiments and the information transmission method embodiments belong to a same concept. For a specific implementation process, reference may be made to the method embodiments, and details are not described herein again.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely exemplary embodiments of the present invention, but are not intended to limit the present invention. Any modification, equivalent replacement, and improvement made without departing from the principle of the present invention shall fall within the protection scope of the present invention.

What is claimed is:

1. An information transmission method, wherein the method comprises:

determining, by a device, a characteristic parameter of user equipment, wherein the characteristic parameter comprises a reference signal received power range;

determining, by the device, according to a correspondence between a characteristic parameter and a resource configuration, a resource configuration corresponding to the characteristic parameter of the user equipment as a first resource configuration, wherein the first resource configuration is a frequency hopping pattern configuration, and the first resource configuration comprises one or more sub-configurations;
determining, by the device, a resource according to the first resource configuration; and
performing, by the device, information receiving by using the resource.

2. The method according to claim 1, wherein in the correspondence between a characteristic parameter and a resource configuration, each characteristic parameter in a same type of characteristic parameter corresponds to one resource configuration, and resource configurations corresponding to different characteristic parameters are different.

3. The method according to claim 1, wherein the determining, by the device, a resource according to the first resource configuration comprises:
determining, by the device, the resource by using a default resource configuration in the one or more sub-configurations.

4. The method according to claim 1, wherein the method further comprises:
notifying, by the device, the user equipment of the correspondence between a characteristic parameter and a resource configuration by using broadcast or multicast signaling, wherein the broadcast or multicast signaling is a system information block type 2.

5. The method according to claim 1, wherein the device is a network device or a terminal device.

6. The method according to claim 1, wherein the device is a user equipment, the method further comprises:
determining, by user equipment, the correspondence between a characteristic parameter and a resource configuration by using broadcast or multicast signaling;
wherein the broadcast or multicast signaling is a system information block type 2.

7. A device, comprising
a non-transitory memory storage comprising instructions; and
one or more hardware processors in communication with the non-transitory memory storage, wherein the one or more hardware processors execute the instructions to:
determine a characteristic parameter of user equipment, wherein the characteristic parameter comprises a reference signal received power range;
determine, according to a correspondence between a characteristic parameter and a resource configuration, a resource configuration corresponding to the characteristic parameter of the user equipment as a first resource configuration, wherein the first resource configuration comprises a frequency hopping pattern configuration, and the first resource configuration comprises one or more sub-configurations;
determine a resource according to the first resource configuration; and
perform information receiving with by using the resource.

8. The device according to claim 7, wherein in the correspondence between a characteristic parameter and a resource configuration, each characteristic parameter in a same type of characteristic parameter corresponds to one resource configuration, and resource configurations corresponding to the characteristic parameters are different.

9. The device according to claim 7 wherein the one or more hardware processors execute the instructions to:
when the first resource configuration comprises multiple sub-configurations, determine the resource by using a default resource configuration in the multiple sub-configurations.

10. The device according to claim 7, wherein the one or more hardware processors execute the instructions to:
notify an another device of the correspondence between a characteristic parameter and a resource configuration by using broadcast or multicast signaling, wherein the broadcast or multicast signaling is a system information block type 2.

11. The device according to claim 7, wherein the device is a chip device, a network device, or a terminal device.

12. The device according to claim 7, wherein the device is a user equipment, the one or more hardware processors execute the instructions to:
determine, by user equipment, the correspondence between a characteristic parameter and a resource configuration by using broadcast or multicast signaling;
wherein the broadcast or multicast signaling is a system information block type 2.

13. A non-transitory computer readable storage medium, wherein the computer readable storage medium stores a program, characterized by, when program is executed by a processor, the following steps are performed,
determining a characteristic parameter of user equipment, wherein the characteristic parameter comprises a reference signal received power range;
determining according to a correspondence between a characteristic parameter and a resource configuration, a resource configuration corresponding to the characteristic parameter of the user equipment as a first resource configuration, wherein the first resource configuration is a frequency hopping pattern configuration, and the first resource configuration comprises one or more sub-configurations;
determining a resource according to the first resource configuration; and
performing information receiving by using the resource.

14. The computer readable storage medium according to claim 13, wherein in the correspondence between a characteristic parameter and a resource configuration, each characteristic parameter in a same type of characteristic parameter corresponds to one resource configuration, and resource configurations corresponding to different characteristic parameters are different.

15. The computer readable storage medium according to claim 13, wherein the determining a resource according to the first resource configuration comprises:
determining the resource by using a default resource configuration in the one or more sub-configurations.

16. The computer readable storage medium according to claim 13, wherein the following steps further comprises:
notifying the user equipment of the correspondence between a characteristic parameter and a resource configuration by using broadcast or multicast signaling, wherein the broadcast or multicast signaling is a system information block type 2.

17. The computer readable storage medium according to claim 13, wherein the following steps further comprises:
determining, by user equipment, the correspondence between a characteristic parameter and a resource configuration by using broadcast or multicast signaling;
wherein the broadcast or multicast signaling is a system information block type 2.

18. The computer readable storage medium according to claim 13, wherein the computer readable storage medium is a non-volatile storage medium.

* * * * *